US011134010B2

(12) United States Patent
Mehmedagic et al.

(10) Patent No.: US 11,134,010 B2
(45) Date of Patent: Sep. 28, 2021

(54) INDUSTRIAL SOFTWARE DEFINED NETWORKING ARCHITECTURE FOR DEPLOYMENT IN A SOFTWARE DEFINED AUTOMATION SYSTEM

(71) Applicant: Schneider Electric Industries SAS, Rueil-Malmaison (FR)

(72) Inventors: Alen Mehmedagic, Wilmington, MA (US); Vallala Vijay, North Andover, MA (US)

(73) Assignee: Schneider Electric Industries SAS, Rueil Malmaison (FR)

(*) Notice: Subject to any disclaimer, the term of this patent is extended or adjusted under 35 U.S.C. 154(b) by 235 days.

(21) Appl. No.: 16/322,864

(22) PCT Filed: Aug. 3, 2017

(86) PCT No.: PCT/EP2017/069606
§ 371 (c)(1),
(2) Date: Feb. 1, 2019

(87) PCT Pub. No.: WO2018/024809
PCT Pub. Date: Feb. 8, 2018

(65) Prior Publication Data
US 2021/0029029 A1   Jan. 28, 2021

Related U.S. Application Data

(60) Provisional application No. 62/370,686, filed on Aug. 3, 2016, provisional application No. 62/376,470, filed on Aug. 18, 2016.

(51) Int. Cl.
*H04L 29/06* (2006.01)
*H04L 12/715* (2013.01)
*G06F 9/54* (2006.01)

(52) U.S. Cl.
CPC .............. *H04L 45/64* (2013.01); *G06F 9/547* (2013.01); *H04L 63/0218* (2013.01); *H04L 63/08* (2013.01); *H04L 67/40* (2013.01)

(58) Field of Classification Search
CPC ..... H04L 45/64; H04L 63/0218; H04L 63/08; H04L 67/40; G06F 9/547
See application file for complete search history.

(56) References Cited

U.S. PATENT DOCUMENTS

| 2005/0114474 | A1  | 5/2005 | Anderson |          |
|--------------|-----|--------|----------|----------|
| 2016/0085971 | A1* | 3/2016 | Saxena   | G06F 21/602 |
|              |     |        |          | 726/26   |
| 2017/0187607 | A1* | 6/2017 | Shaikh   | H04L 41/042 |

FOREIGN PATENT DOCUMENTS

CN    105406992 A    3/2016

OTHER PUBLICATIONS

Gyorgy Kalman, "Security Implications of Software Defined Networking in Industrial Control Systems", Proceedings of the Tenth International Multi-Conference on Computing in the Global Information Technology (ICCGI 2015), Oct. 11, 2015, XP055412475.

(Continued)

*Primary Examiner* — Lan-Huong Truong
(74) *Attorney, Agent, or Firm* — Locke Lord LLP

(57) ABSTRACT

An industrial software defined network (SDN) architecture, system and methods for centralized and simplified management of an industrial network is disclosed. The industrial SDN architecture comprises of an infrastructure plane including physical and virtual devices, a control plane comprising controllers to control and manage the physical and virtual devices in the infrastructure plane, the logically centralized controllers including a network controller, a virtualization management controller and a cybersecurity controller, an application plane comprising one or more end user industrial applications, and a platform plane comprising (Continued)

a set of software services and application programming interfaces (APIs) to define a communication interface to the application plane to the north and the control plane to the south to provide an industrial application in the application plane programmatic access to one or more of the plurality of the controllers in the control plane for simplified and centralized management of the industrial network.

19 Claims, 40 Drawing Sheets

(56) References Cited

OTHER PUBLICATIONS

Gyorgy Kalman, "Applicability of Software Defined Networking in Industrial Ethernet," 2014 22nd Telecommunications Forum Telfor, Nov. 1, 2014, pp. 340-342, XP055412461, ISBN: 978-1-4799-6190-0.
Givehchi Omid et al, "Cloud Computing for Industrial Automation Systems—A Comprehensive Overview," 2013 IEEE 19th Conference on Emerging Technologies & Factory Automation. IEEE, Sep. 10, 2013, pp. 1-4, XP032517041, ISBN 1946-0740.
International Search Report and The Written Opinion of the International Searching Authority Corresponding to PCT/EP2017/069606, 18 pages.

\* cited by examiner

INDUSTRIAL SOFTWARE DEFINED NETWORKING ARCHITECTURE FOR DEPLOYMENT IN A SOFTWARE DEFINED AUTOMATION SYSTEM

CROSS-REFERENCE TO RELATED APPLICATION(S)

This application claims priority to and benefit from the following US Provisional Applications: U.S. Application Ser. No. 62/370,686 titled "Deployment of Software Defined Network As Part Of Software Defined Automation" filed on Aug. 3, 2016; and U.S. Application Ser. No. 62/376,470 titled "Deployment of Software Defined Network As Part Of Software Defined Automation" filed on Aug. 18, 2016. The aforementioned patent applications are expressly incorporated by reference herein.

BACKGROUND

Communication networks (or simply networks) enable data communication. Data communication can be between computers, computers and peripherals and other devices. Industrial networks are different from traditional communication networks because they handle control and monitoring of physical processes that are often running in harsh environments, under real time and data integrity constraints, and with the expectation of continuous and reliable operation for safety and other reasons. Industrial communication networks are typically based on communication technologies/protocols such as: Ethernet, Modbus, ControlNet, DeviceNet, and the like.

While industrial networking has enabled almost everything on a factory floor to be connected, and has greatly improved data integrity and signal accuracy, it remains relatively static. For example, any modification, even a minor one, requires attention from a network engineer. Moreover, it is the network engineer who designs, deploys and defines the limitations of the network. As such, an industrial application developer has to live with the design decisions and consequent characteristics of the network. This dependence on the network means industrial application developers are often constrained by the network when developing industrial applications.

Industrial automation processes are becoming more large scale and sophisticated, with more data requirements. So, it is not a surprise that the industrial networks supporting such processes are also becoming increasingly difficult and complex. This presents challenges in terms of managing those industrial networks. These challenges are further compounded by the lack of centralization of the control elements of the network which makes industrial network management very complex. In such an environment, tasks such as configuring the network according to policies, and reconfiguring the network in response to changes, faults, or other operating parameters become very difficult, time consuming and cost prohibitive. To make matters worse, factory downtime becomes unavoidable when performing such tasks, leading to financial losses.

DETAILED DESCRIPTION

Figure 1A:
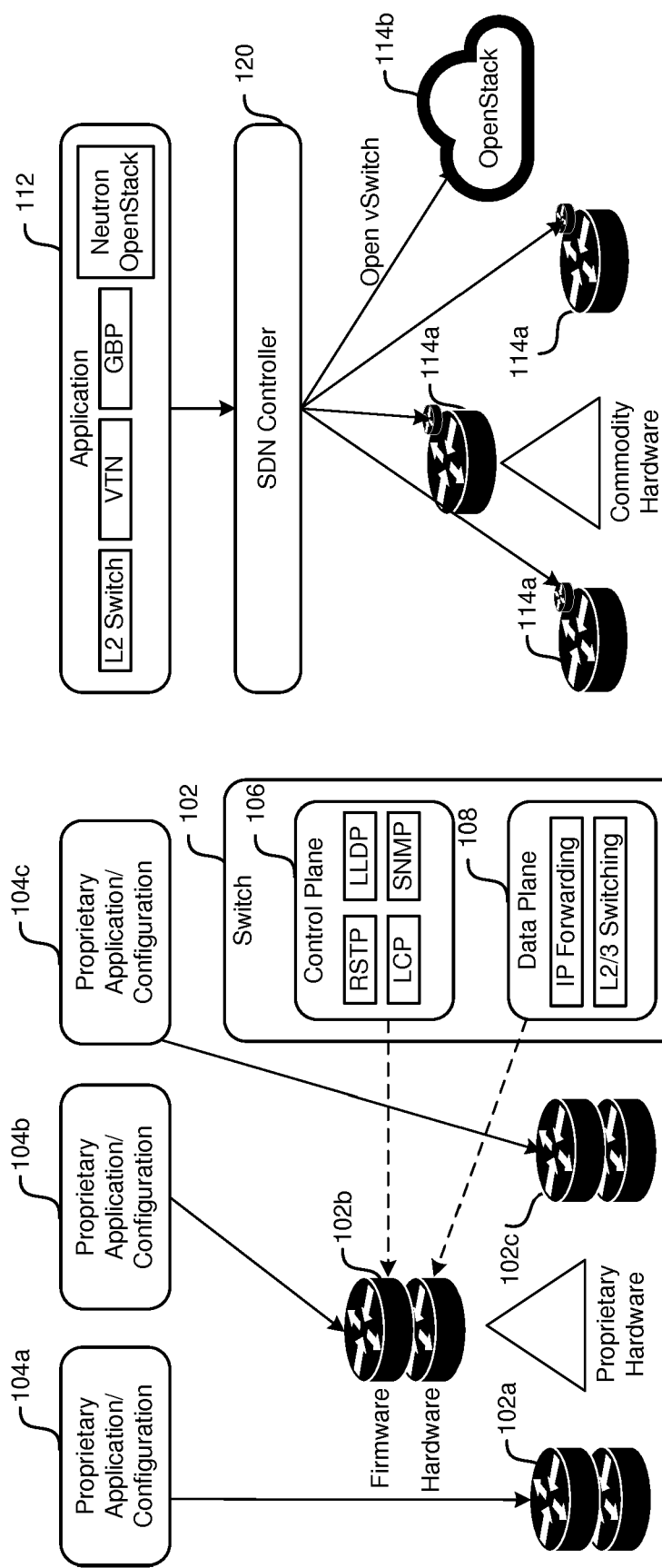
FIG. 1A is a block diagram illustrating traditional networking compared to software defined networking ("SDN").

This disclosure describes an architecture of a Software-Defined Network (SDN) for an industrial environment ("industrial SDN") and deployment of industrial SDN in a Software Defined Automation ("SDA") system.

The industrial SDN architecture as disclosed herein is an improvement over the traditional SDN architecture. While the industrial SDN architecture provides many of the advantages of the traditional SDN architecture, it also provides additional benefits including giving industrial application developers direct access to the network which enables them to (1) design industrial control applications without being constrained by the design of the network, and (2) program and monitor the network and utilize information about network events to not only maintain the network, but also manage industrial operations.

The industrial SDN deployed in an SDA system further enhances the SDA system via an industrial SDN application enabling the system to automate tasks that typically require great deal of network expertise, planning and time. For example, provisioning and commissioning of devices in an industrial network is typically a task that requires a network engineer. The SDA system deployed with industrial SDN disclosed herein ("SDA system") can securely provision and commission devices in compliance with network and security policies when the devices are first connected to the network, without requiring a network engineer or any user.

In order to fully appreciate the features and benefits of the industrial SDN architecture, and the SDA system deployed with the industrial SDN, a brief overview of the traditional SDN architecture and the SDA system are provided below.

1. Overview of SDN

SDN is a network architecture in which the system that makes decisions about where traffic is sent (i.e., the control plane) is decoupled from the underlying systems that forward traffic to the selected destination (i.e., the data plane). In simple terms, SDN makes network programmable. With SDN, network administrators can manage network services through abstraction of higher-level functionality.

SDN architecture is a layered architecture based on three basic principles:

(1) Decoupling of control and data planes: This principle allows for separate evolution of forwarding mechanism from network resource control. In other words, network control operates on abstracted forwarding mechanisms allowing for network elements to become a commodity.

(2) Logically centralized control: In SDN view, a controller is an orchestrator of network elements. Logically centralized control refers to a view of the network infrastructure as a holistic entity, giving SDN controller global control over all network resources i.e., controller behaves as a central management and control entity.

(3) Exposure of abstract network resources and state to external applications: Network as a virtual function is the main driver behind this principle. Separation of control and data planes allows for SDN controller to provide network abstraction to other controllers or applications, which is recursive abstraction of networks and its elements.

Referring to FIG. 1A, traditional networking architecture comprises of dedicated networking devices 102 such as, but not limited to: routers, switches, firewalls, and the like, provided by various vendors. Each network device 102 includes a control plane supporting various protocols and a data plane 108. This multi-vendor networking infrastructure warrants that each device 102a, 102b and 102c is managed individually using vendor proprietary interface 104a, 104b and 104c respectively, thus making provisioning, maintenance and de-commissioning extremely time consuming and costly. Use of specialized hardware, and at times customized protocols, warrants that networking features implementation and availability is dictated by vendors. It also follows vendor's business model and product life cycle rather than network deployment needs.

In contrast to traditional networking, SDN is characterized by decoupling of network control and forwarding functions. Network control or intelligence is logically centralized in a SDN controller 120, which enables network administrators to dynamically adjust network-wide traffic flow to meet changing needs. Moreover, even as the software-based SDN controllers maintain a global view of the network, it appears to applications, policy engines and/or other entities 112 as a single, logical entity. When implemented through open standards, SDN simplifies network design and operation because instructions are provided by SDN controllers 120 instead of multiple, vendor-specific devices and protocols. Each of the network devices 114a and virtualized network device (e.g., Open vSwitch) 114b comprise the data plane responsible for forwarding traffic.

Figure 1B:
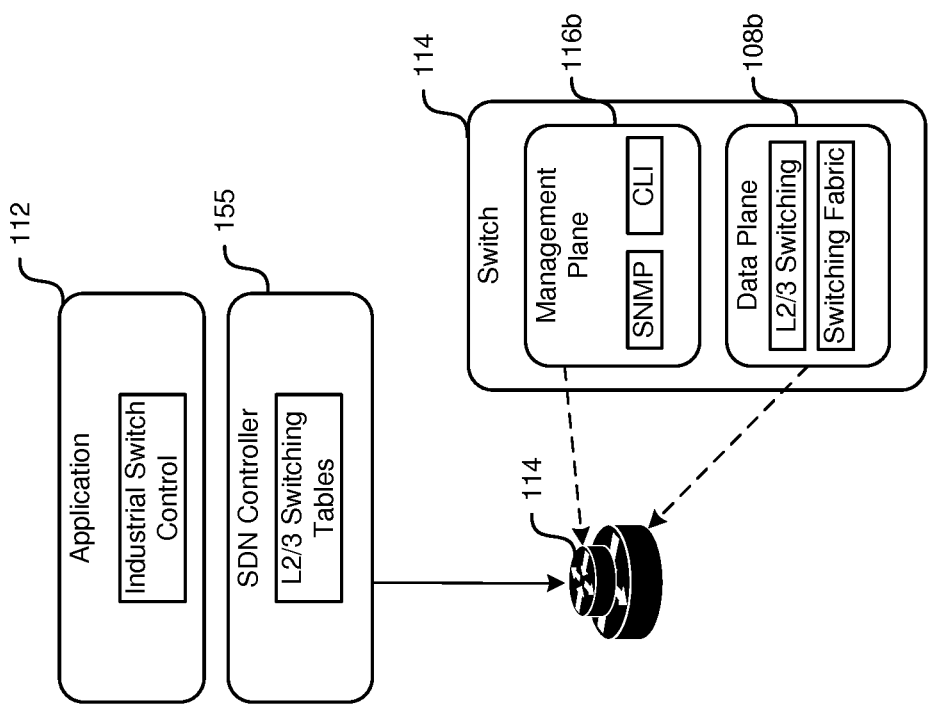
FIG. 1B is a block diagram illustrating a traditional network device implementation compared to a SDN device implementation.
Figure 1B:
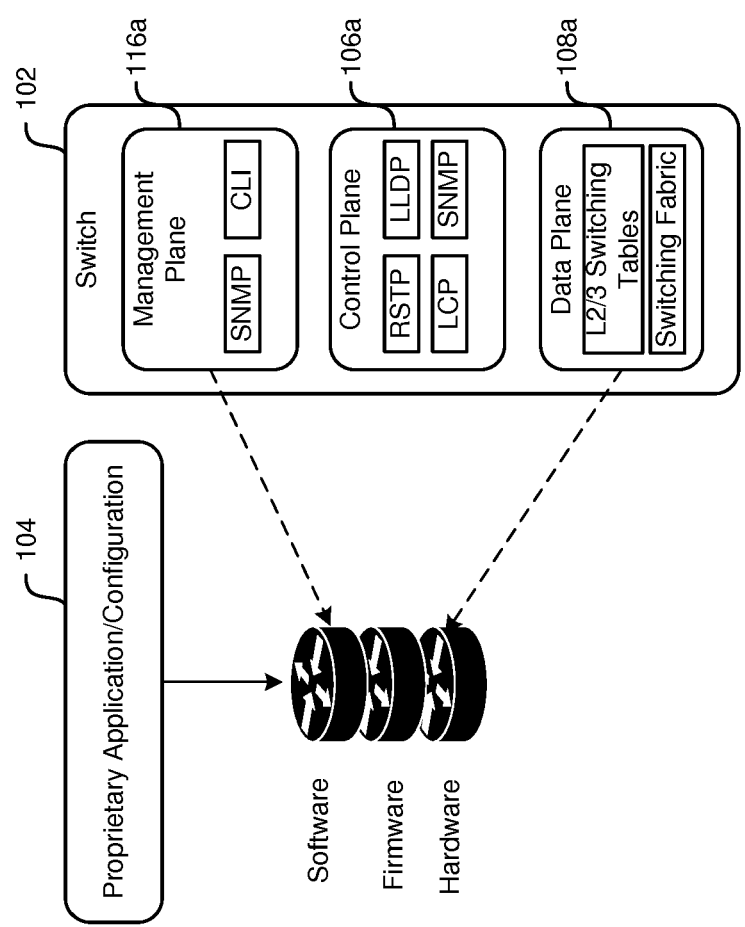

Referring to FIG. 1B, in a typical networking device 102 such as a router or a switch all intelligence is in the device itself. The device 102 is usually implemented in three planes: data plane 108a, control plane 106a and management plane 116a. Data plane 108 is the layer responsible for moving packets, and is usually implemented in provider proprietary hardware with fixed forwarding methodology and requires a proprietary application/configuration 104. Control plane 106a is the layer responsible for making forwarding decisions and exchanges of those with other devices. It may be implemented in hardware and/or firmware with vendor specific protocols and features. This type of implementation leads to existence of complex and dedicated networking devices. Management plane 116a is the layer that provides a management interface, and is usually implemented as software in form of command-line interface (CLI). CLI implementation is vendor specific, and hence difficult to automate in multi-vendor environment.

Contrary to traditional networking, the main approach in SDN is separation of control plane and data plane and connecting them, usually, with open protocol. This approach allows control plane protocols and requirements to be deployed separately from data plane thus creating an opening for generalization.

In an SDN device 114 implementation, the control plane can be implemented on general-purpose CPU, thus reducing complexity of networking hardware and removing complex implementation of protocols in firmware. Furthermore, the control plane is no longer tied to specific networking device hence consolidation of all devices' control planes is possible. This consolidation is what is known as the SDN controller 155. It is the SDN controller 155 that provides centralized network intelligence and enables holistic view of the network. Management plane 116b in an SDN device 114 is the SDN application 112 itself. This is the programmable part of SDN and it is targeted to provide freedom of network management and designs specific to users' network needs.

One of the most common protocols used by an SDN controller 155 to program underlying data plane 108b hardware is OpenFlow (OF). OpenFlow is vendor-neutral standard. One aspect of OpenFlow based SDN is that the data plane 108b operates on flows rather than static lookup tables like MAC table in switches or routing tables in routers. Flows in SDN are best described as pattern matching rules used for packet switching. The principle of reducing complexity of control protocols to one protocol and enabling flow-based lookups using high-speed memory such as ternary content-addressable memory (TCAM) is what can lead to simplification of infrastructure devices and use of commoditized hardware as network devices.

2. Software Defined Automation (SDA)

SDA provides a reference architecture for designing, managing and maintaining a highly available, scalable and flexible automation system. In some embodiments, the SDA technology enables control system(s) and associated software to be run inside of a fog platform or a private cloud. Control system(s) of varying degrees of complexity can be found in traditional manufacturing facilities, refineries, submarines, vehicles, tunnels, baggage handling systems, energy management systems, building management systems, flood water control systems, grid control systems and the like. By moving the entire control system(s) or at least a portion thereof to a fog platform or a private cloud, and providing a software interface to the control system elements, the SDA technology enables engineering tasks over the whole lifecycle of automation engineering such as design, programming, configuration, installation, running, maintenance, evolution and shut down to be performed in a simpler, more efficient and cost effective way.

I. Simplified Architecture

Figure 2:
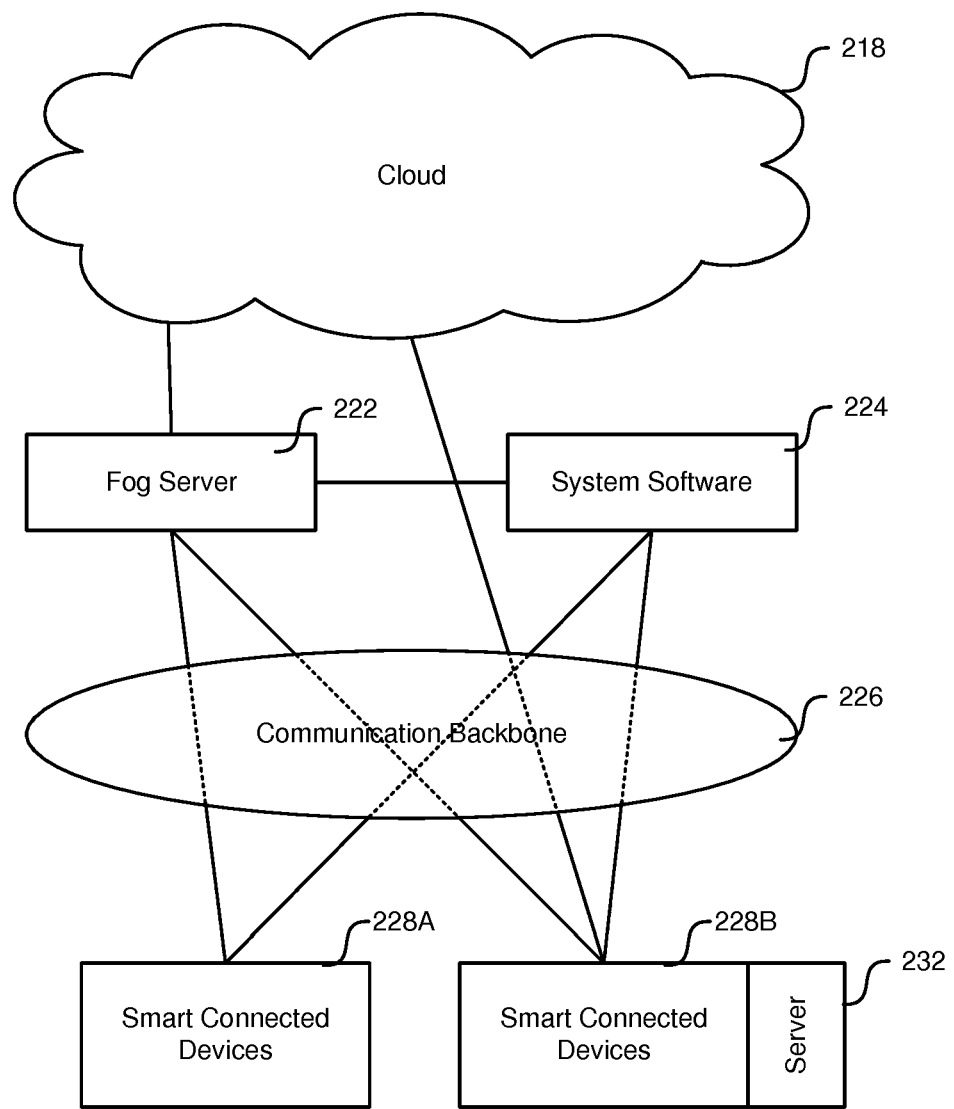
FIG. 2 is a block diagram illustrating a simplified architecture of a software defined automation ("SDA") system.

FIG. 2 is a diagram illustrating a simplified architecture of an SDA system in accordance with some embodiments. The architecture depicts a fog server 222 linked to a system software 224, and smart connected devices 228A, 228B that are communicatively coupled to the fog server 222 and the system software 224 via a communication backbone 226. The architecture also depicts that at least some smart connected devices 228B and the fog server 222 can be communicatively coupled to a cloud 218.

The fog server 222 is comprised of a collection of control resources and compute resources that are interconnected to create a logically centralized yet potentially physically distributed system for hosting the automation systems of an enterprise. The "fog server" or "fog platform" as used herein is a cloud management system (or localized subsystem or localized system or virtualization management platform) that has been localized into one or more compute and/or control nodes. In other words, the fog server 222 is cloud technology that has been brought down to the local ground or installation (hence the term "fog") in the form of one or more compute and/or control nodes to manage the entire automation system or a portion thereof. The fog server 222 enables virtualization by providing a virtualization infrastructure on which automation system(s) can be run and/or managed. The virtualization infrastructure includes compute nodes which execute hosts such as virtual machines, containers and/or bare metals (or bare metal images). The hosts, in turn, can execute guests which include applications and/or software implementations of physical components or functional units and an automation portal or system software 224. As used herein, virtualization is the creation of a virtual version of something. For example, a virtual component or a virtualized component (e.g., a virtual PLC, a virtual switch, network function virtualization (NFV)) represents a function that is executed on a host running on a compute node. It does not have a physical existence by itself. Fog server 222 need not be localized in a centralized control room; controllers, devices and/or servers 232 close to the sensors and actuators (e.g., IO device, embedded device) can also be considered under the management of the fog server 222. In some embodiments, the fog server 222 can also aggregate, store and/or analyze data, and/or report the data or analytics to the cloud 218. The cloud 218 can be an enterprise cloud (i.e., private cloud), public could or hybrid cloud. The system software 224 provides a single entry point for an end user to define (e.g., design, provision, configure, and the like) the automation system. One way to define the automation system is by managing distribution of applications/application functions where users want them to be executed.

The smart connected devices 228A, 228B (also smart connected products) monitor and/or control devices, sensors and/or actuators close to equipment/raw materials/environment by executing applications/application functions. In various embodiments, a smart connected device has the following features: (1) physical and electrical components, (2) firmware or a "smart" embedded part, and (3) connectivity and interoperability. In some embodiments, a smart connected device can also have a cybersecurity component that may be running remotely, or on board.

Some smart connected devices 228A can run applications or application functions ("applications") locally (e.g., the speed/torque regulation loop of a speed drive) because they have the processing capability to do so. This means that there is no need to execute those applications elsewhere (e.g., on a connected PC, a server or other computing devices) to get data to perform its functions. This has the advantage of faster response time (i.e., less latency) and savings on network bandwidth. Another advantage of on-board or local execution of applications is that it improves the consistency of data and the robustness of the architecture because the device can continue to produce information (e.g., alarm) or to log data even if the network is down.

In some embodiments, smart connected devices 228B can be wholly or partially executed in one or more servers (e.g., server 232, fog server 222). For example, a smart connected device 228B can be responsive to remote signals (e.g., remote method calls, application programming interface or API calls) as if an application is running locally, when in actuality the application is running remotely, for example in the fog server 222. In some embodiments, smart connected devices can capture real-time data about its own state and the state of its environment (e.g., the devices it is monitoring) and send such data to the fog server 222 and/or a remote cloud 218. In some embodiments, the smart connected devices 228A, 228B can transform the captured real-time data into information (e.g., alarms), store them and perform operational analytics on them. The smart connected devices 228A, 228B can then combine both monitoring and controlling functions described above to optimize own behavior and state.

The communication backbone 226 facilitates interaction between the fog server 222, the system software 224 and the smart connected devices 228A, 228B. The communication backbone (or the Internet of Things (IoT)/Industrial Internet of Things (IIoT) backbone) encompasses a set of network architectures and network bricks that enable physical and logical connections of the smart connected devices 228A, 228B, the fog server 222 and any other components that are part of the SDA architecture. For example, various equipment in a plant can be connected to each other and with the enterprise system (e.g., MES or ERP) using technologies based on various standards such as: Ethernet, TCP/IP, web and/or software technologies. The communication backbone 226 in the form of a unified global Industrial Ethernet backbone can provide: an easy access to the data, from the plant floor (OT) to the enterprise applications (IT), a flexible way to define different types of network architectures (e.g., stars, daisy chain, ring) fitting with customer needs, robust architecture that can fulfill requirements such as availability, safety and harsh environment support and the right information to the right people at the right time in one cable.

The communication backbone 226 includes a full Industrial Ethernet infrastructure offering switches, routers and/or cable system to address the needs of all topologies. The communication backbone 226 also supports a set of connectivity protocols based on standards based on various standards (e.g., Modbus/TCP-IP, Ethernet IP, OPC UA, DHCP, FTP, SOAP, REST etc.). The communication backbone 226 can also support a set of web functions offering functions like diagnostic, monitoring and configuration using standard web pages and device integration reference architecture that defines the patterns, brick to integrate group of devices to controllers at application level and network level for configuration, tuning and diagnostic. In some embodiments, cyber security elements can be built in to the architecture. The communication backbone 226 also adheres to a set of architecture rules structuring the architecture at performances (Quality of Service or QoS), robustness (RSTP and PRP HSR for redundancy) and safety level (IEC61508). In some embodiments, the communication backbone 226 also supports integration of a set of gateways to connect to legacy (i.e., non-Ethernet) equipment to the network.

The communication backbone 226 can use multiple protocols to provide multiple services to fill multiple needs. Some examples of communication needs and suitable protocols are listed in table 1.

TABLE 1

Services and Protocols

| Service | Protocol |
| --- | --- |
| Device to device | Modbus/EtherNet/IP, DDS, OPC UA, pub/sub |
| Device to control | Modbus/Eip, NTP, DHCP, FTP |
| Device to control for hard real-time | SercosIII, Profinet IRT, EtherCat |
| Control peer to peer | DDS, OPC UA, pub/sub |
| Control to control room | OPC, Modbus, TCP |
| Across architecture | Modbus/Eip, SNMP, SMTP, NTP, HTTP, FTP |

The networks in the existing systems are very segmented to allow guaranteed or reliable communication. The communication backbone 226 in the SDA architecture can overcome the problems of the existing systems through Software Defined Networking (SDN) and/or Time Sensitive Networking (TSN) technologies. As described previously, SDN technology enables separation of a network's control logic from the underlying network hardware or device (e.g., switches, routers) and logical centralization of network control. SDN technology can bring simplicity and flexibility in these networks allowing communication at and through different layers driven by network policies. TSN technology adds a set of capabilities to standard Ethernet to provide real time capability and time guaranteed exchanges in areas or through the whole architecture. Moreover, cybersecurity solution can also be integrated and adapted to the SDA architecture.

II. Functional Architecture

In some embodiments, the SDA architecture enables management of an automation system via a set of controllers which provide system wide management of the resources. These controllers constitute the control resources of the fog server and provide a homogenous method to manage the entire system. A system administrator can interact with these controller nodes for the initial setup, system extension, diagnostic, maintenance, and the like. Similarly, applications executing in or outside the system can interact with these controller nodes to manage specific facets or functions in the system (e.g., ICS tool, Network tool, electrical system tool), manage compute resources (e.g. monitoring, management of other applications and/or resources), and the like. This functional view of the SDA architecture is depicted in FIG. 3.

Figure 3:
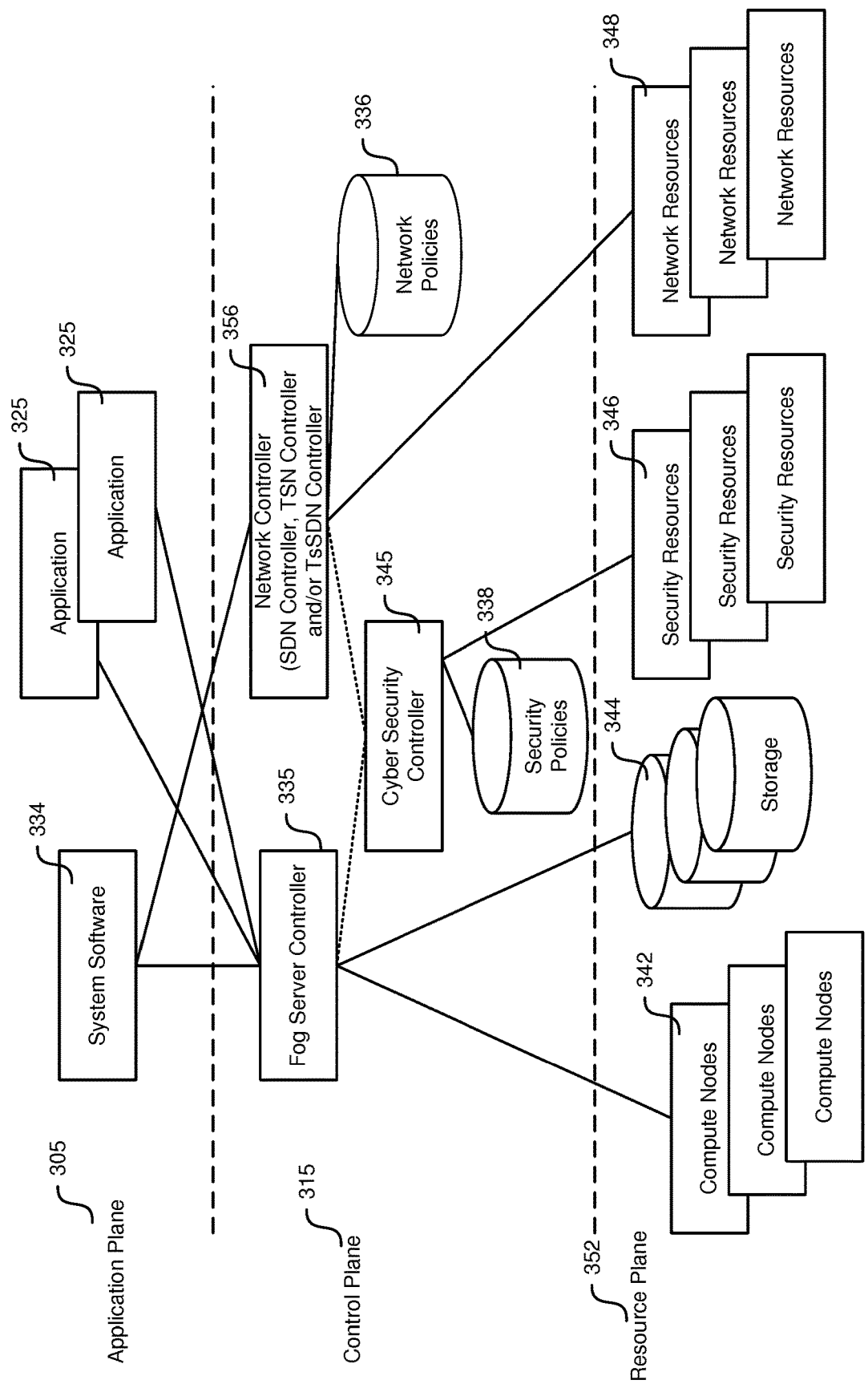
FIG. 3 is a block diagram illustrating a functional architecture of an SDA system.

The example functional view of an SDA system depicted in FIG. 3 includes an application plane 305, a control plane 315 and a resource plane 352. The application plane 305 encompasses the system software 334 and software components or applications 325 that are executed in the system and which both use and manage a set of resources of the system. The control plane 315 includes a set of controllers including a fog server controller (or fog controller or virtualization management controller) 335, a network controller 356 and a cybersecurity (CS) controller 345. As used herein, the network controller 356 can include an SDN controller, a TSN controller, or a TsSDN controller, which incorporates time domain in the SDN controller. TsSDN controller and its role in providing guaranteed deterministic communication is described in a related PCT Application No. PCT/EP2017/068213 filed on Jul. 19, 2017 which is herein incorporated in its entirety. These controllers provide a standardized set of interfaces to the applications in the application plane 305 to access and/or manage the resources in the resource plane 352 of the system. In some embodiments, the controllers also provide diagnostics, availability management, and the like. The network controller 356 can manage and distribute network policies 336 at the system level. Similarly, the CS controller 345 can enforce security policies 338 at the system level.

In some embodiments, these controllers can have a hierarchical relationship with one another. For example, an SDA system can include a top-level controller (not shown) and a set of centralized controllers (e.g., fog controller 335, the network controller 356 and the CS controller 555), each controlling a building or a site. The top-level controller can for example distribute policies to the centralized controllers to enable those controllers to control their own building or site. The virtualization environment supports hierarchical distribution of the controllers.

The resource plane 352 can include network resources 348, compute resources represented by compute nodes 342, storage resources 344 and security resources 346. The system software 334 and applications 325 are executed in computes nodes 342 managed by the fog controller 335. The computes nodes 342 which provide the compute resources to the system can be physically distributed and managed by the fog controller 335. For example, some compute nodes in the form of servers are located in the fog server or private cloud while other compute nodes such as smart connected devices operate at the edge. Network resources 348 can either be virtual network resources in the fog server, physical infrastructure resources in switching/routing hardware or infrastructure resources located in smart connected devices. Storage resources 344 can be databases and/or other devices for storing virtual images, volumes, applications, process data, state data, and the like. Security resources 346 can include security components residing on the compute nodes 342, storage nodes 344, and/or standalone components that provide security services such as enforcement of security policies, intrusion detection and protection, and the like.

Controllers orchestrate and monitor some or all of the resources of the system. Applications managing the system (e.g., system software 540 or automation portal, Network administration tool, etc.) send requests to the system to apply specific strategies. For example, the system software 334 can be used to deploy a new PLC connected to a set of devices with specific real time network requirements, security requirements and availability/resilience requirements. In some embodiments, applications correspond to software/firmware implementations of components. These applications can be deployed on compute resources and can use storage resources and network resources to communicate.

III. SDA System

Figure 4A:
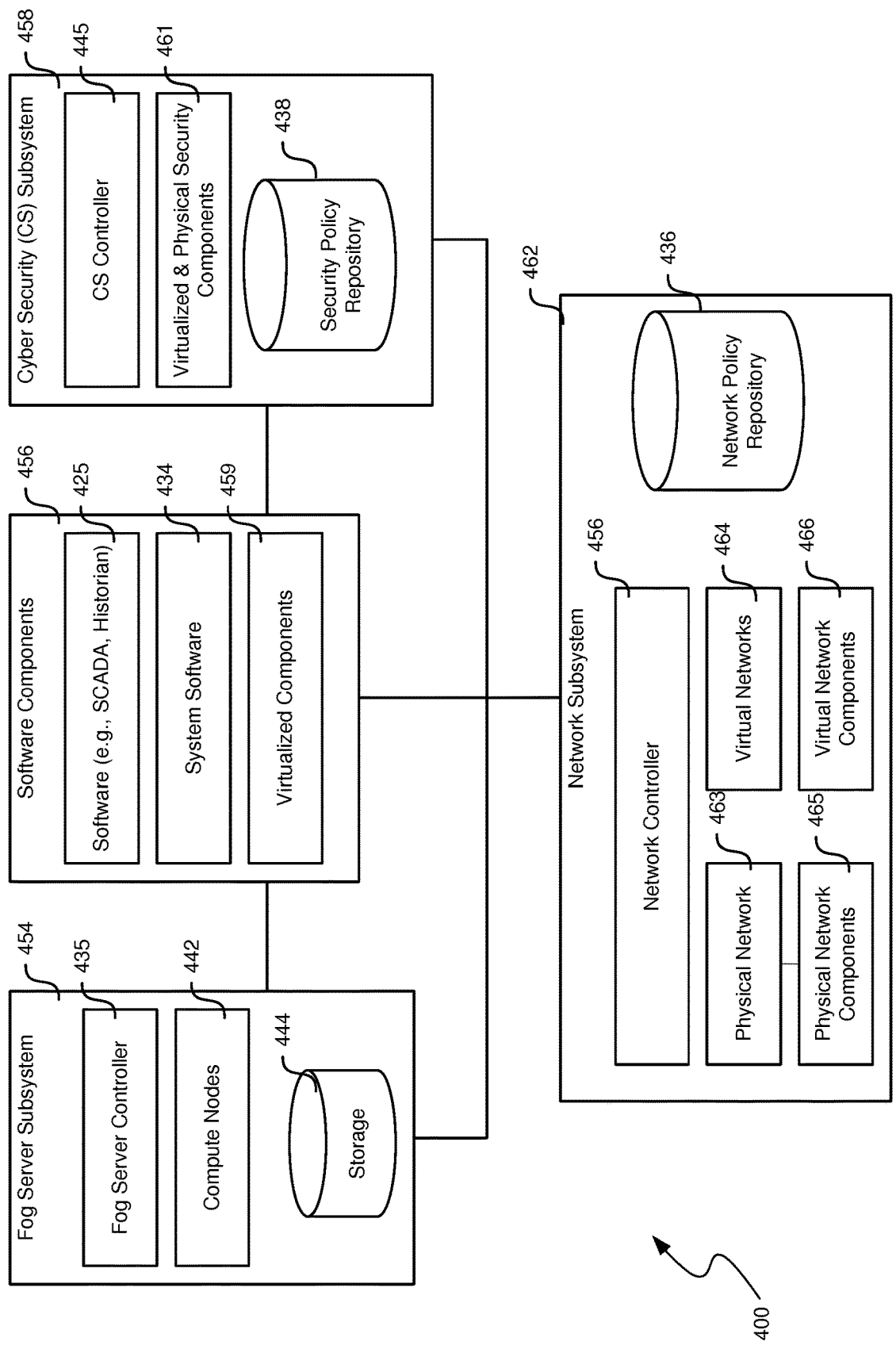
FIG. 4A is a block diagram illustrating subsystems of an SDA system.

An SDA system comprises of various subsystems that work together to provide a fully integrated solution for creating, managing and operating automation systems. FIG. 4A is a block diagram illustrating the subsystems of an SDA system in accordance with some embodiments. An SDA system 400 in some embodiments includes a fog server subsystem 454 ("fog server") having a fog controller or redundant fog controllers 435, one or more compute nodes 442 and storage 444. The SDA system 400 also includes software components 456. In other embodiments, the SDA system 400 can further include a cybersecurity ("CS") subsystem 458 having a security controller or redundant security controllers 445, physical and/or virtualized security components 461 and a security policy repository storing CS policies 438. In yet other embodiments, an SDA system 400 can also include a network subsystem 462 having a network controller or redundant network controllers 456, physical network 463, physical network components 465, virtual networks 464, virtual network components 466 and a network policies repository storing network policies 436.

The fog server 454 provides a virtualization environment on which automation system(s) can be run and/or managed. The fog server 454 comprises compute nodes 442 which provide logic processing capabilities and can host applications, databases and the like with a high level of elasticity. Non-limiting examples of compute nodes include: servers, personal computers, automation devices including smart connected devices and the like.

The fog server controller 435 utilizes a fog server management software to perform its functions. The fog server management software can be based on cloud management software such as OpenStack. Cloud management software such as OpenStack in their standard/off-the-shelf form are typically used in the Information Technology (IT) world for data center management. Automation system management, however, involves different set of challenges. For example, some automation systems can run time-critical and/or safety-critical applications that need deterministic guarantees with respect to delay, reliability and/or other factors. Consider an automated cheese slicing system where a high speed synchronized motion between a knife blade slicing through a cheese block and the movement of the cheese block is critical to produce cheese slices of uniform thickness. If there is any processing or network delay, it can result in cheese slices of different thickness, resulting in wastage and loss of productivity.

The fog server controller 435 manages all aspects of the virtualization environment and the complete life cycle of the compute nodes 442. For example, the fog server 454 can stand up and stand down hosts such as virtual machines, containers or bare metals on compute nodes, and create and destroy virtualized components 459 and virtual networks 464. A virtualized component/element/instance 459, as used herein, is a logical equivalent of a physical device or a portion of the physical device it represents, implemented as a software entity to run inside of the fog server 454. Virtualized components 459 can also include software components such as applications and/or application functions running on a host (e.g., a virtual machine configured with an application is a virtualized component/element/instance).

The fog server controller 435 can provide high availability (HA) through redundancy of the controller and management of compute node failures. The controller can also manage startup, shutdown and patching of the individual compute nodes. In some embodiments, the fog server platform can provide support for high availability of virtualized components. In some embodiments, the fog server 454 can include a storage node or data store 444. The storage 444 can store virtual images, volumes (i.e., hard drive of an instantiated image), application and process data, and the like.

The software components subsystem 456 can include virtualized components 459 that are hosted by the virtualization ecosystem of the fog server 454. The software components subsystem 456 can also include virtualized instances of software 425 that run within the virtualization environment (e.g., software for programming, configuration, and/or management (e.g., Unity, SoMachine, SCADA) that are used to program, configure, manage or otherwise interact with automation devices. In some embodiments, the software component subsystem 456 can also include a system software 434 (also called automation portal) that provides a single interface for managing topology, inventory, configuration, programming, control, and/or diagnostics of the automation devices and/or the automation system as a whole.

Through the system software 434 users can access various applications for system definition and system management over all life cycle phases. For example, the system software 434 can be used to configure and parametrize equipment during the engineering phase and tune, program, and/or diagnose equipment during the maintenance phase. Some of the benefits of the system software 434 includes simplicity and ease for end users and cost reduction as all aspects of any equipment in an automation system can be managed from a single portal. In addition to providing a single entry point to the entire system, the system software 434 also presents a consistent user interface and user experience, which help reduce inconsistency and increase efficiency and productivity.

The CS subsystem 458 includes an associated CS controller or redundant CS controllers 445 and virtualized and/or physical security components 461. The security subsystem 458 provides a holistic cyber-security solution through security policies and security components such as intrusion detection/protection systems, virtualized next generation firewalls, certificate authority and identification systems, and the like. The CS controller 445 disseminates security policies to the virtualized and/or physical components 461 to ensure that necessary security protections are put in place. In some embodiments, the CS subsystem 458 can also provide security policy and authentication services to other components and subsystems. The security policies of the CS system 458 can be stored in a security policy repository 438 in some embodiments.

The network subsystem 462 includes the Ethernet network infrastructure for the entire SDA system solution. In some embodiments, the network subsystem 462 is an SDN network subsystem having an SDN controller or redundant SDN controllers as the network controller 456. The SDN network provides separation of network's control logic from the underlying network hardware (e.g., routers, switches) and logical centralization of network control through the SDN controller. This means that the SDN controller can disseminate network policies throughout the network infrastructure (i.e., physical network 463 and physical network components 465 as well as virtual networks 464 and virtual network components 466) to control connectivity, bandwidth and latency, Service Level Agreements (SLAB) (e.g., re: deterministic response time/transfer time), traffic flow control, etc., and the network hardware can implement those policies. The network policies of the network subsystem 462 can be stored in a network policy repository 436 in some embodiments.

In some embodiments, the network subsystem 462 can comprise a mesh radio network. In mesh radio network, each node can connect to at least two other nodes with data being passed from node to node in a process called hopping. Because the nodes themselves serve as routers, radio mesh networks typically do not require designated routers. However, some mesh radio networks include one or more mesh routers along with the mesh nodes to relay traffic on behalf of other mesh routers and/or mesh nodes. In some embodiments, the network subsystem 462 can comprise virtual circuits on a high-speed radio frequency (RF) mesh or hybrid network with communication facilitated by only the radio transceivers of the nodes, without any external devices. Thus, in some embodiments, configuration of network elements of network subsystem or network infrastructure can include configuration of the mesh nodes and/or mesh routers (e.g., OpenFlow enabled mesh routers) in the mesh radio network.

In some embodiments, the network subsystem 462 can be a Time Sensitive Network (TSN) subsystem having a TsSDN controller or both the SDN and TSN controllers as the network controller 456 and network infrastructure including TSN capable network devices. The TSN network subsystem ensures that mission critical and time-sensitive data are transferred/shared as per predefined maximum deterministic transfer time and with high reliability. In various embodiments, the network controller 456 can be a native fog server virtual network controller, a traditional network management system controller, an SDN controller, a TSN controller, a TsSDN controller and/or any combination thereof.

Figure 4B:
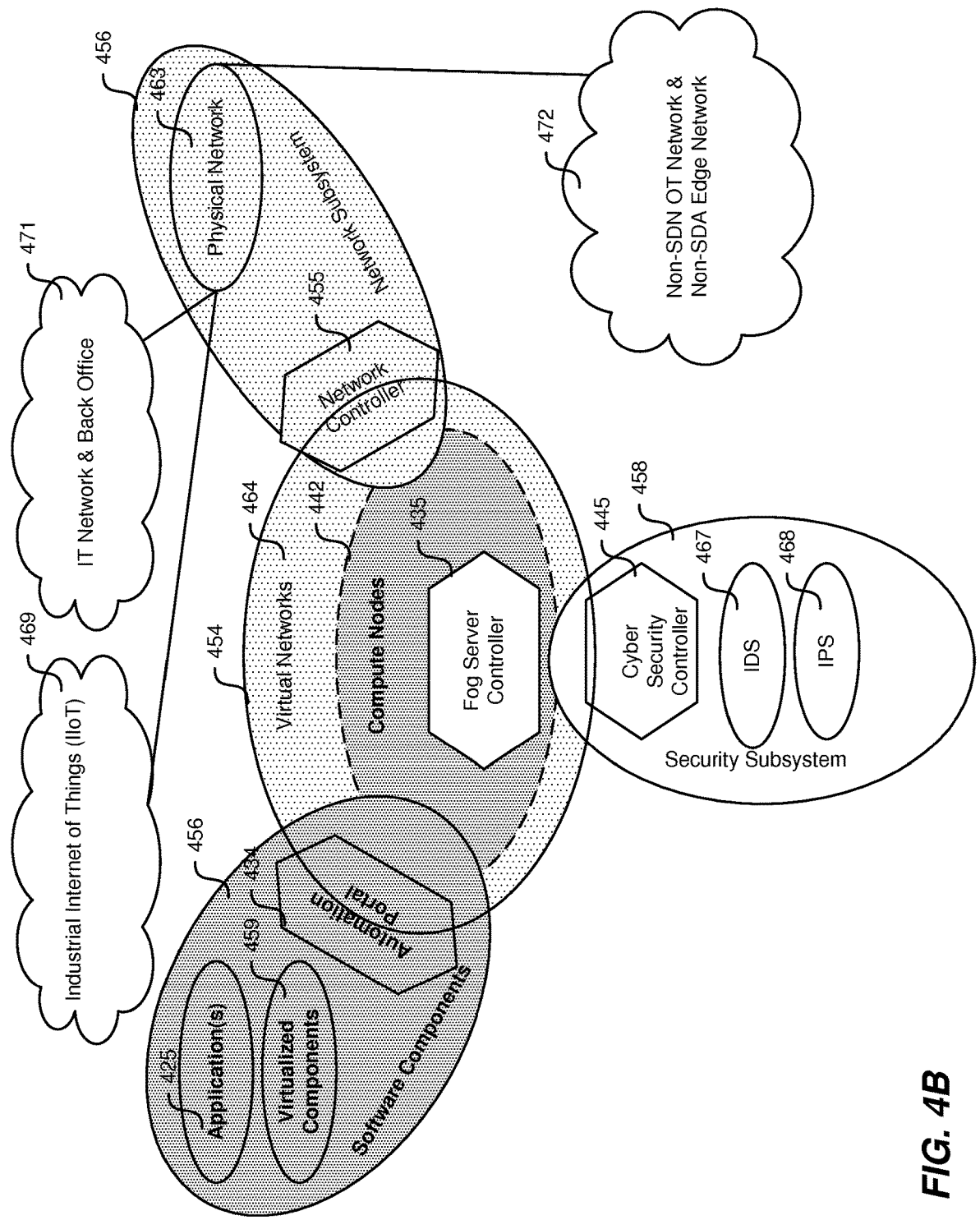
FIG. 4B is a block diagram illustrating the scope of control of each SDA subsystem of FIG. 4A.

The roles of the subsystems in the SDA solution complement each other to provide a fully integrated solution. Specifically, the fog server 454 can interact with each of these subsystems through hosting virtualized elements of the subsystem and/or through the control functions of the subsystem. While the fog server 454 has integral relationships with each of the SDA subsystems, the SDA subsystems are not considered within the scope of the fog server 454. FIG. 4B is a diagram illustrating the scope of control of each of the SDA subsystems in accordance with some embodiments.

The realm of the fog server 454 is the fog controller 435, the compute nodes 442 and management of the virtualized components 459 within the fog server 605. The virtualized components 459 and software 425 (e.g., historian, SCADA, SoMachine, Unity) are not within the scope of control of the fog server 605, but under the scope of control of the software components subsystem 456. The software components 456, through the system software/automation portal 434, however interact with the fog controller 435 and compute nodes 442 to provide configuration and control inputs to the fog server 454 and/or other subsystems to drive their operation.

To provide a system wide solution, continuity of the network control extends to include both the virtual and physical components of the network. Therefore, the realm of the network subsystem 462 includes not only the physical network components 465 and the physical network 463, but also the virtual networks 464 and the virtual network components 466 which are created and exist within the fog server 454. This requires full integration between the network subsystem 462 and the fog server 454 to provide the mechanisms to exercise this control. For example, the fog server controller 435 can create the virtual networks 464 in the fog server 454 and control connectivity between the virtual machines/containers hosted on the compute nodes 442 and the virtual networks 464, while the network controller 456 can configure the virtual network components 466 of the virtual networks 464 in accordance with one or more network policies. This level of integration requires orchestration of instantiation and deletion sequences as, clearly, the virtual network 464 must exist before the virtual machines and containers can be connected.

The CS subsystem 458 has control over security components such as intrusion detection systems (IDS) 467, intrusion protection systems (IPS) 468 (e.g., virtualized next generation firewalls) and the like as well as the CS controller 445 that disseminates security policies to different entities. The CS subsystem 458 can be integrated with all aspects of the SDA system solution in some embodiments. For example, the network controller 456 can utilize the security services provided by the CS subsystem 458 to provide security configuration information to the network components (e.g., physical or virtual) within its scope. In some embodiments, the fog server 454 can utilize this service to authenticate logins, provide security polices for host (virtual machine, container, bare metal) configurations, validate host images before instantiation, and the like.

In some embodiments, certain subsystems can be considered as being external to the SDA system solution. These external subsystems include non-SDN OT network and non-SDA edge devices 472 (e.g., legacy devices) and IT Network and back office equipment 471. In some embodiments, Industrial Internet of Things (IIoT) 469 or other a cloud based service may be considered external to or a part of the SDA system solution.

3. SDN for Industrial Environment

Networking in industrial environments is highly complex and costly to deploy, manage and upgrade, requiring skilled network engineers. For example, consider a task of adding a new industrial device to a plant and connecting it to the plant network. Such a task generally requires a careful selection of a port where the device is then plugged in, followed by sending pings (e.g., SNMP pings) to interrogate the device to ensure that the device is properly connected to the network and is responsive. A network engineer who is performing this task not only needs to know about network protocols and such, but must also be familiar with how the plant network is laid out (e.g., to determine where to plug in the device). Even after the device is connected to the network, the network engineer may need to perform further configurations to ensure that the device can talk to only those devices it needs to (e.g., via access control list (ACL) configuration, MACSecurity). Thus, the entire process of adding one new device to an existing plant network is a task that is neither simple, nor instantaneous. For a more complex task, such as deploying a new automation system, it is not difficult to surmise that many hours or days of careful planning may be needed before a network for the system can be created. For example, how many routers and firewalls to deploy, what type of network topology to select, how to achieve isolation of logical units or devices, and the like.

By way of another example, consider a situation in which a network problem arises in a plant that has a fully redundant network. A plant manager, for example, would not know how to diagnose and resolve the network problem. The plant manager would also not know how to assess the severity of the network problem. For example, is the network problem related to loss of redundancy where an inaction could potentially cause the production to halt if the second network also goes down, or is the network problem merely an issue that will not impact production? Not knowing what a network problem translates to in a language that decision makers understand can mean that plant managers are unable to control the level of production. For example, in the above scenario, a plant manager can choose to ignore the network problem related to loss of redundancy. However, when the second network goes down, production is halted for a few hours until the network problem is fixed, and the plant is restarted, all of which can cost thousands of dollars. If the plant manager could only understand what the loss of redundancy meant in terms of cost, or time, he or she could have made the decision to immediately call a network engineer to fix the problem, instead of delaying it. Similarly, if the network problem is merely an issue that will not impact production, the plant manager could delay repair until the next scheduled maintenance.

The architecture, systems and methods disclosed herein (hereinafter "disclosed technology") solve these and other problems by bringing simplification to network management. In some aspects, the disclosed technology makes it easier to instantiate, deploy, maintain and manage industrial networks. It becomes no longer necessary to understand how the network is laid out, or which port to plug an industrial device into. Instead, a device could be plugged in anywhere in the plant network, and the disclosed technology would automatically detect the device, determine its capabilities, provision a network path in accordance with security policies to enable it to communicate with other entities in the network, and commission the device to begin execution.

The disclosed technology makes the network programmable, which in turn makes it possible to bring network engineering domain into an industrial application domain and make it an integral part of overall industrial application design. In other words, industrial application developers would not have to be limited by the network design or decisions of the network engineer. Industrial application designers would have direct programmable access to process events such as: application response time (ART) degradation, connectivity loss, security breach and many others. The industrial application designer would also have the ability to segment network based on industrial functions rather than network capability, or worse, network design. In this manner, the industrial application would become adaptable to a network state with "end to end" network visibility and control.

Through orchestration, an aspect of the disclosed technology, an industrial application designer would have the ability to transparently instantiate network level services on demand (e.g., through industrial SDN application) for Network Function Virtualization (NFV). Examples of such services include but are not limited to: cybersecurity services such as: deep packet inspection (DPI) and firewalls, load balancers, traffic analyzers, NAT, proxy services, routing, and the like. Instantiating network function as virtualized service at the correct time and place is the responsibility of the industrial SDN application (ISDNA) which is described in detail in reference to FIGS. 7C-7E. Providing adequate policy based connectivity between elements, virtual or real, can be achieved using service function chaining (SFC).

4. Industrial SDN Architecture

Figure 5A:
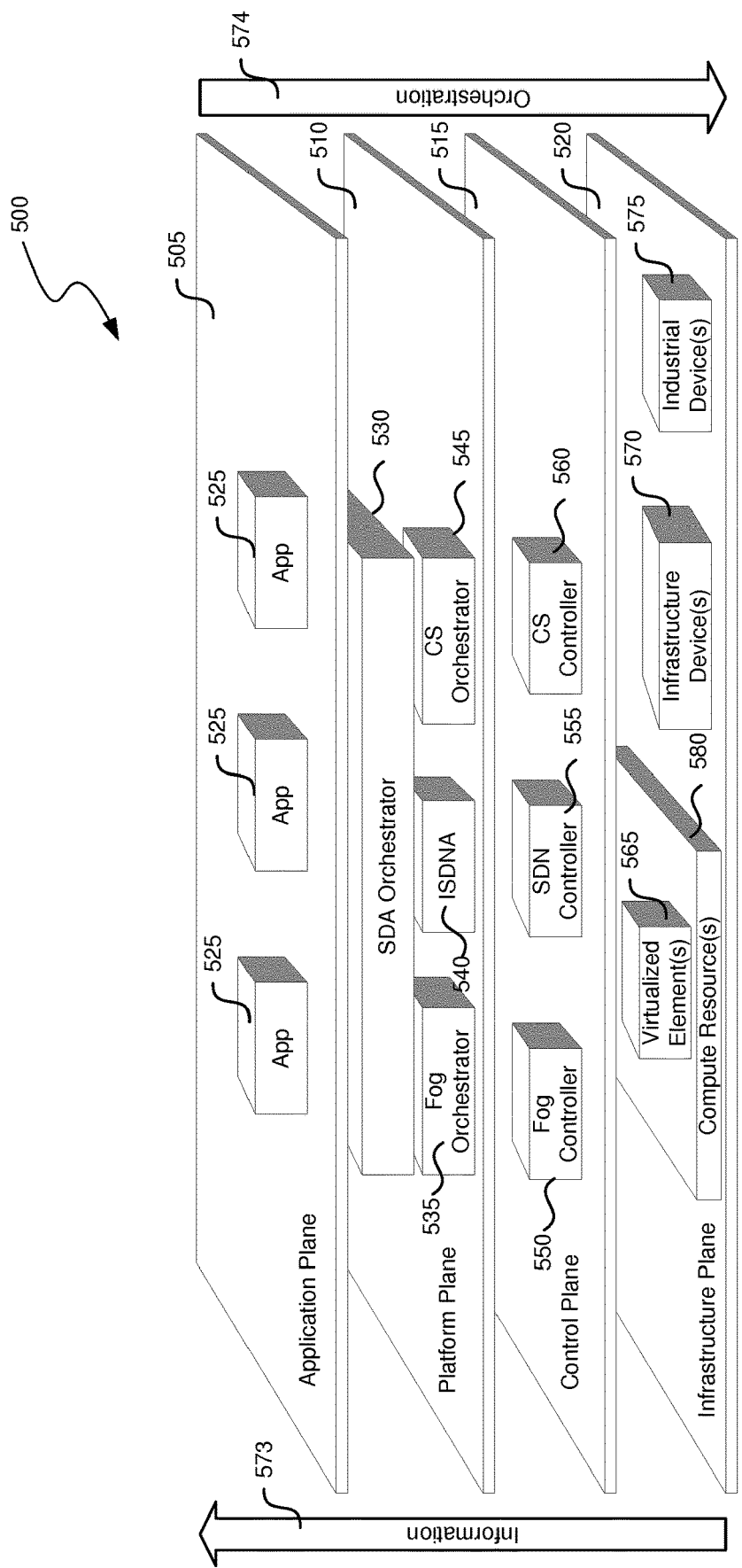
FIG. 5A is a block diagram illustrating industrial SDN architecture in planes in accordance with some embodiments.
Figure 5B:
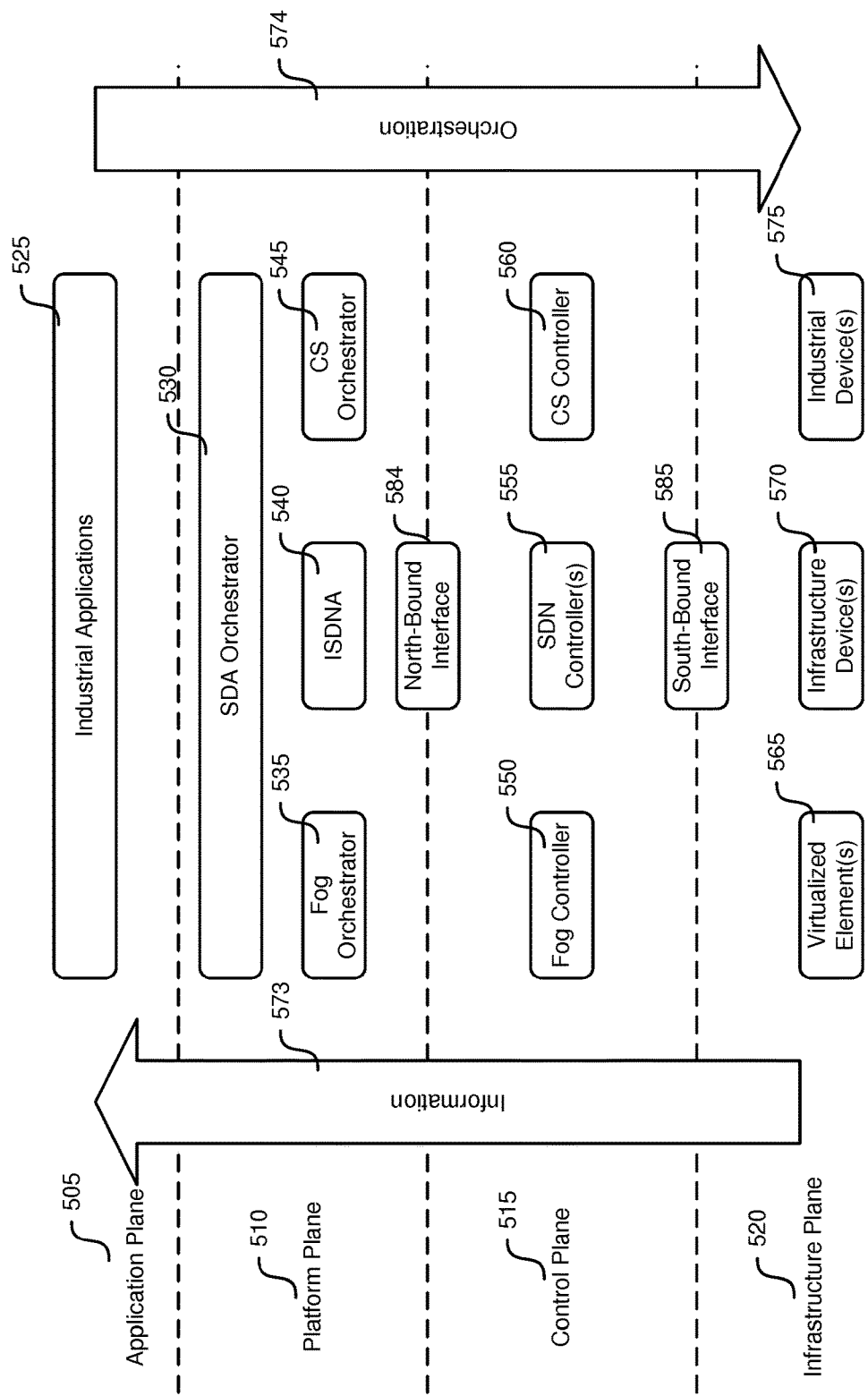
FIG. 5B is a block diagram illustrating industrial SDN in layers in accordance with some embodiments.

An industrial SDN architecture 500 can be depicted as being composed of several different planes and layers as illustrated in FIGS. 5A and 5B respectively. Referring to FIG. 5A, the plane-oriented view of the industrial SDN architecture comprises of four planes each of which are described below.

I. Application Plane

The application plane 505 in the industrial SDN architecture implements industrial control applications 525. Industrial control applications (or simply industrial application) and SDA control applications (or simply SDA applications) are used interchangeably in this disclosure. Industrial control applications are developed with software for industrial application development. One example of an industrial control application that resides on this plane 505 is a program that achieves conveyor belt function with options for start and stop, fault detection and simple item counter developed by an industrial application developer. The conveyor belt function may be developed using other control applications such as a PLC control application (e.g., to control a set of I/O points) and a motor controller application which may then be programmatically linked together to form the conveyor belt application. The industrial applications 525 in this plane are part of the software component 456 in FIG. 4A. The industrial applications 525 can be considered the source of information and requirements for industrial SDN.

II. Platform Plane

The platform plane 510 implements a set of software and application programming interfaces (APIs) that define an interface to an industrial application 525 in the application plane 505 to the north and expose programmatic access to the controllers (550, 555, 560) in the control plane 515 to the south. The platform plane 510 components include a fog orchestrator 535, an industrial SDN application (ISDNA) 540, and a CS orchestrator 545. A top-level application or service known as SDA orchestrator 530 hides much of the complexity of the orchestration and control, and exposes an API that industrial application developers can leverage to develop industrial applications 525.

III. Control Plane

The control plane 515 implements entities that control the devices in the infrastructure plane 520. The platform plane 510 orchestration components orchestrate the SDN and/or other control elements to achieve functions of an industrial application 525. The control plane 515 comprises of a fog controller 550, an SDN controller 555 and a cybersecurity (CS) controller 560. It should be noted that each of these controllers represents a logically centralized control system. For example, in an example system multiple SDN controller nodes may be physically distributed, but together they represent a logically centralized SDN controller. The SDN controller 555, not only manages physical networks, but together with the fog controller 550 manages virtual networks as well. The CS controller 560 manages security policies and collaborates with both the fog controller 550 and the SDN controller 555 to enforce security policies. It should be noted that in some embodiments, the control plane 515 may include a TsSDN controller, or both a SDN controller 555 and a TSN controller. In such embodiments, the platform plane 510 may comprise a corresponding orchestrator component(s). Aspects of the fog controller 550, SDN controller 555 and the CS controller 560 have already been described in reference to FIG. 4A (e.g., fog controller 435, network controller 456 and CS controller 445).

IV. Infrastructure Plane

The infrastructure plane 520 realizes communication by providing physical and virtual network connectivity. It comprises of every device in a network that is participating in the network as an originator, consumer or transient of information (i.e., device that pulls/pushes information). These devices can be industrial devices 575 and infrastructure devices 570. Industrial devices 575 include those devices that perform an industrial or automation function or a portion thereof. For example, a PLC, an I/O module, a motor, a drive, etc., that are needed to implement automation functions. Infrastructure devices 570 include networking equipment such as switches, routers, middlebox appliances, and the like. There are two types of infrastructure 570 and industrial devices 575—virtual and real. Virtual devices (or virtualized elements) 565 run on hardware such as servers, PCs, and the like. A PLC that is running on a server, and that has no physical manifestation is an example of a virtual industrial device. Similarly, Open vSwitch, which is a software implementation of a multi-layer network switch is an example of a virtualized element 565 hosted on a compute resource 580. A real device on the other hand is a hardware device. Examples of a real infrastructure device includes SDN controller devices such as NoviSwitch 1248 from NoviFlow and BlackDiamond X8 from Extreme Networks. These infrastructure devices, in contrast to traditional networking devices are simple forwarding devices without embedded control. The network intelligence from these devices is logically centralized in the SDN controller 555 in the control plane 515. In some embodiments, real infrastructure devices 570 can include legacy network devices that may not be capable of SDN control.

Industrial SDN planes are connected with two notions of responsibility: orchestration 574 and information 573. Orchestration includes responsibility for automated arrangement, coordination, and management of complex networking elements and protocols. Information includes responsibility for collection, analysis, interpretation, presentation, and organization of network information which in turn enables an industrial application to programmatically react to network conditions.

Network centric view is defined by the Open System Interconnectivity (OSI) network view. It is natural to describe a network in layers and usually using bottom up approach. For example, a network can be described as comprising 3 devices and 10 switches connected into a mesh, loop-less topology is ensured using RSTP protocol; and devices communicate using EIP protocol. The industrial SDN architecture as depicted in FIG. 5B is composed of seven layers, each having its own specific functions. These layers include: infrastructure layer, south-bound interface, control layer, north-bound interface, ISDNA, fog and SDN orchestration layer, SDA orchestration layer and industrial application. In some embodiments, ISDNA, fog, SDN and SDA orchestration can be considered to be a part of the orchestration layer.

As per networking customs, and for ease of understanding, each of the different layers of the industrial SDN architecture spread across the four planes depicted in the layer-oriented view of the industrial SDN architecture will now be described in bottom up fashion from hardware to industrial application.

I. Layer 1: Infrastructure Layer

The industrial SDN infrastructure comprises infrastructure devices 570, industrial devices 575 and virtualized elements 565. Each of the components of the infrastructure layer will now be described in detail in reference to FIGS. 6A-6D.

Figure 6A:
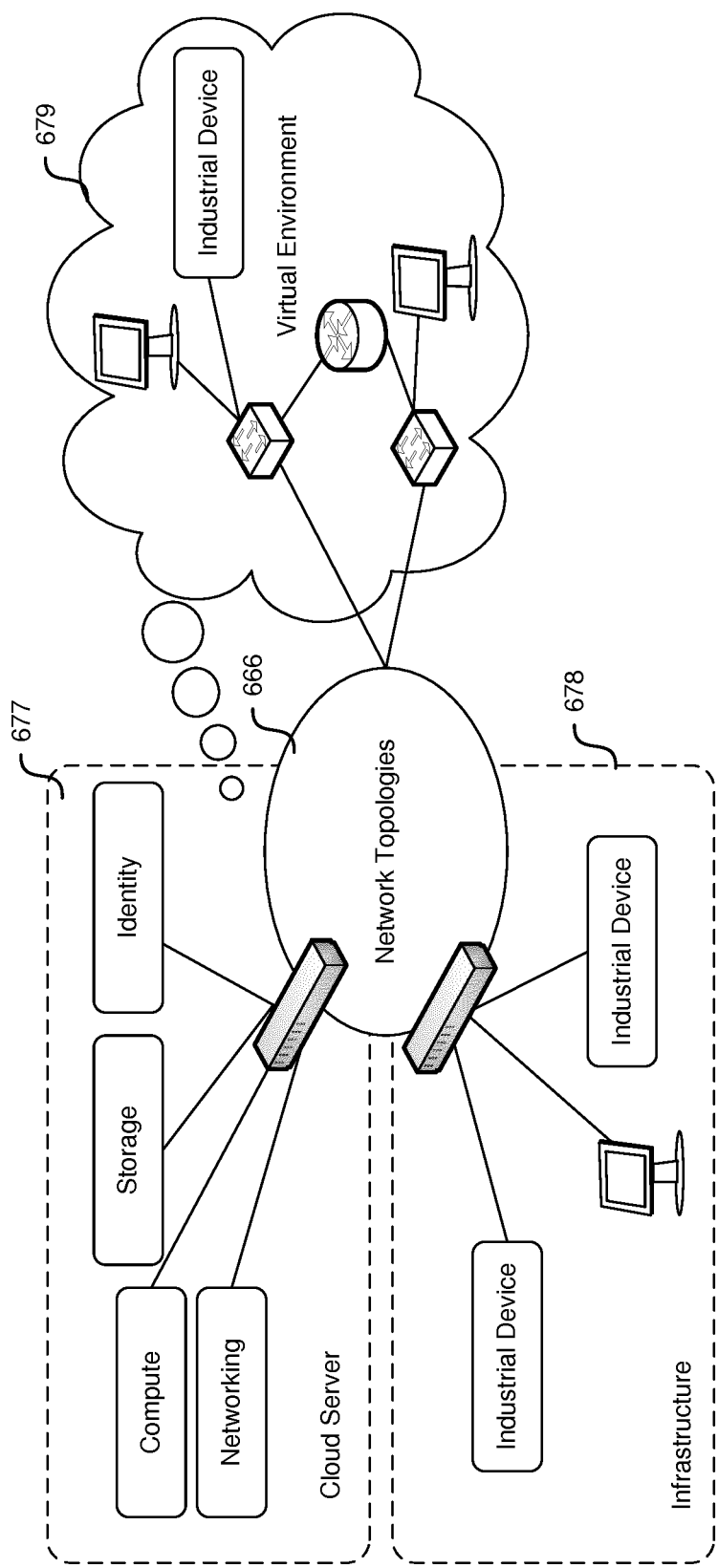
FIG. 6A is a block diagram illustrating SDN control domain.

The entire SDN control domain as illustrated in FIG. 6A can be categorized into real and virtual devices. The SDN control domain includes real infrastructure devices 678 such as industrial devices and network devices, as well as virtual industrial devices and network devices in a virtual environment 679 that are executing on a cloud server (i.e., a distributed computing platform) 677. Based on this classification even actual network can be distinguished as a real network and a virtual network, as these networks can be based on any network topologies 666 such as ring, mesh, fully connected, line, tree, star, and the like. While from ISDNA technology perspective, distinction between real and virtual devices is not necessary, the main purpose of distinction is to ease understanding of ISDNA scope and responsibility.

Figure 6B:
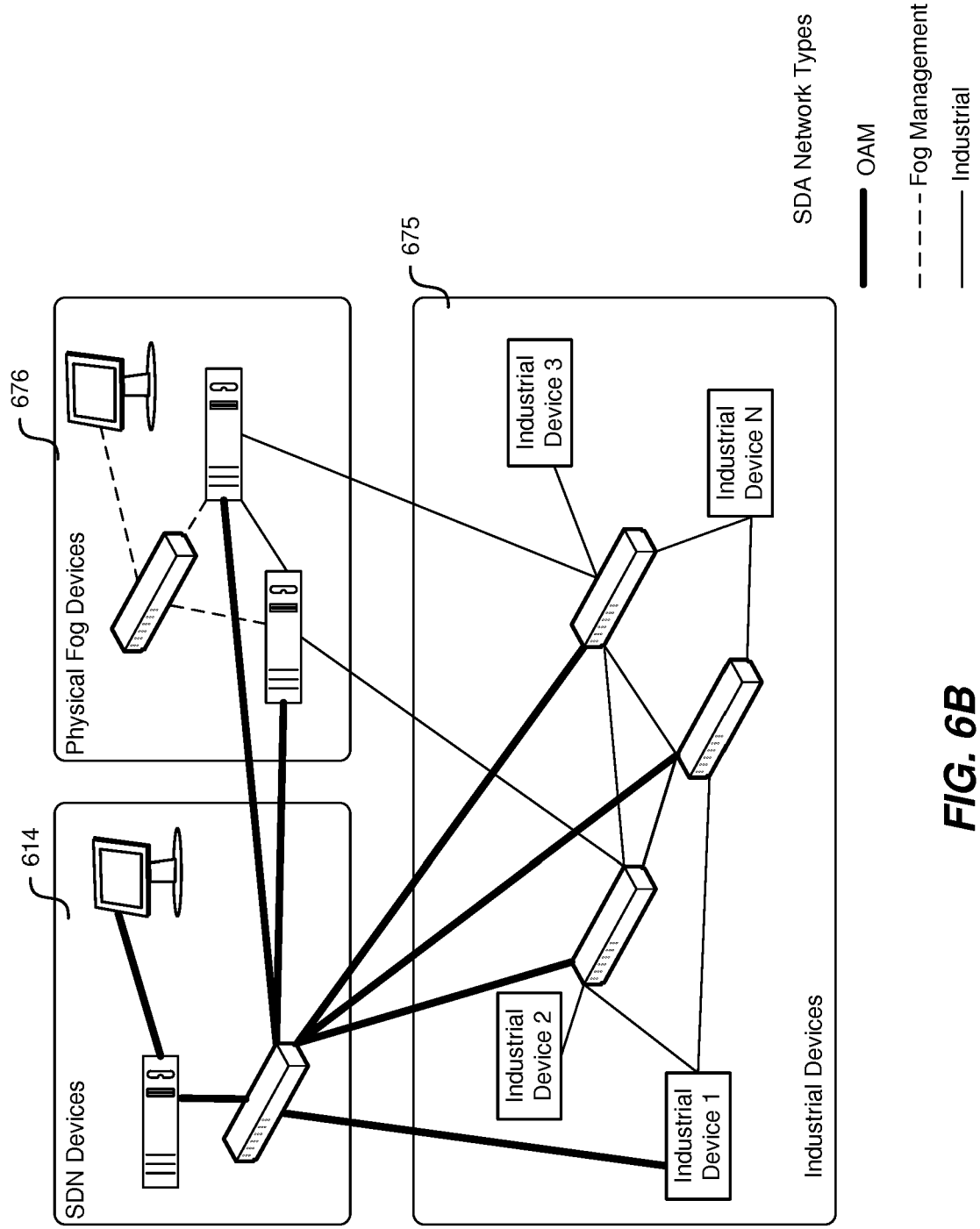
FIG. 6B is a block diagram illustrating SDA networks.

The SDA network (i.e., network in an SDA system) can be divided into three distinct physical networks as depicted in FIG. 6B. The fog management network is dedicated to management of fog devices 676 with network connectivity depicted by dotted lines. The SDN management network (operation and management (OAM) network) is dedicated to management of SDN devices 614 with network connectivity depicted by solid bold lines. The industrial network is the actual production network which provides communication between real and virtualized industrial devices 675. Network connectivity in the industrial network is depicted by non-bolded solid lines.

In some embodiments, each of these networks can be managed using SDN. For ease of explanation, management of the industrial network and communication flowing through that network will be discussed in detail. Physical connectivity and rules that govern connectivity are referred to as underlay network.

Figure 6C:
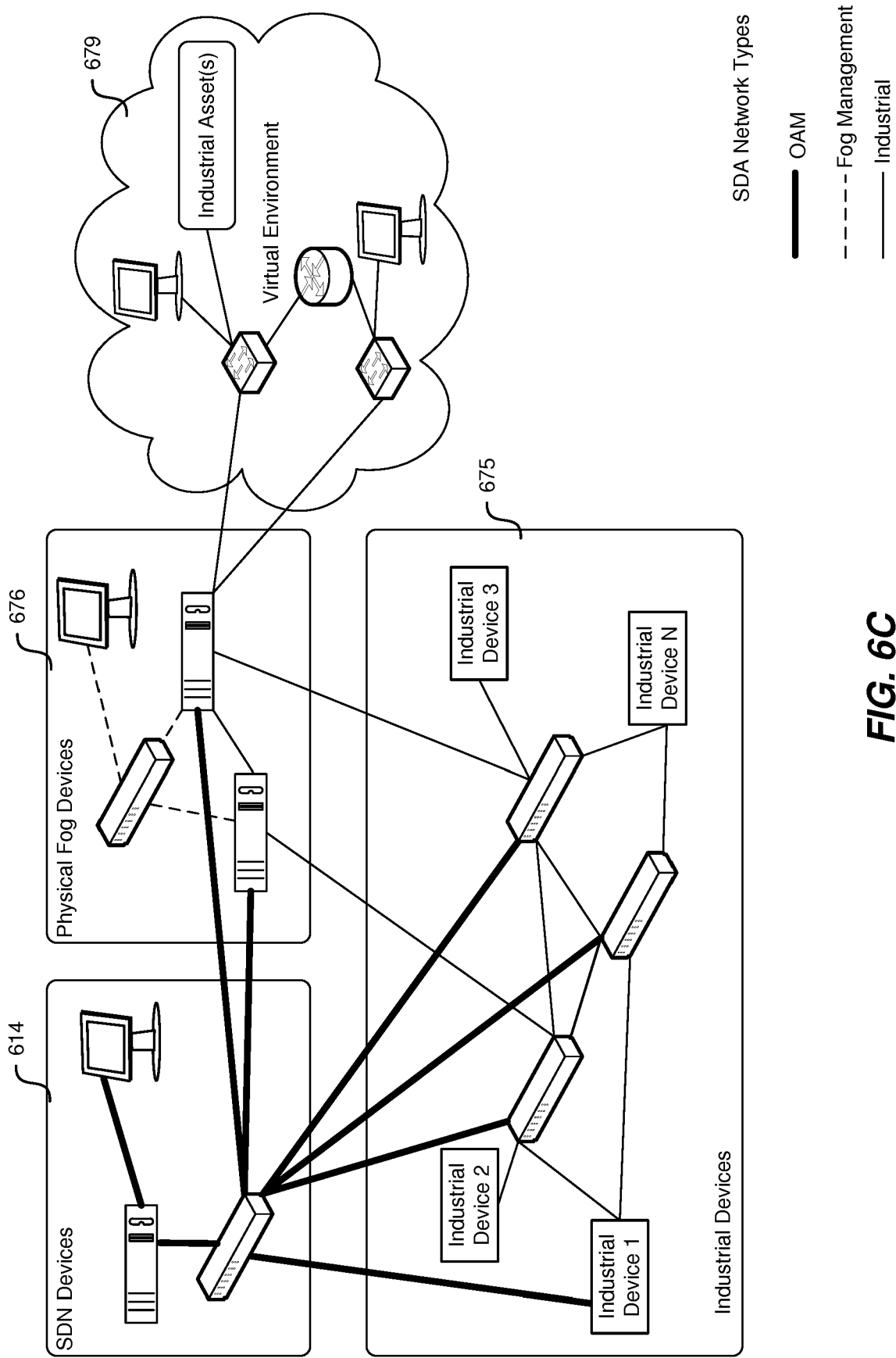
FIG. 6C is a block diagram illustrating a virtualized network.
Figure 6D:
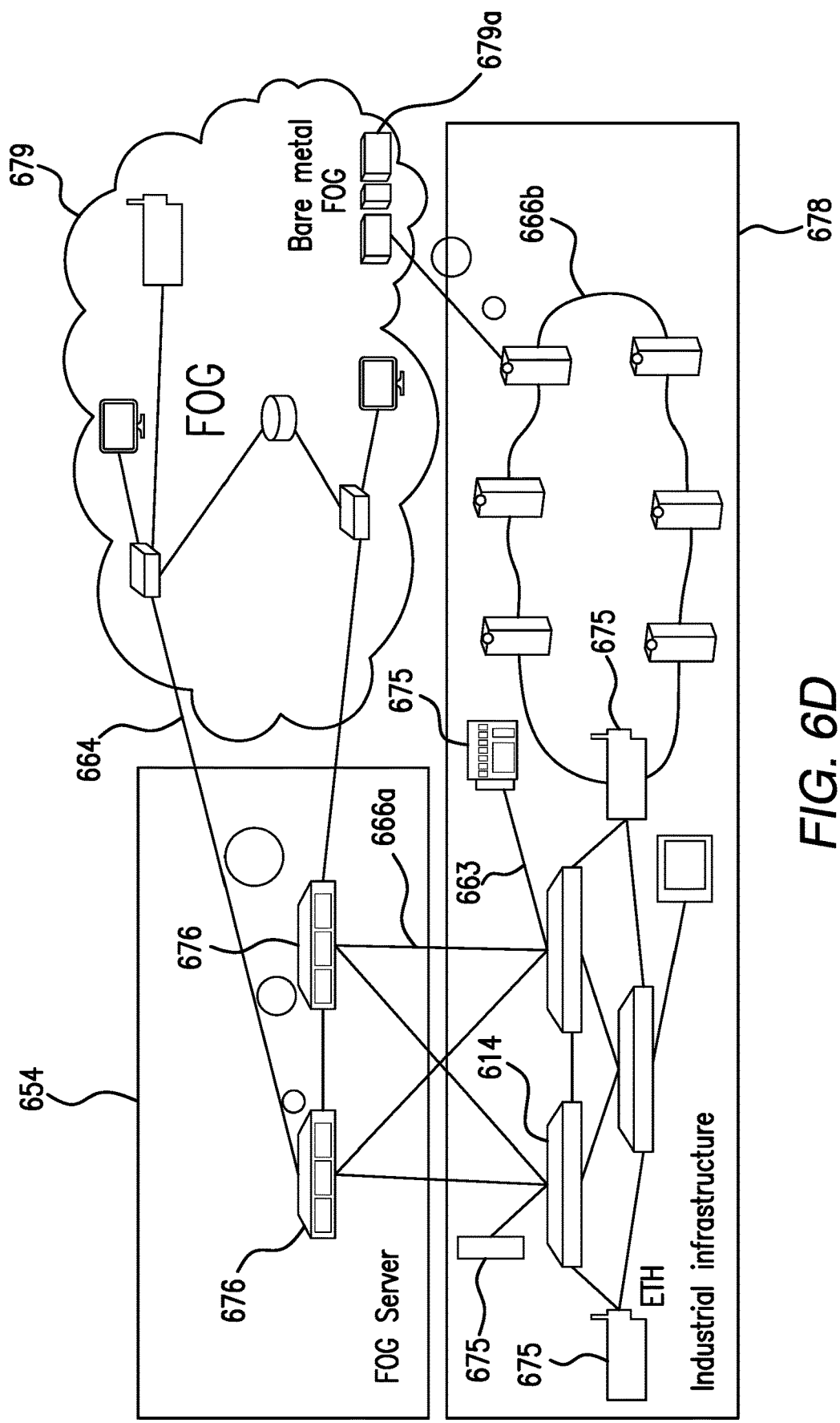
FIG. 6D is a block diagram illustrating industrial SDN control domain.

While the industrial network has real physical devices, it also has virtual devices that are connected via virtual networks as depicted in FIG. 6C. Devices depicted in the virtual environment cloud 679 are virtualized instances of physical devices such as switches, routers, PCs, PLCs, firewalls, and the like. They are connected via virtual links. The network of virtual devices with virtual connections is referred to as virtualized network. Virtual devices reside on the physical fog server nodes (i.e., compute nodes) which are part of the real network. This means that real network and virtualized network are interconnected to form the industrial SDN control domain as depicted in FIG. 6D. As illustrated in FIG. 6D, the industrial SDN control domain comprises physical fog devices 676 (e.g., servers) in the fog server 677, SDN devices 614 (e.g., Extreme Network switches), industrial devices 675 in the industrial infrastructure 678, virtual industrial and infrastructure devices in the virtualized environment 679 hosted in the fog server 654 as well as physical network 663 and virtual network 664. The ISDNA manages the industrial SDN control domain through an SDN controller with input provided from an SDA or industrial application, a fog management application or fog orchestrator 535 and cyber security application or CS orchestrator 545. Also depicted in FIG. 6D in the virtual environment 679 are bare metal fog devices 679a. Bare metal devices run a purpose built binary image that is tightly coupled to the host hardware (i.e., compute node hardware)—much like a traditional embedded device. This binary image can take full advantage of the direct access to the hardware just as if the image were installed at the factory. In some embodiments, the bare metal image may be a complete kernel and operating system (OS) to turn the bare metal node into a full compute node with VMs and/or containers with its own support for VMs and/or containers.

Historically, dominant topology in industrial infrastructure is chain or ring in places where redundancy is required. The main driver behind these topologies over tree or mesh topologies is reduction in material and installation cost. Now that the fog is the main contributor to industrial infrastructure, the topological view of the network is transformed into a mixture of rings and meshes. As the core of the fog (i.e., the fog controller) typically resides in close physical proximity to other physical parts of the fog server such as the compute nodes, storage nodes, and the like that are interconnected with fast high throughput connections, and since it is a high-end device, it can have a plethora of high speed network interfaces. As such, it can be fully wired into a mesh topology 666a at relatively low cost. On the other hand, industrial devices are generally deployed far apart and have significantly lower capabilities with fewer network interfaces at a lower speed. As such, the edge devices may be deployed in chains and rings (e.g., 666b). It should be noted that in other embodiments, various other topologies such as star, fully connected, line, tree, bus, or the like may be deployed.

Generally, an SDN controller manages the network using separate, physically isolated management network. Industrial networks prefer simplified network form for all aspects including minimal cabling and simple management. In other words, a unified network view for the entire industrial application. In light of these network expectations, consolidation of management and operations network is desirable. This consolidation opens additional concerns such as design (topologies), bootstrapping and management of such network.

In industrial networks, the focus is on Ethernet. Ethernet is designed to operate in loop less topologies. This topology can be achieved by connecting Ethernet devices in: Bus, Star, Tree or combination thereof. Misconfiguration of wiring in these topologies leads to creation of loops which in consequence lead to line rate replication of traffic, better known as broadcast storms. In order to remedy accidental or even intentional looped topologies, Ethernet infrastructure devices usually deploy Spanning Tree Protocols such as STP, RSTP, MSTP, SPB and the like. Ability of these protocols to provide fully connected (spanning) and loops less (tree) topology lead to intentional Ethernet deployment using ring and mesh topologies. In these topologies spanning tree protocols are acting as redundancy protocols. Industrial Ethernet is very fond of ring topology since it provides single fault tolerant network at minimal cabling cost with reasonable recovery times. Same or similar level of functionality can be provided in an industrial SDN network.

Creating looped or meshed topologies in SDN is simplified by its reliance on separate management network (OUT-BAND) which is considered to be stable. An SDN controller resides on that network and every device is provisioned to access it. Since the SDN controller has full control of every device, it can instruct each on how to forward traffic so that it does not create loops. In other words, loop less network is just another network application in the industrial SDN network.

When the management network and production network are merged, a bootstrapping problem is encountered: if an SDN controller must manage the management network, then management network must be loop free. For it to be loop free it needs the SDN controller. This is where a causality dilemma is encountered. From SDN perspective, the SDN controller has full control of network, i.e., each device in an SDN controlled network has a path to SDN controller after provisioning.

A device bootstrapped with all interfaces in blocking state can use LLDP protocol to exchange information about location of controller. Link Layer Discovery Protocol (LLDP) can be used for exchange of OpenFlow information in such way that results in a path to the SDN controller. Once the device has obtained path to the SDN controller, the controller can reconfigure device to be integrated in to network. The SDN controller application can then accommodate management and operation separation through its configuration options.

Some infrastructure devices in the industrial domain integrate infrastructure and end device into one device. For example, a PLC that acts as a PLC and as a switch. As such, these types of industrial devices are suitable for direct management by the SDN controller. To be managed by the SDN controller, the device can implement at least one south bound interface of a selected SDN controller. One example solution is to have such a device implement the OpenFlow or similar protocol. Implementation of OpenFlow at an industrial device level would bring SDN control to the device level.

II. Layer 2: South-Bound Interface

Figure 5C:
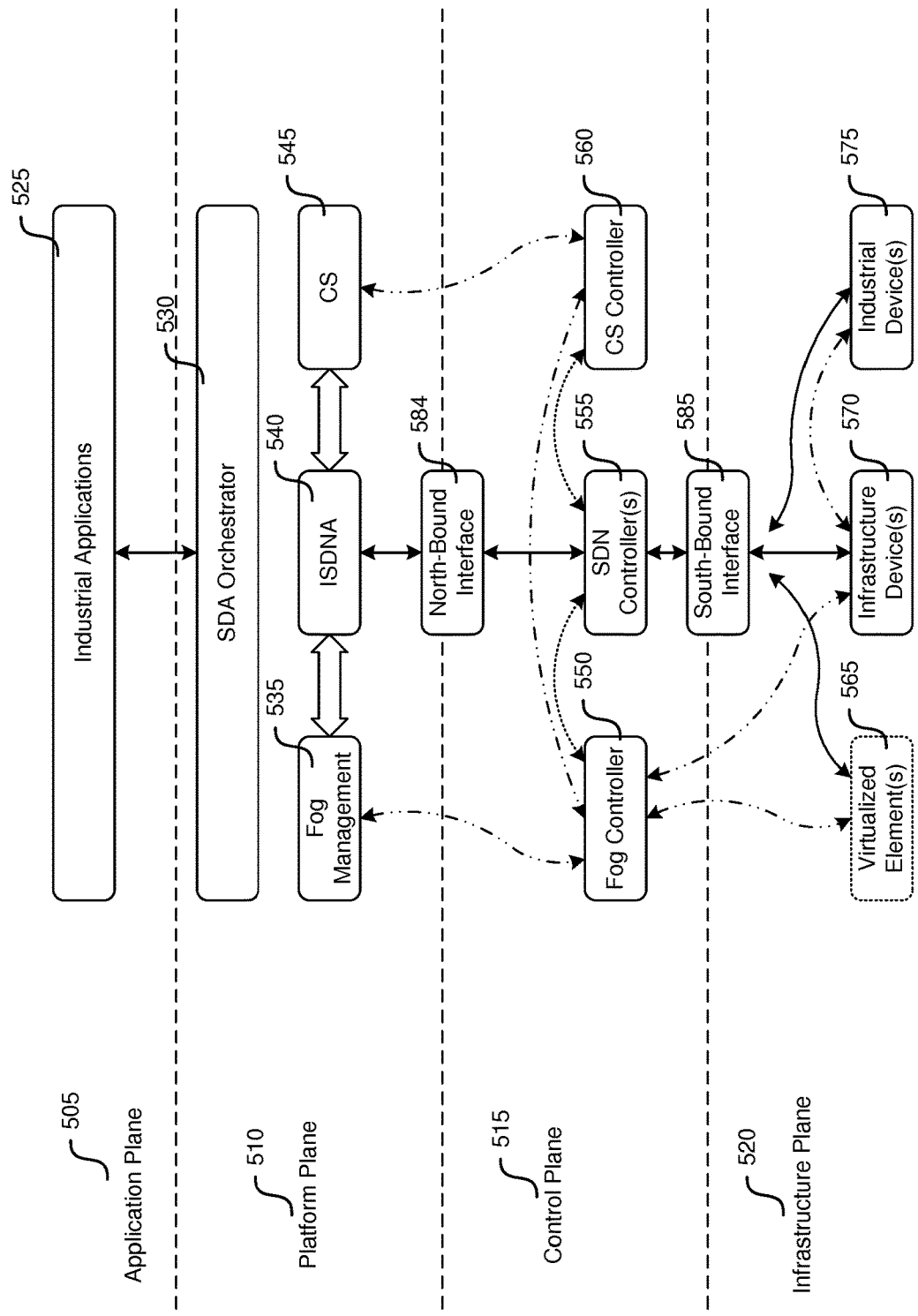
FIG. 5C is a block diagram illustrating industrial SDN system design architecture in accordance with some embodiments.

In FIG. 5C, in order to be managed by the SDN controller, a device in the infrastructure plane 520 can implement at least one south bound interface 585 of a selected SDN controller. South-bound interfaces 584 which include south-bound APIs define the communication protocol between the control entities in the control plane 515 and the infrastructure devices in the infrastructure plane 520 to enable them to interact with each other. As such, the south-bound interfaces 574 are necessary for the separation between the control plane 515 and infrastructure plane 520. OpenFlow is one of the most popular open south-bound standard for SDN.

III. Layer 3: Control

One of the benefits of SDN is the simplified network deployment, management and maintenance by means of a logically centralized control offered by the SDN controller 555. The infrastructure of layer 1 is managed by entities of the control plane, which include:

(1) Fog controller 550: responsible for management of the fog (i.e., the virtualization platform)

(2) SDN controller 555: responsible for management of SDN network (3) CS controller 560: responsible for management of cyber security as whole.

Control plane 515 is formed by interconnection of the three controllers to form one unified view of the network through exposure of control layer API(s). From an SDN perspective, the SDN controller 555 is a central piece of this integration effort and is a fundamental part of SDN. It is important to understand basic principles of SDN controller implementation and use before the role of the SDN controller 555 and its integration in the industrial control plane 515 can be examined in detail.

(i) SDN Architecture

Figure 7A:
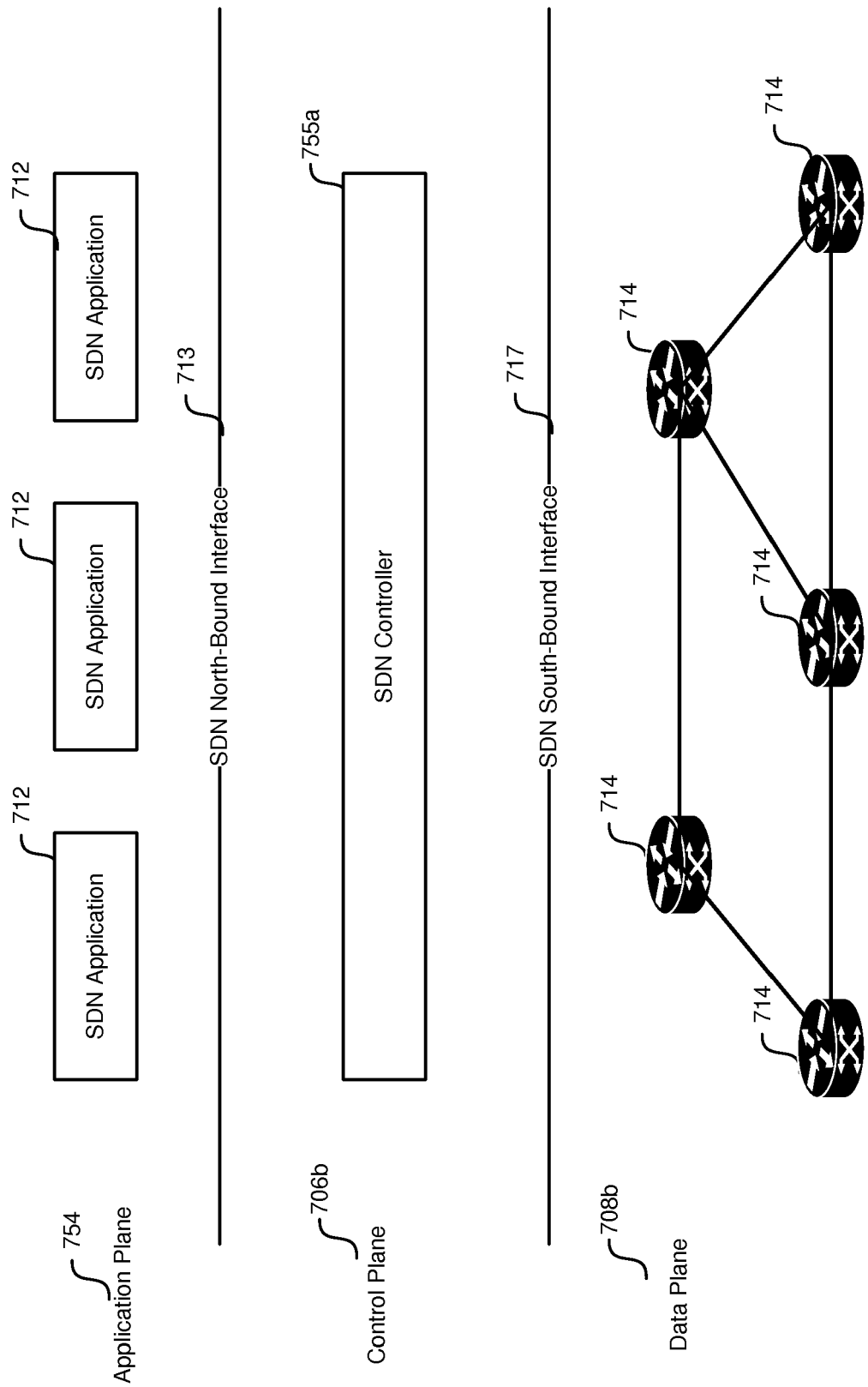
FIG. 7A is a block diagram illustrating the SDN architecture comprising of three planes.

The purpose of the SDN controller is to separate network control from data path and provide an abstraction of network services. As the SDN architecture illustrated FIG. 7A depicts, the SDN controller 755a is a mediator between the network or SDN application 712 and the underlying network infrastructure 714 in the data plane 708b.

In the application plane 754, SDN controller implements Application-controller plane interface (A-CPI) and exposes north-bound interfaces (NBIs) 713 to users of SDN controller to develop network centric applications without being concerned about network implementation details. This plane is a natural residence of the ISDNA.

The control plane 706b is the SDN controller 755a itself. This plane represents central intelligence of the SDN network. While the SDN controller 755a can be physically distributed, it is logically centralized in this plane. Detailed architecture of the controller is implementation specific but in general, SDN controller implements Data-controller plane interface (D-CPI) south-bound protocols 717 to communicate with infrastructure resources and corresponding service to allow programmability through A-CPI as NBI 713. Specifically, the set of protocols implemented as D-CPI interface enables the SDN controller 755a directly control actual network device resources residing in the data plane 708b.

Current controller landscape can be divided into open source and proprietary controllers. Open source is targeted mainly at general feature rich SDN controller while proprietary controllers are geared toward specific applications. For interoperability, it is preferable for the SDN controller 755a to be vendor independent. One approach to ISDNA is the use of open source platform. An SDN controller 755a suitable for ISDNA infrastructure includes OpenDaylight (ODL) which offers many network services and south bound protocols. Another suitable option includes ONOS with its performance being the main reason for selection.

One place where ISDNP integration with SDN controller can take place is at NBI interface of SDN controller. However, NBI interfaces of many SDN controllers lack standardization. Nonetheless, ISDNA architecture is equipped to handle this by implementation of SDN Controller agents which is described in reference to FIG. 7E.

(ii) Integration with Fog Controller

Referring to FIG. 5B, ISDNA 540 controls real as well as virtual industrial network. While real network is under direct control of the SDN controller 555, the virtualized network is under the control of the fog controller 550. To enable these two management systems to interact with each other, in the disclosed industrial SDN architecture, the fog controller 550 and the SDN controller 555 are communicatively coupled with one another providing a unified network awareness to the ISDNA 540. Integration of the fog controller 550 and the SDN controller 555 is materialized on the industrial SDN control plane 515. One example implementation of integration between the fog controller 550 and the SDN controller 55 is depicted in FIG. 7B, which is described next.

Figure 7B:
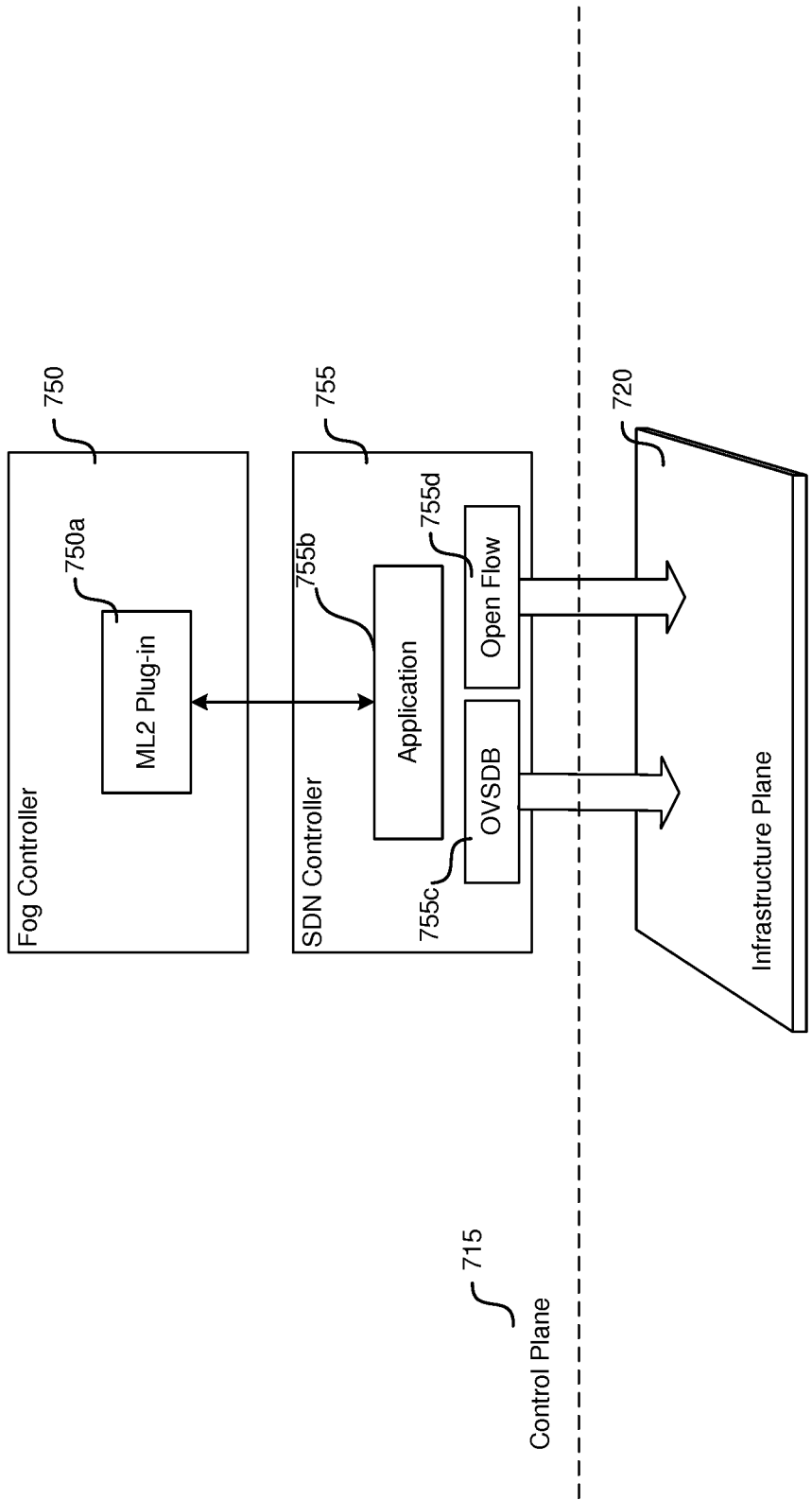
FIG. 7B is a block diagram illustrating an example of an integration between a Fog controller and an SDN controller in accordance with some embodiments.

FIG. 7B illustrates an example of integration between OpenStack implementation of a fog controller 750 and ODL implementation of an SDN controller 755. The ML2 Plug-in 750a provided by OpenStack uses a REST API of ODL to access an application 755b in the SDN controller 755, and issue commands to ODL. The ODL interprets the commands and in response, creates, configures and populates forwarding tables of Open vSwitch Database (OVSDB) 755b switches using OpenFlow. At this point, the SDN controller 755 and the fog controller 750 are fully controlled by the SDN controller 755 which means that the entire network topology is available to the ISDNA via ODL north-bound interfaces. ISDNA can at this point integrate with the SDN controller 755.

(iii) Integration with Cybersecurity Controller

Referring to FIG. 5B, the CS controller 560 is the entity responsible for governance of cyber security policies. These policies are weaved at network and device level. As such, the CS controller 550 interfaces with the fog controller 550 as well as the ISDNA 540.

The purpose of integration of the CS controller 560 with the fog controller 550 is to create and manipulate the virtualized networking infrastructure. Integration of the CS controller 560 with ISDNA 540 is based on a simple mandate to have the CS controller 560 control: accessibility, usage and content of communication handled by resources within the industrial SDN network. Integration of the SDN controller 555 and the CS controller 560 is based around few fundamental aspects of the ISDNA 540 including network function virtualization (NFV) and service function chaining (SFC).

Network functions virtualization (NFV) is a network architecture concept that uses the technologies of IT virtualization to virtualize entire classes of network node functions into building blocks that may be connected, or chained together, to create communication services. From a security perspective, in some embodiments, NFV can be used to virtualize cybersecurity relative functions such as firewalls, DPIs, and the like, and position them at strategic locations in the industrial SDN network. There are two types of NFV deployment: centralized and distributed. The centralized approach is based on deployment of a virtualized network function and redirecting all traffic towards it for processing. The distributed approach is based on device dedicated cyber security function with a specific set of policies. In either case, the SDN controller 555 directs traffic toward functions based on policies defined by the CS controller 560.

Service Function Chaining (SFC) provides the ability to define an ordered list of network services (e.g. firewalls, load balancers) that are then stitched together in the network to create a service chain. SFC in cybersecurity light can be viewed as a set of cybersecurity related network functions being orchestrated to enforce global SDA cybersecurity policies. These functions can be virtual, network virtual functions (NVFs), or actual appliances. The responsibility of the SDN controller 555 in SFC is to enable or facilitate logical packet flow from one function to another to implement SDA cybersecurity policies.

In some embodiments, integration of ISDNA 540 and the CS controller 560 may be based on a set of basic needs from two perspectives. First, the CS controller 560 creates functions and tasks ISDNA 540 to connect them. Second, the CS controller 560 tasks ISDNA 540 to create functions and connect them based on a set of provided policies.

IV. Layer 4: North-Bound Interface

The SDN controller 555 offers an API to application developers to enable the application developers to program the SDN controller 555. This API is used by the ISDNA 540 in the platform plane 510 to communicate with the SDN controller 555.

V. Layer 5: ISDNA, Fog and CS Orchestration

This layer comprises a set of software and APIs that can programmatically access the controllers in the control plane 515 and orchestrate them to manage and control the infrastructure devices. ISDNA 540, fog orchestrator 535 and CS orchestrator 545 of this layer are tightly coupled to corresponding SDN, Fog and CS controllers in the control plane 515. The fog orchestrator 535 implements virtualization needs through the fog controller 550 and the CS orchestrator 545 implements security policies through the CS controller 545. ISDNA 540 implements networking features through the SDN controller 555. Specifically, ISDNA 540 describes network through exposure of ISDNA API. By exposing ISDNP APIs, based on functional views, ISDNA 540 enables industrial network programmability. These entities together form a holistic SDA application view. The architecture of ISDNA and some of its components will now be described in detail in reference to FIGS. 7C-7E.

Figure 7C:
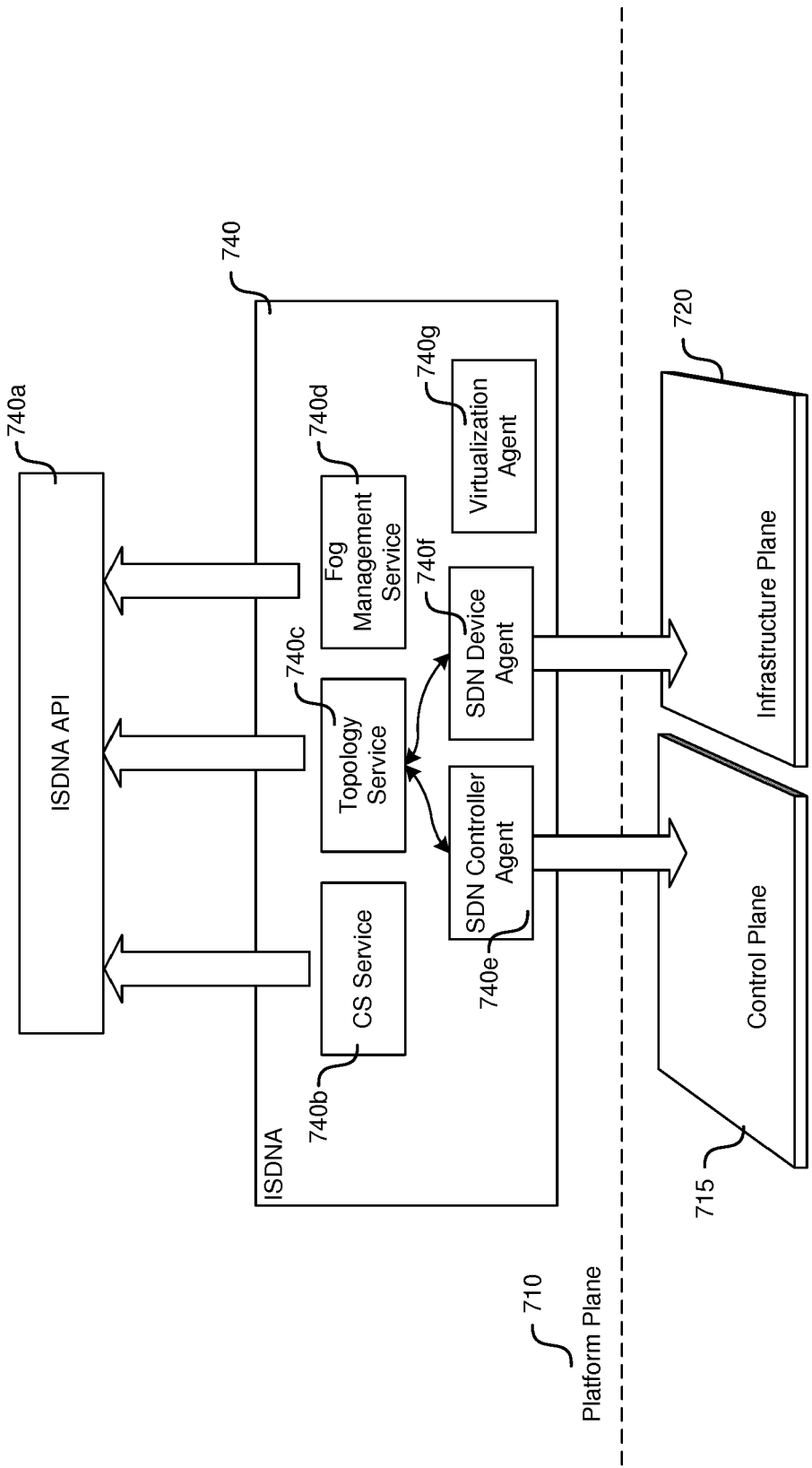
FIG. 7C is a block diagram illustrating an industrial software defined network application ("ISDNA") architecture in accordance with some embodiments.

FIG. 7C is a block diagram illustrating ISDNA architecture in accordance with some embodiments. ISDNA 740 provides a consistent industrial network interface via ISDNA API 740a facing SDA application developers on its north side. On its south side, it faces the SDN controller in the control plane 715. As depicted, ISDNA 740 can include several network services such as a CS service 740b, a topology service 740c and a fog management service 740d. These network services are responsible for orchestration of network and collection of statistics based on a particular service view. The topology service 740c provides information about physical and logical network topology. The CS service 740b provides an interface to the CS orchestrator (also referred to as the CS application) (e.g., CS orchestration 545 in FIG. 5B). Fog management service 740d provides interface to the fog orchestrator (also referred to as the fog management application) (e.g., fog orchestration 535 in FIG. 5B).

ISDNA 740 also includes several agents such as an SDN controller agent 740e, an SDN device agent 740f and a virtualization agent 740g. An SDN controller agent 740e implements an interface specific to an SDN controller in the control plane 715. For example, if the SDN controller is an ODL controller, the SDN controller agent 740e is an ODL controller agent. Similarly, if the SDN controller is an ONOS controller, the SDN controller agent 740e is an ONOS controller agent. A virtualization agent 740g implements an interface specific to the virtualization platform. An SDN device agent 740f, on the other hand, implements interfaces to network devices in the infrastructure plane 720. In some embodiments, an SDN device agent 740f is an optional interface for direct support of legacy devices, which are not compatible with the SDN controller. The SDN device agent 740f provides south bound interfaces to enable the targeted devices to be controlled and configured. Non-limiting examples of the target devices include devices that can be controlled and configured using industrial protocols such as but not limited to: Modbus and EtherNet/IP (EIP). In other embodiments, instead of the SDN device agent 740f, integration of industrial protocols as southbound interface of the SDN controller can support legacy devices.

Figure 7D:
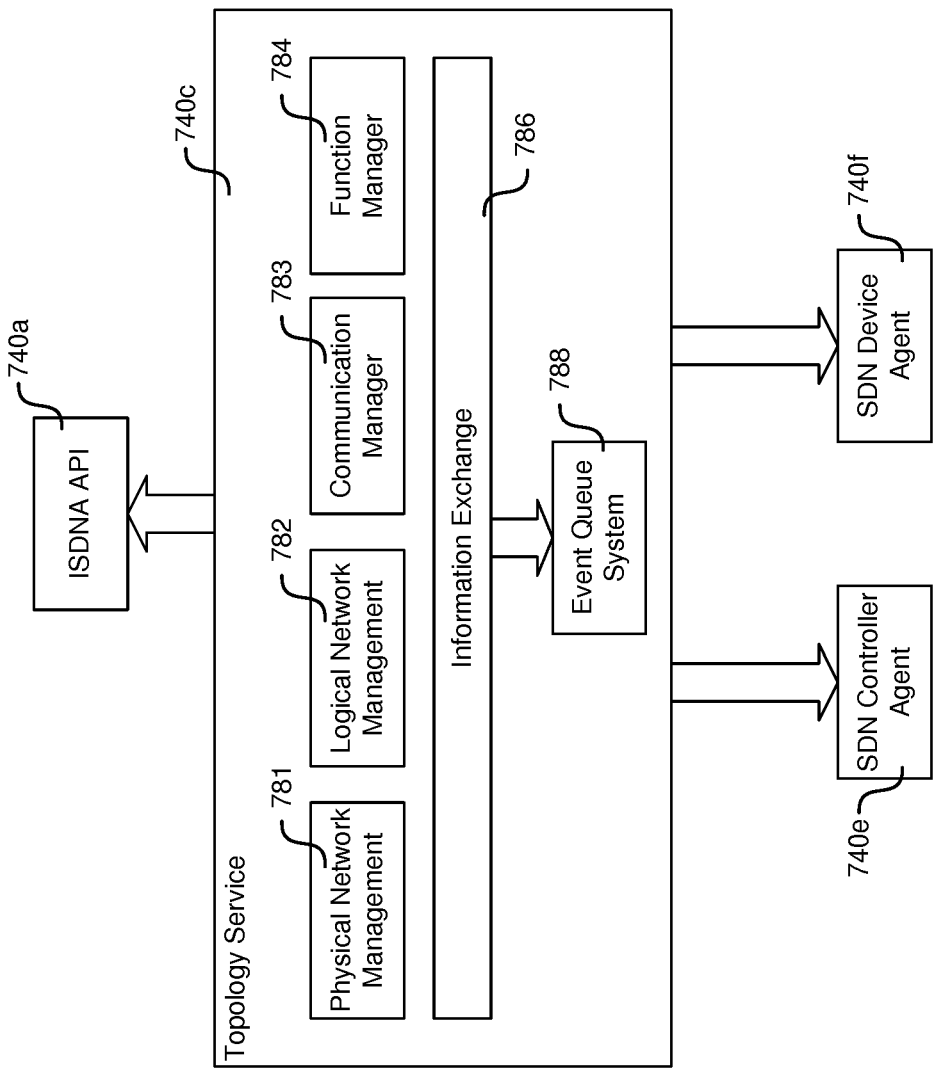
FIG. 7D is a block diagram illustrating a topology service architecture in accordance with some embodiments.

Referring to FIG. 7D, an example architecture for the topology service 740c is depicted. One of the main functions of the topology service 740c is discovery of devices on the network. In order to discover and identify devices, topology service 740c interacts with the SDN controller, fog Controller and CS controller (e.g., components 555, 550 and 560 respectively in FIG. 5B). Discovery process can include discovering various aspects including connectivity, device identification, network identification, communication identification, and the like.

For example, the topology service 740c interfaces with the SDN controller to determine physical and logical connectivity (e.g., via physical network management 781 and logical network management 782 respectively). For device identification, the topology service 740c can interface with the SDN controller agent 740e, SDA orchestrator, fog management service 740d and/or CS management service 740b. For example, from the SDN controller agent 740e, the topology service 740c can acquire network device capabilities. From the SDA orchestrator, the fog management service 740d and the CS management service 740b, the topology service 740c can acquire information identifying devices discovered on the network.

Figure 11A:
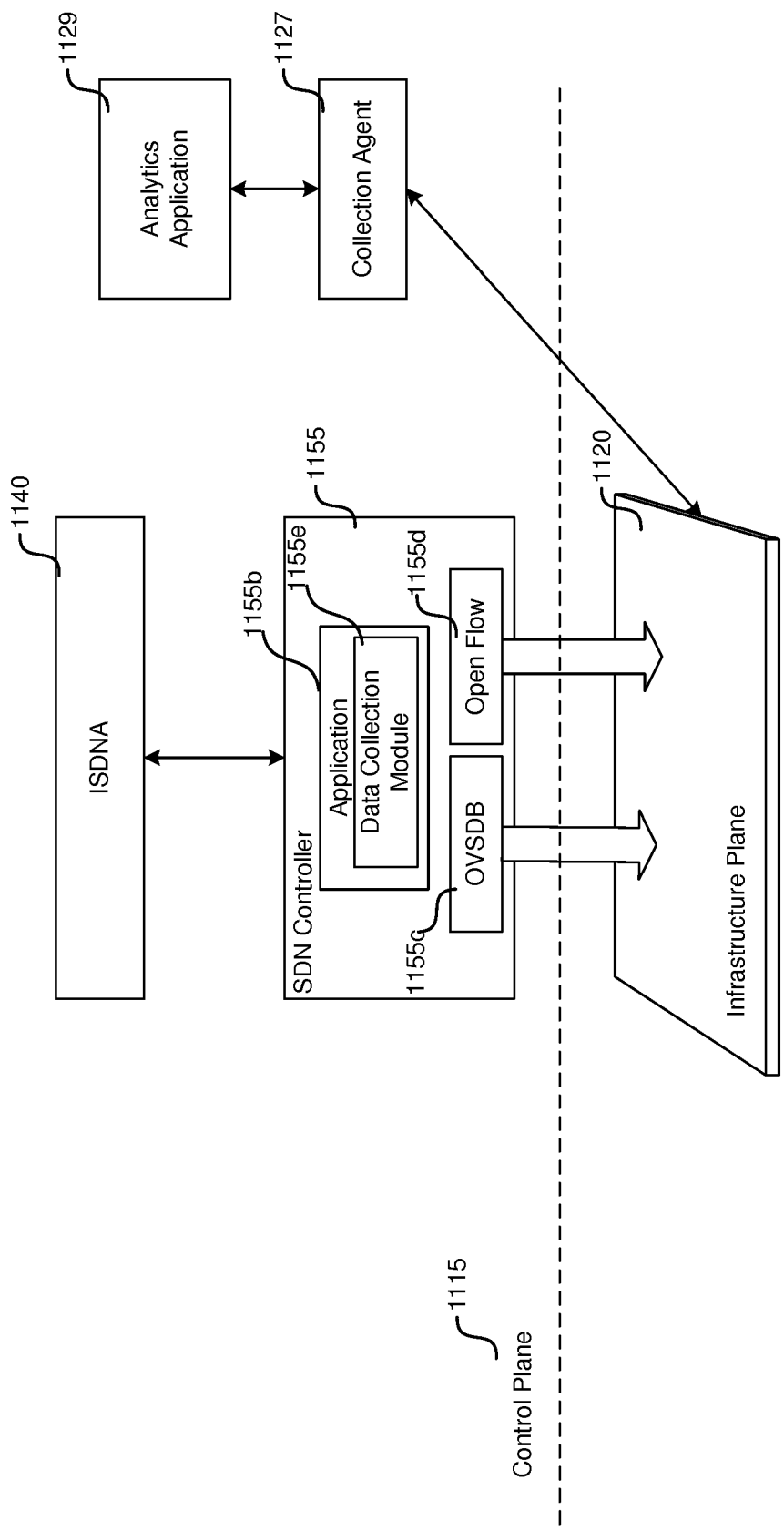
FIG. 11A is a block diagram illustrating monitoring and analytics components in an operational industrial SDN in accordance with some embodiments.

For network identification, the topology service 740c can interface with the SDN controller agent 740e and the SDA orchestrator. Specifically, from the SDN controller agent 740e, the topology service 740c can identify network segmentation technologies and existing network segments. From the SDA or fog orchestrator, the topology service 740c can identify network segment relationship to SDA grouping of industrial functions or applications. For example, a group of industrial functions may communicate using a logical or physical segment of the network. The topology service 740c can relate the network to the SDA grouping. The topology service 740c can also identify available communication protocols (e.g., from analytics application described in reference to FIGS. 11A and 13A or from examining communication streams), individual streams of communications or flows (e.g., via communication manager 783).

The topology service 740c can also include a function manager 784 that identifies functions of network devices. Network devices can be separated or grouped by functions. For example, some are associated with control function while others can be associated with production function. Consider a cement mixing system which has a sensory system that measures moisture, fluidности, rotation speed, temperature and/or other parameters. If there is no functional management, the cement mixing system can stop for any reason such as when a stack of lights go out, or the controller stops working, bringing down the whole network and causing the cement mixture to solidify. So, instead of having direct connection, information is fed through information exchange 786 to an event queue system 788 which manages events in an asynchronous manner.

While topology discovery functionality deals with devices that are currently present on the network, topology design functionality deals with anticipated and designed devices in the network. The main purpose of this functionality is to provide user with the ability to create network topologies and modify discovered topologies. Creation of network topologies can be viewed from two perspectives: physical and logical topologies together with policy control. Physical topology or connectivity is actual link between two nodes on the network. This connectivity can be established between any type of node; node being end node or infrastructure node. In some embodiments, the topology design functionality can identify network devices available for use in an industrial application, provide network capabilities of discovered devices to the industrial application, interface with the fog management service 740d to provision NFVs, interface with the SDN controller to create network segmentation, expose API for Underlay network design, expose API for Overlay network design, and the like.

Figure 7E:
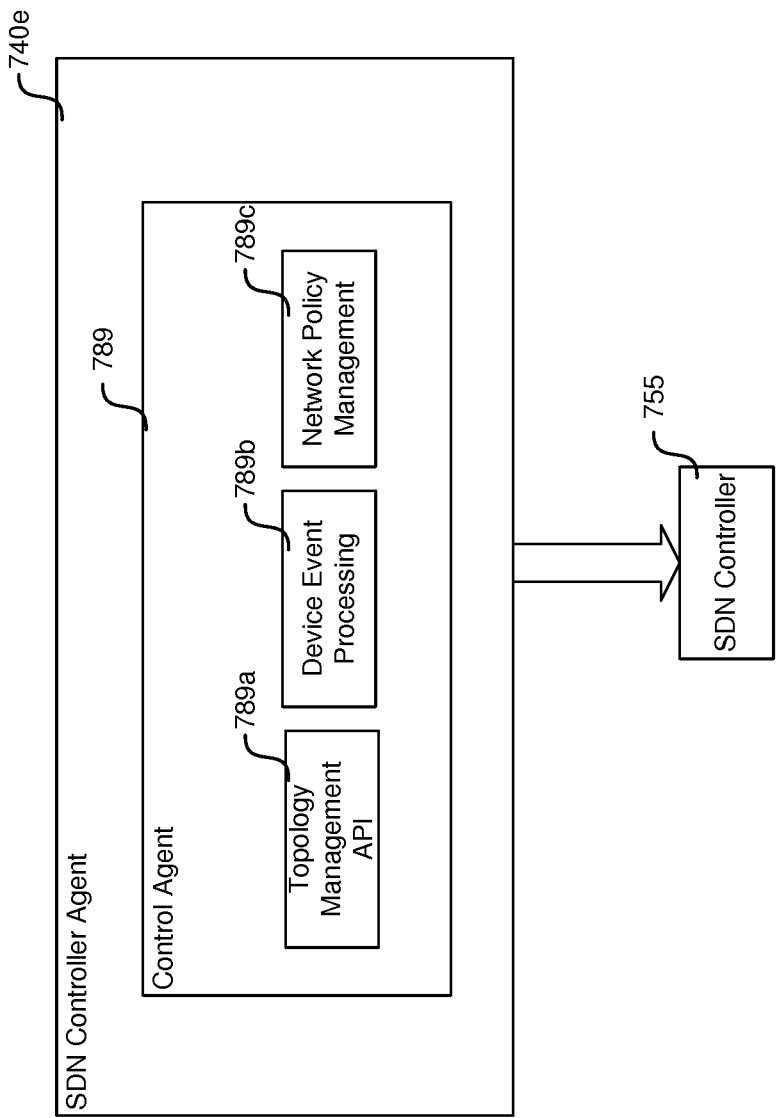
FIG. 7E is a block diagram illustrating example components of an SDN controller agent in accordance with some embodiments.

Referring to FIG. 7E, the SDN controller agent 740e enables communication between the ISDNA 740 and the SDN controller 755. The SDN controller agent 740e interfaces with the ISDNA API to the north, and with the SDN controller 755 to the south. The ISDNA architecture is SDN controller agnostic, i.e., it allows use of any SDN controller via deployment of a controller agent plug-in 740e for that SDN controller. For example, if an ODL controller is deployed in the network, then an ODL controller agent can be deployed in the ISDNA to enable the ISDNA to interface with the ODL controller. The SDN controller agent 740e can translate information from the topology service 740c for example, for the SDN controller so that the SDN controller can add a device, remove a device, replace a device, etc. In some embodiments, the SDN controller agent 740e can include a control agent 789 having a topology management API 789a, device event processing 789b and a network policy management 789c. The network policy management 789c can translate cybersecurity requirements for the SDN controller 755. One example of such a translated policy is: allow only YouTube access to any device connected to port 1.

The device event processing component 789b can push events from the SDN controller 755 up to other components of the ISDNA 740e. For example, the SDN controller 755 can detect a link loss event and that event can be processed by the device event processing component 789b. More information (e.g., about the event) can be obtained via the topology management API 789a. In any case, the event is passed up to the topology service 740c. The topology service 740c can then determine from physical to logical where the physical connection is lost and generate messages in various planes. For example, the topology service 740c can determine where the physical connection is lost and generate a message in the infrastructure plane, e.g., via the SDN device agent. Similarly, it can determine where the logical connection is broken and generate a message in the control plane, e.g., via the SDN controller agent 740e. The information when passed on to the application plane can for example result in the redundancy kicking in. Thus, as depicted in FIG. 5B, information 573 can propagate from the infrastructure plane 520 through the various layers to the application plane 505, while orchestration 574 propagates from the application plane 525 down to the infrastructure plane 520.

VI. Layer 6: SDA Orchestration

Referring to FIG. 5B, the SDA orchestration component 530 is a unified software that sits on top of the ISDNA 540, fog orchestrator 535 and CS orchestrator 545 of layer 5 and hides the complexity behind these components by exposing an API to the north to interface with the industrial applications 525.

VII. Layer 7: Industrial Application

Industrial applications 525 sit on top of the SDA orchestrator 535. Users work from the application perspective, and as such describe the system they want to build in the native language of the application, not in the language of the network. These industrial applications utilize the API exposed by the SDA orchestrator to communicate their requirements to the SDA orchestrator 530 for orchestrating the control elements in the control plane 515.

5. Industrial SDA System Design Architecture

FIG. 5C is a block diagram illustrating an example of the industrial SDA system design architecture. In the design architecture diagram, users utilize software to create industrial applications 525 in the application plane 505. Such industrial applications 525 can include a function, or a set of functions, and are created not in the language of the network, but in programming languages that are native to the software applications (e.g., PLC programming languages). By way of an example, a user can create a conveyor belt application using one or more software applications, defining various components such as a PLC, motor, switch, motion sensor, visual signaling, etc., that are needed for a conveyor belt to be operational.

The SDA orchestrator 530 that is interfacing with the industrial application 525 (e.g., via APIs) provides the necessary abstractions to hide the details of orchestration of the components of the platform plane 510 and the control plane 515 to simplify application development. In other words, the user can create the conveyor belt application without knowing the details of the underlying layers and components, without having to individually access and program each of the controllers or infrastructure devices, and without having to carefully plan where and how to connect the infrastructure devices to an existing network. The SDA orchestrator 530 together with the ISDNA 540, fog management orchestrator 535 and CS orchestrator 545 simplifies the conveyor belt application creation process by proposing physical and logical network connectivity and implementing CS features and policies to create isolated logical units for diagnostics, control, firewall, etc. Specifically, the fog management orchestrator 535 that is coupled to the fog controller 550 can orchestrate the creation of virtualized elements in one or more compute nodes in the fog server. The CS orchestrator 545 that is coupled to the CS controller 560 can orchestrate the CS controller 560 to implement cybersecurity policies. For SDN, the functions and relationships among the ISDNA 540, SDN controller 555 and virtualized elements 565, infrastructure devices 570 and industrial devices 575 are of main concern. The ISDNA 540 that is interfacing with the SDN controller 555 via the Northbound interface 584 orchestrates the SDN controller 555 to propose communication paths which may be based on user defined criteria such as load, capabilities of the underlying infrastructure, time sensitivity, and the like. The SDN controller 555 interacts with the virtualized elements 565, infrastructure devices 570 and/or industrial devices 575 via the south-bound interface 585 to define the communication path(s) each device in the infrastructure plane 520 can take.

6. Example Use Case of the Industrial SDN Architecture

The industrial SDN architecture comprising ISDNA satisfies various needs in the industrial environment and provides industrial users with ultimate control and understanding of the network that is not possible with the traditional or SDN network architecture. In other words, with ISDNA-based architecture, network becomes consumable to a user. Consequently, network can become immaterial when it is operational, and transparent when it is not. One of the example use cases for implementing the industrial SDN architecture is for simplifying provisioning and commissioning process from an industrial application perspective, i.e., enabling a user to "securely connect anything anywhere."

I. Secure and Express Provisioning and Commissioning

In an existing industrial environment, provisioning and commissioning a device is a complex process. One cannot simply connect the device anywhere and expect it to operate properly. Industrial network has a plethora of connectivity rules (topologies), system constraints, network protocols constraints, and so on. On top of existing network complexity, virtualization which is an integral aspect of SDA adds to that complexity. With combination of real and virtual devices and their complementary real and virtual networks, a new network domain is formed which is depicted in FIG. 6D. As illustrated, the industrial SDN control domain encompasses fog 654 where the virtual environment 679 including virtualized devices are hosted as well as the infrastructure environment 678 that includes industrial devices, computing systems, and so on.

Consider a scenario where a user has an industrial device which needs to be deployed in a plant to perform a particular industrial function. This specific device may be deployed in near proximity to the process or at a distance depending on the plant layout. In order to connect it to the network based on the industrial SDN architecture, the user does not need to know the exact topology nor network configuration. The user can simply take an Ethernet cable and connect the device to the first available switch port at a desired physical location. As a result of performing this simple action, one or more of the following operations may be set in motion in the industrial SDN network.

(i) SDA system (e.g., via ISDNA) determines if the physical location is appropriate for connection of the device.
(ii) SDA system (e.g., via ISDNA) determines if the connected device is allowed to participate in the network.
(iii) SDA system (e.g., via ISDNA) determines type of device, its capabilities and particular industrial function.
(iv) SDA system (e.g., via ISDNA) provisions network path to all resources required by the device such as storage, IO points, other peer devices, and the like.

Once above steps are complete, the device can be considered fully provisioned and ready for commissioning stage. It should be noted that there is substantial distinction between provisioned and commissioned states of a device. In the simplest sense, a provisioned device is ready to execute an application while a commissioned device is authorized to begin execution. When the device starts application execution, the device is considered to be operational.

Figure 8:
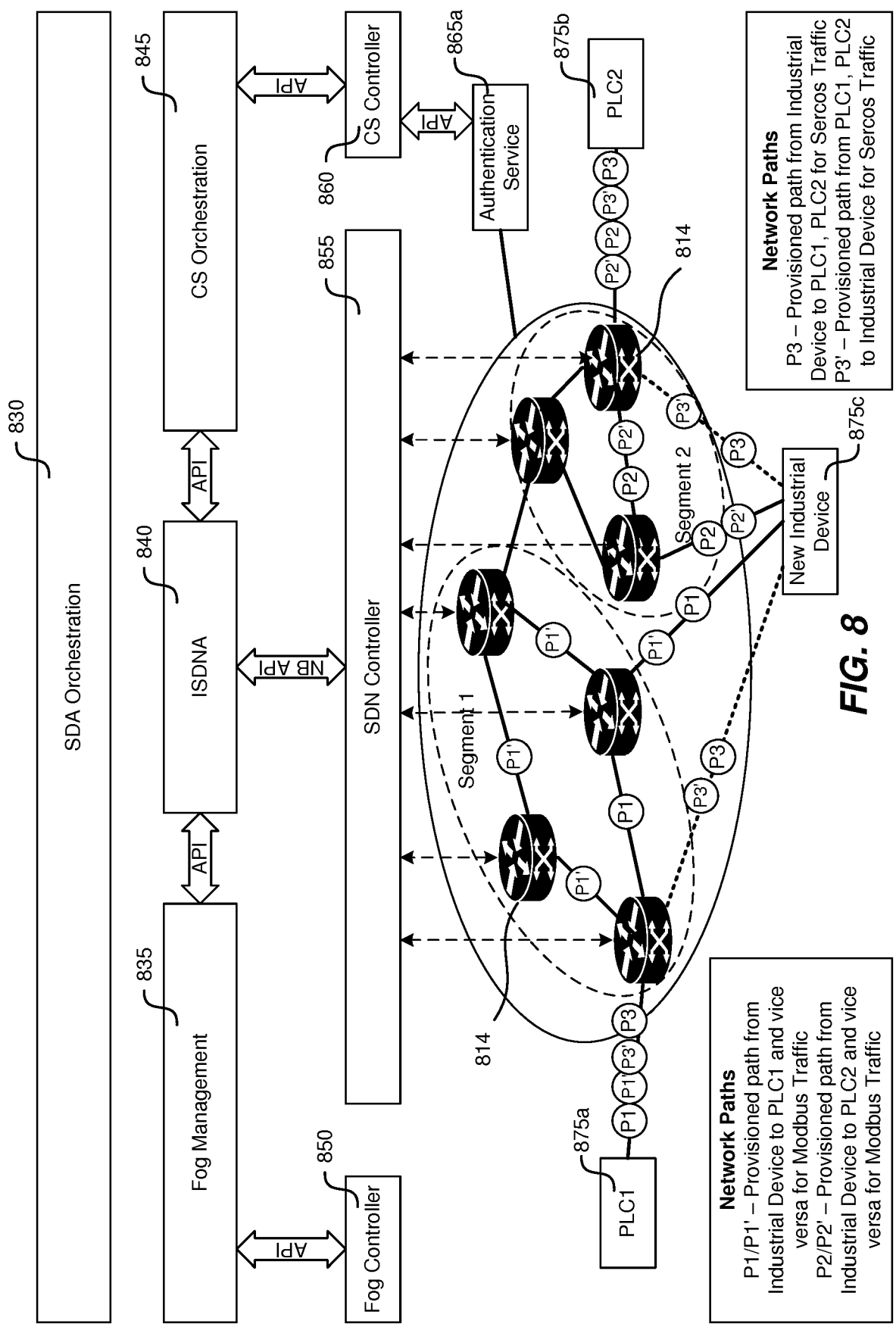
FIG. 8 is a block diagram illustrating provisioning and commissioning of an industrial device in an industrial SDN network in accordance with some embodiments.

FIG. 8 is a data flow diagram illustrating express and secure provisioning of a device in an industrial SDN network in accordance with some embodiments.

When a new industrial device 875c first connects to an industrial SDN network (e.g., Ethernet network) of the present disclosure, it broadcasts an address resolution protocol (ARP) request. Every single infrastructure device (e.g., 814) in the network is programmed by the SDN controller 855 to redirect ARP packet of unknown origin to the SDN controller 855. So, the ARP packet from the industrial device 875c to be provisioned is also redirected to the SDN controller 855. The next step for the SDN controller 855 is to determine whether the industrial device 875c is allowed to communicate with any other devices or resources in the network. In order to make that determination, the SDN controller 855 passes on information about the industrial device 875c (e.g., its MAC address, IP address, and/or any other information encapsulated in the ARP request) extracted from the ARP request to the ISDNA 840 (e.g., via SDN controller agent 740e in FIG. 7C). The ISDNA 840 in turn can request the SDA orchestrator to identify the industrial device and relevant cybersecurity policies applicable to the industrial device in some embodiments. Specifically, the SDA orchestrator 830 can obtain the relevant policies for provisioning the industrial device 875c from CS orchestrator 845/CS controller 860. For example, such a policy may require that the industrial device 875c be authenticated by an authentication service 865a. The authentication service 865a, which is controlled by the CS controller 860, may reside on a physical compute node of the fog server, for example. The authentication service 865a may implement an access control list (ACL) which is a method for white listing devices allowed in the network or any other authentication method. The SDN controller 855 based on information provided by the SDA orchestrator 830 (e.g., via ISDNA) creates a network path from the industrial device 875c to the authentication service 865a. So, when the industrial device 875c sends another ARP request, that request traverses through the provided network path to the authentication service 865a. The authentication service 865a determines whether the industrial device 875c is authorized to participate in the network and what the industrial device 875c is permitted to do in the network. If the authentication service 865a determines that the industrial device 875c is allowed to participate in the network, it may access a device database configured by a customer for storing various types of devices, how they are grouped together, capabilities, industrial functions, protocols, interrogation procedures, and the like. Information from such a database can be used to interrogate and identify the industrial device 875c and/or determine resources required by the industrial device 875c.

For example, the authentication service 865a may determine from the information collected (e.g., from the device database, information from device interrogation) that the industrial device 875c needs to communicate to all devices in "group A". In the example diagram of FIG. 8, PLC1 is a device 875*a* that is part of group A that the industrial device 875*c* wants to communicate with. The authentication service 865*a* provides this access configuration information associated with the industrial device 875*c* to the CS controller 860 (e.g., via an API). The SDN controller 855, based on the access configuration information, provisions a path "P1" from the industrial device 875*c* to PLC1 875*a*. If permitted by the authentication service 865*a* (e.g., based on a CS policy), a path (P1') from PLC1 875*a* to the industrial device 875*c* may also be provisioned by the SDN controller 855. Thus, the industrial device 875*c* and PLC1 875*a* can communicate bidirectionally via paths P1 and P1' provisioned by the SDN controller 855.

Suppose PLC2 875*b* also belongs to group A but is in a different network segment from PLC1 875*a*. The SDN controller 855 can program the infrastructure device(s) 814 to provision a path P2 from the industrial device 875*c* to PLC2 875*b* and a path P2' from PLC2 875*b* to the industrial device 875*c*. It should be noted that the forward and return paths may be the same or different. In some instances, communication may be unidirectional.

In some embodiments, the industrial device 875*c* may need an external storage. The industrial device 875*c* may request such storage, or the requirement may be specified in a policy. The request may be handled by the SDA orchestrator 830, or via a device configuration service. Ultimately, the fog controller 850 instantiates a storage node in one or more compute nodes, and informs the SDN controller 855 the location of the storage node. The SDN controller 855 in turn provides a network path from the industrial device 875*c* to the storage node to enable the industrial device 875*c* to connect to the storage node to store/retrieve data (e.g., configuration information, application data, and the like).

In some embodiments, the SDN controller 855 can provide a path based on QoS requirements. For example, the SDN controller 855 can identify the traffic from the industrial device 875*c* as "MODBUS". The SDN controller 855 can then apply a network policy (e.g., stored in a network policies database) for the MODBUS traffic. In FIG. 8, suppose P1/P1' and P2/P2' are paths provided by the SDN controller 855 for MODBUS traffic. SERCOS is a high-speed protocol with stringent timing requirements. The network policy for SERCOS traffic may dictate that the SDN controller 855 provide a new path on which no other traffic is allowed. In FIG. 8, P3/P3' can be the paths provided by the SDN controller 855 for SERCOS traffic.

Once the new industrial device 875*c* has gone through all the checks and has access to all resources it needs to be fully operational (e.g., application is loaded), the provisioning and commissioning process is considered complete. The decommissioning process, in contrast to the provisioning and commissioning process, involves disabling communication between two points. The decommissioning process can be initiated by user instruction, cybersecurity policy change, auto detection of a fault, opportunity for re-optimization of a path, and the like. For example, an analytics application (e.g., analytics application 1129 in FIG. 11A, analytics application 1320 in FIG. 13A) actively monitoring the network may determine that communication via path A does not meet QoS requirements (e.g., latency is too high), then the SDN controller can disable path A and provide a new path B that meets the QoS requirements.

7. Creation and Deployment of an Industrial Application in an Industrial SDN One of the advantages of the industrial SDN architecture including the ISDNA and other orchestrators is the simplification of an industrial application (or SDA application) creation process without being burdened by network design constraints. In this application creation process, an application designer need not concern himself/herself about network details or network implications. The ISDNA and other orchestrators can create the industrial application and make it deployment-ready based solely on the required functions or functional design in some embodiments. In other embodiments, user input, for example, relating to network requirements or features may also be utilized in creating the industrial application.

Figure 9A:
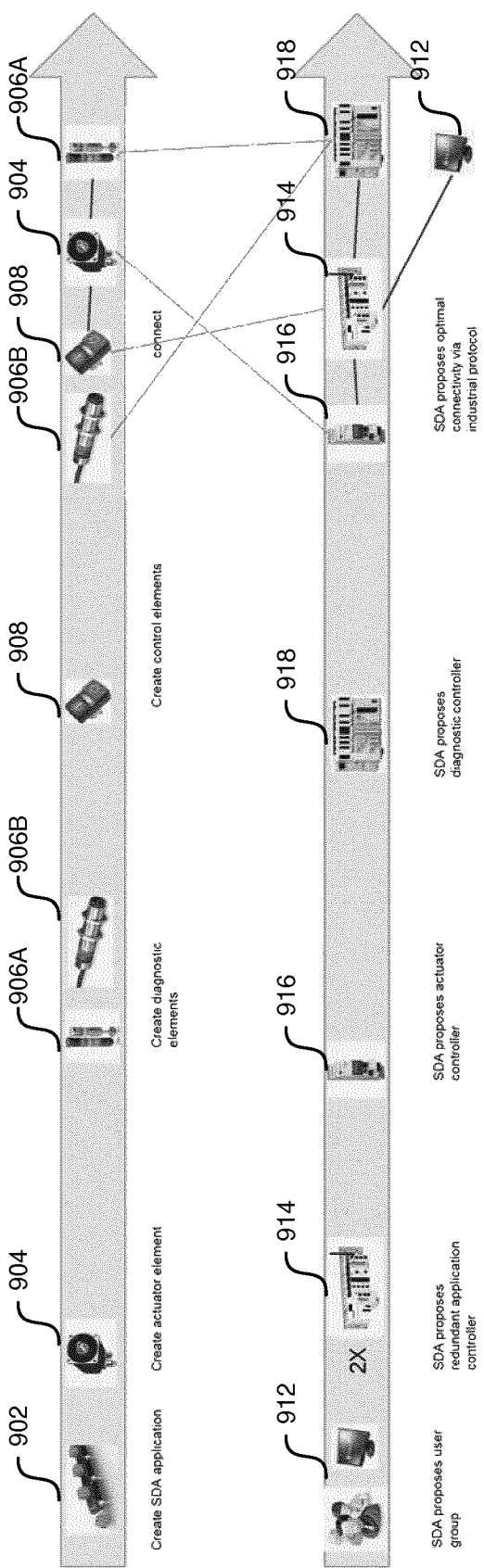
FIG. 9A is a block diagram illustrating creation of an example industrial application in accordance with some embodiments.

FIG. 9A is a block diagram illustrating creation of an example industrial application in accordance with some embodiments. It should be noted that the example application is for illustration purpose only; actual industrial applications are typically more complex. The example application is that of a conveyor belt application with options for stop and start, fault detection and a simple item counter. As the first few steps, a user can create the required functional components using a design application. In some embodiments, multiple applications may be utilized to create the conveyor belt application (e.g., Unity software to provide functionality of the controllers in collaboration with Wonderware (SCADA system) software to visualize and control the system). Such applications may be accessible via the system software or automation portal (e.g., system software 434) For example, the user can create a conveyor belt unit 902 and an actuator element 904. Creating an actuator element or any other elements in the functional design may entail, for example, selecting an actuator element from a list of choices available via the design application and dragging and dropping the selected actuator element on a work area of the design application. The user may also give the actuator element an identity (e.g., Name: MAIN MOTOR, Serial No.: SCH90045) and assign it to a functional group (e.g., Group: G_CONVEYORBELT). The user can create diagnostic elements 906A, 906B, and give each an identity (e.g., Name: MAIN MOTOR ALARM$_1$, Serial No. SCH70100) and assign each to a functional group (e.g., Group: G_CONVEYORBELT). The user can also create a control element 908, and give it an identity (e.g., Name: MAIN MOTOR CONTROL SWITCH, Serial No. SCH6099) and assign it to a group (e.g., Group: G_CONVEYORBELT). The user can connect these elements together (e.g., by drawing connectivity lines), resulting in the function view 901 depicted in FIG. 9B. In this view, the control element 908 (e.g., a switch) can be used by a human to turn on/off the actuator element 904 (e.g., a motor) which starts/stops the conveyor belt 902. Further, the diagnostic element 906B (e.g., a sensor) can count the number of packages on the conveyor belt 902. And finally, the diagnostic element 906A (e.g., diagnostic lights) connected to the actuator element 904 can indicate a problem by turning from green to red.

Figure 9B:
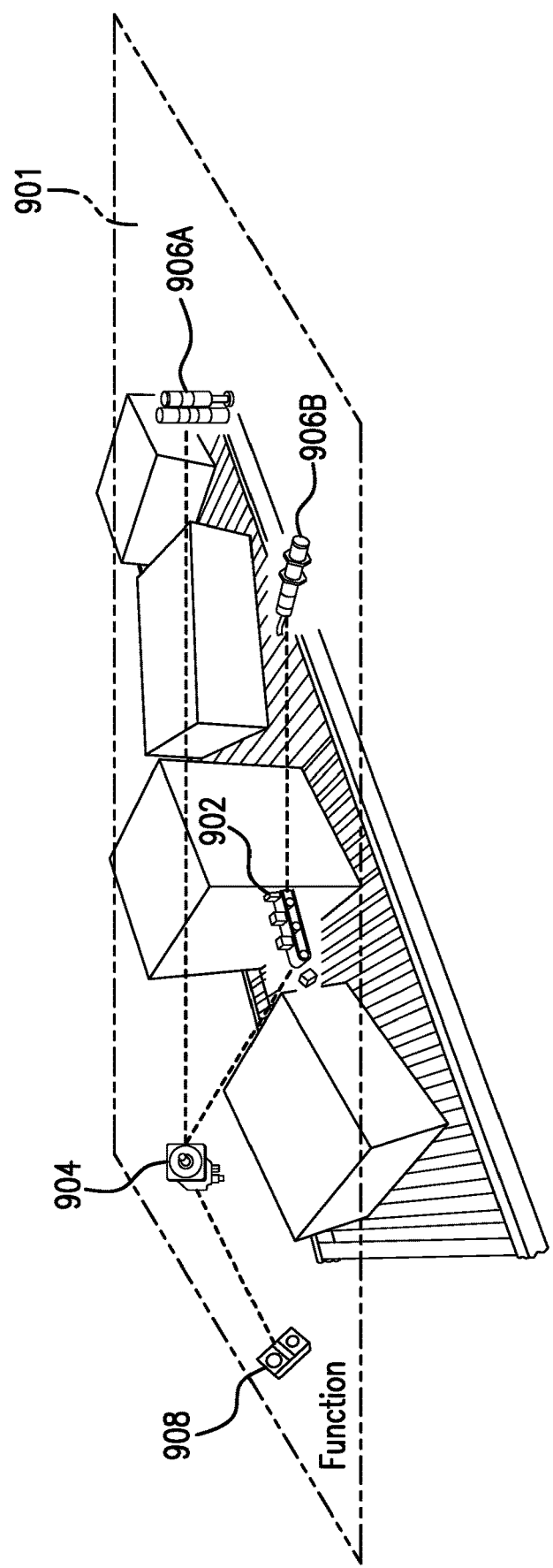
FIG. 9B is a block diagram illustrating an industrial function connectivity view of the example industrial application of FIG. 9A.
Figure 9C:
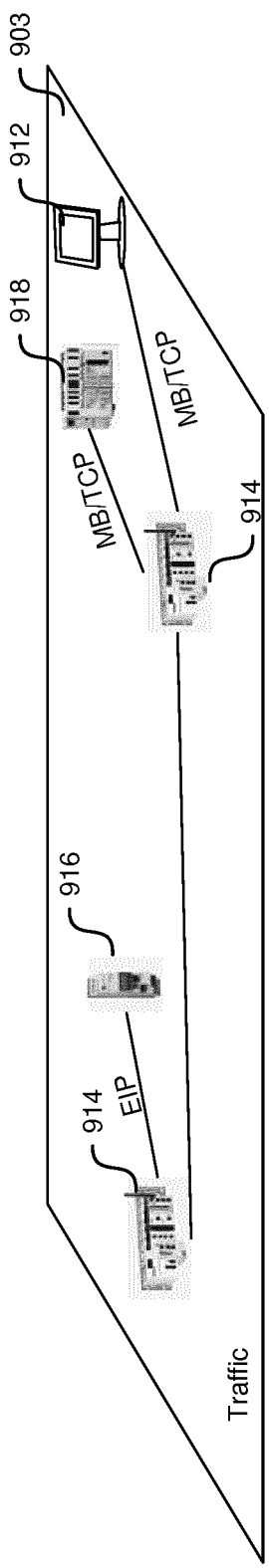
FIG. 9C is a block diagram illustrating an industrial traffic connectivity view of the example industrial application of FIG. 9A.

Given the function based connectivity view 901 depicted in FIG. 9B, the SDA system can suggest other elements needed to create and deploy the conveyor belt as depicted in FIG. 9A. For example, the SDA system can propose a user group 912 (e.g., for application control, maintenance and management) (Name: CONVEYOR BELT PERSONNEL PC, Group: G_CONVEYORBELT), redundant application controller 914 (Name: CONVEYOR BELT PLC, Serial No: SCH10001, Group: G_CONVEYORBELT), an actuator controller 916 (Name: CONVEYOR BELT MOTOR CONTROLLER, Serial No: SCH30077, Group: G_CONVEYORBELT) and a diagnostic controller 918 (Name: MAIN ALARM CONTROLLER, Serial No: SCH40066, Group:

G_CONVEYORBELT). In some embodiments, the SDA system can make these suggestions based on information provided by the user and information about rules and associations, user profiles, device profiles, and the like stored in one or more databases. For example, when a user selects a motor, the SDA system can automatically retrieve a catalog of motor controllers and suggest one that meets the user/design criteria. The rules and associations, in some embodiments, may be derived or learned from past designs and/or specified for each industrial application. The SDA system can also propose optimal connectivity via one or more industrial protocols as depicted. FIG. 9C depicts a traffic based connectivity view 903 illustrating optimal connectivity among the PC 912, redundant application controllers 914, actuator controller 916, diagnostic controller 918 using EIP and MB/TCP protocols. In some embodiments, the SDA system may propose the optimal connectivity based on information such as device capability, the number/type of ports, rules, and the like.

Figure 9D:
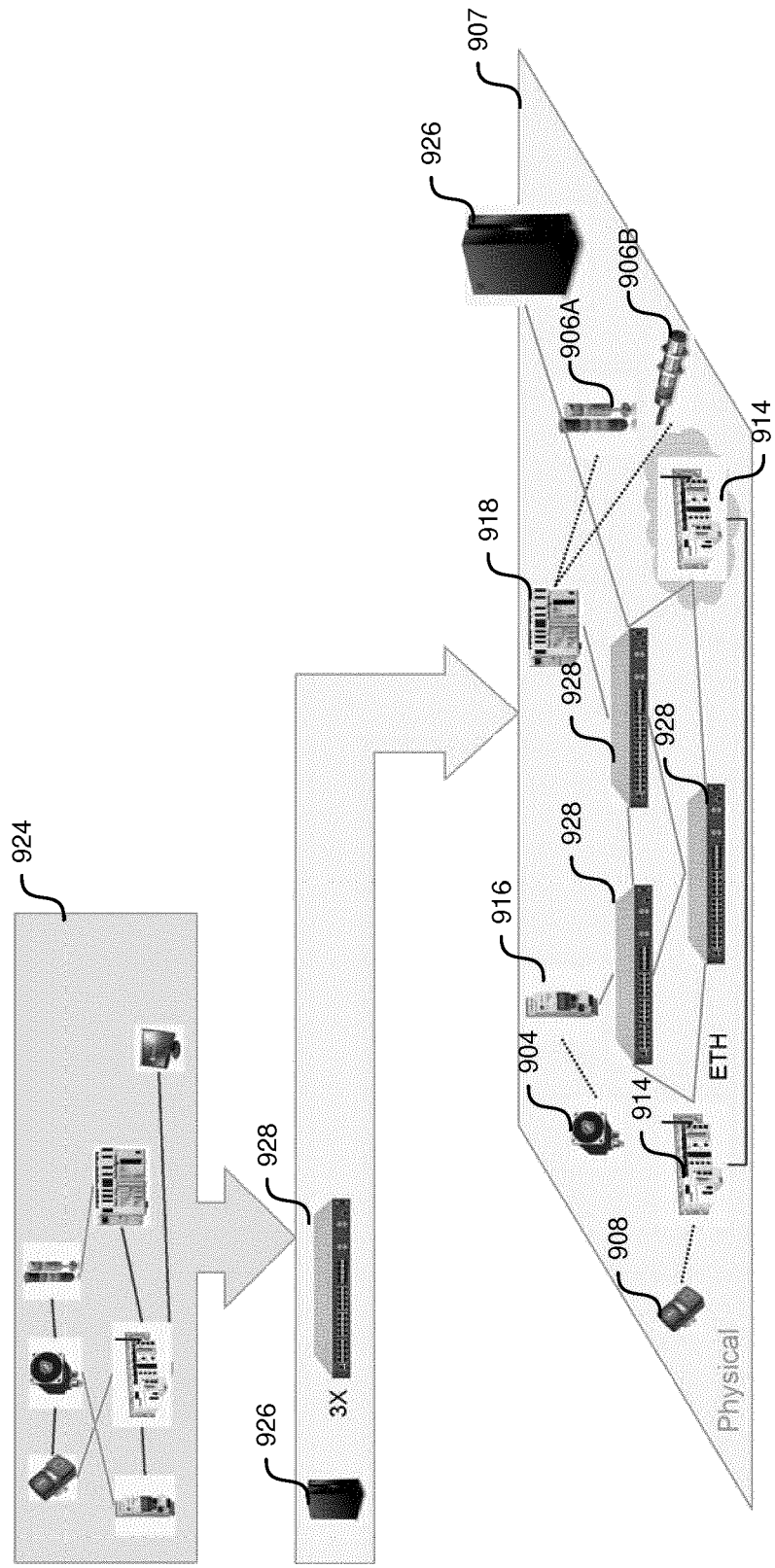
FIG. 9D is a block diagram illustrating an industrial physical connectivity view of the example industrial application of FIG. 9A.

After the assets and various controllers connected, the SDA system brings in the networking aspect. The information from the function based connectivity view 901 and the traffic based connectivity view 903 can serve as input to generate the physical connectivity as depicted in FIG. 9D. To generate the physical connectivity, the SDA system (e.g., via ISDNA) can instantiate networking elements such as a DNS server 926 and routers 928. The SDA system (e.g., via ISDNA) can also propose a network topology (e.g., redundant physical topology). In some embodiments, the SDA system can propose physical connectivity and network topology based on capability of selected devices, cost, rules, and/or other criteria. The SDA system can then connect the network elements in a topology (e.g., loop or mesh) depending on the cost and/or other criteria. The resulting physical connectivity view 907 depicts the three routers connected in a mesh topology.

Figure 9E:
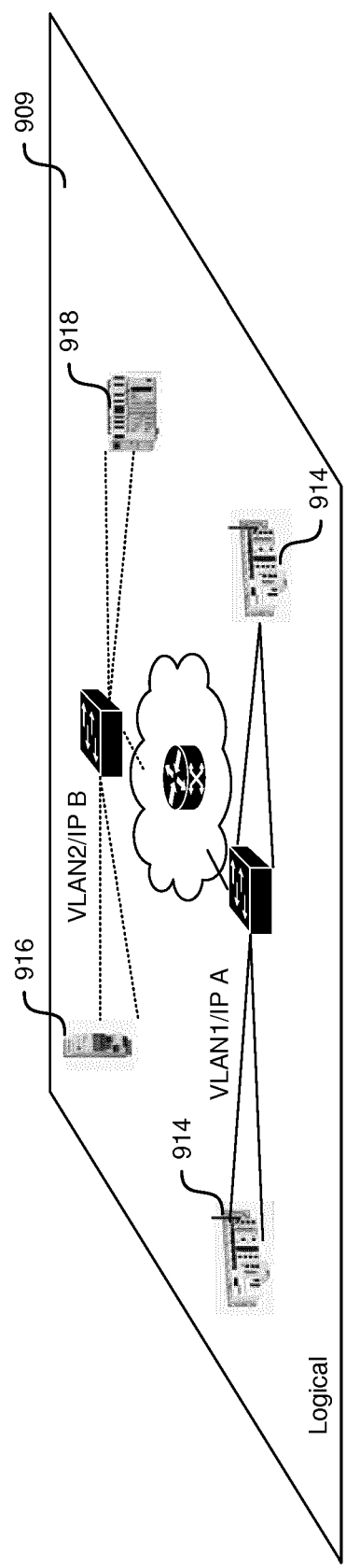
FIG. 9E is a block diagram illustrating an industrial logical connectivity view of the example industrial application of FIG. 9A.

On acceptance of the proposed physical connectivity, the SDA system (e.g., via ISDNA) can propose logical connectivity. The logical connectivity can be integrated with cybersecurity features and policies such as isolation of logical units (e.g., isolating diagnostics from control), firewalls etc. The logical connectivity can also be based on user input. For example, the user via the industrial application can request a firewall, a DNS, a NAT and a virtual switch to bring two VLANs together. The fog controller can instantiate the firewall in the fog server, and inform the ISDNA where the firewall is (e.g., via IP address) and enforce a cybersecurity policy that requires all the traffic to go through the firewall. The logical connectivity view 909 depicted in FIG. 9E illustrates two isolated control domains VLAN1 for control and VLAN2 for production. This logical connectivity view is simpler and easier to understand than the physical connectivity view.

At this point, the SDA system (via ISDNA) can propose communication paths based on load, capabilities of underlying infrastructure, time sensitivity and any user-defined criteria while underlying physical infrastructure is being completely abstracted. For example, in the traffic based connectivity view 903 depicted in FIG. 9C, the actuator controller 916 can communicate with the redundant application controllers 914 over EIP protocol. Similarly, the redundant application controllers 914 can communicate with the diagnostic controller 918 over Modbus TCP (MB/TCP). Based on this information from the traffic based connectivity view, the SDN controller can provision a path from the redundant application controllers 914 to the diagnostic controller 918 that allows only MB/TCP traffic. In this manner, the SDA system ensures compatibility with protocols.

Figure 9F:
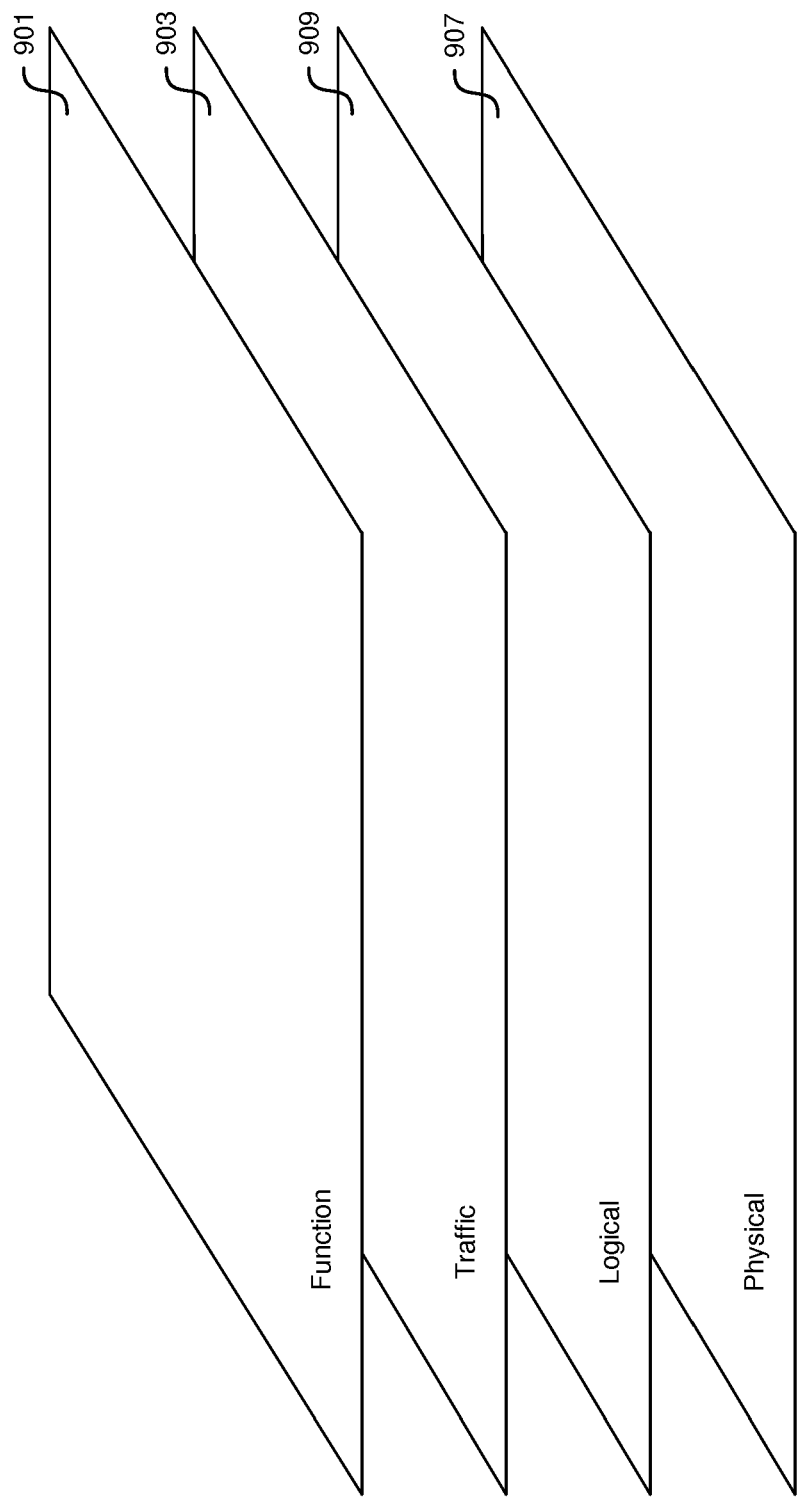
FIG. 9F is a block diagram illustrating the entire connectivity view of the example industrial application of FIG. 9A.

At this point, the SDA/SDN integrated industrial function design is considered complete. FIG. 9F shows the function 901, traffic 903, logical 909 and physical 907 connectivity views corresponding to the conveyor belt application.

8. Functional View of the Industrial SDN

The industrial network has many different users. Each network user has a different function within an organization and with each function comes a different perception of the network as well as need for different levels or types of information. Based on the typical industrial organization structure, table 2 below lists personnel groups according to their functions and their plausible interests as they pertain to the network.

TABLE 2

Personnel Groups and Network Aspect of Interest

| Personnel | Network Aspect of Interest |
| --- | --- |
| Management personnel | business status |
| Operations personnel | current operational status of industrial functions |
| Maintenance personnel | problem diagnostics, network expansion, decommissioning |
| Engineering personnel | network design, current state of network, historical network data |
| Security personnel | network design, current state of network, historical network data from network security perspective |

Figure 10:
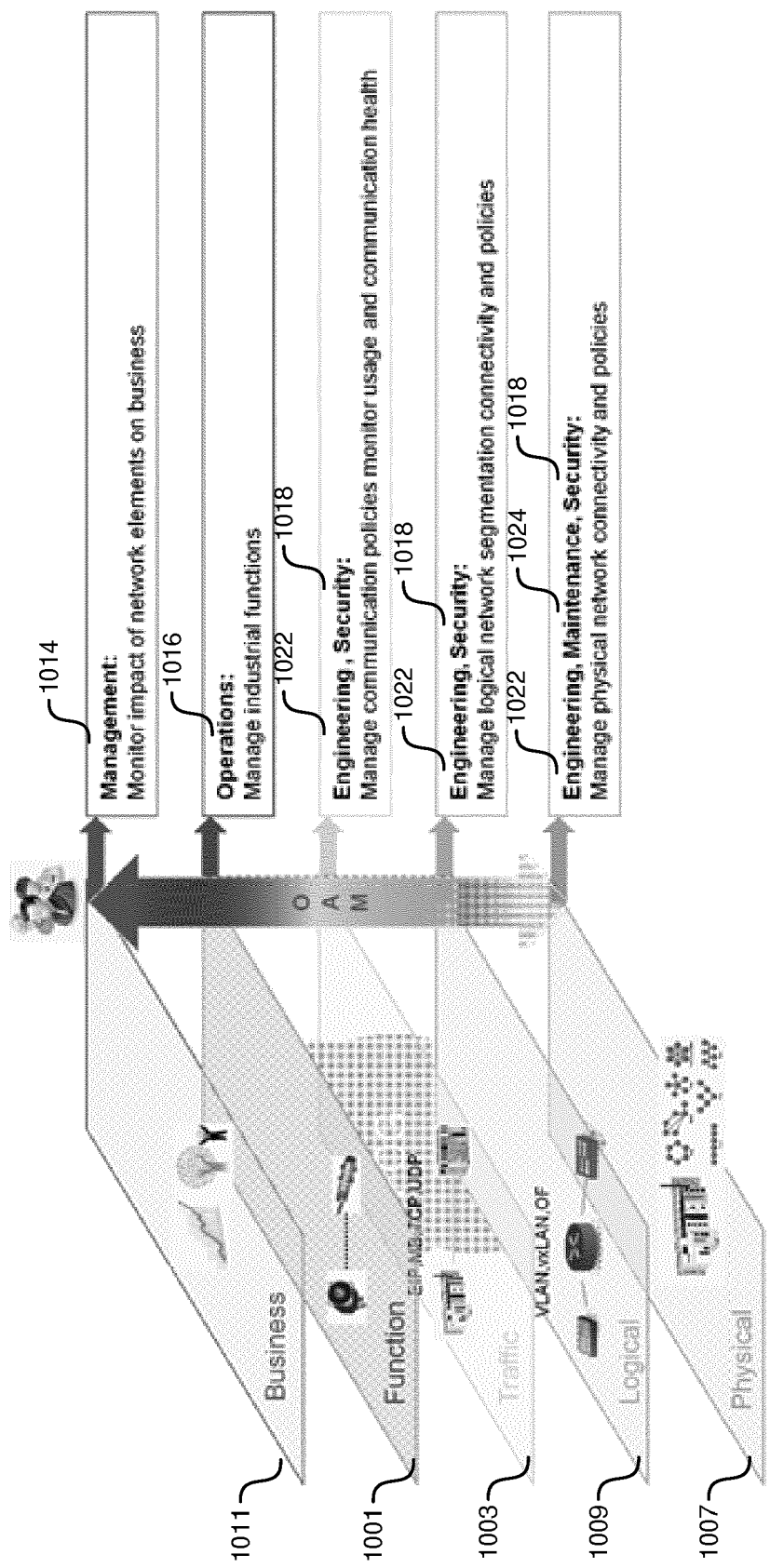
FIG. 10 is a block diagram illustrating the network views of ISDNA where each view provides a level of information suitable to the interests of a specific user group.

Based on these personnel groups ISDNA can be divided into five network views or planes, with each view conveying a level of information suitable to the interests of a particular group as depicted in the functional industrial SDN diagram of FIG. 10. In the diagram, the business view 1011 is targeted to the management personnel 1014 to enable the user to monitor impact of network events on business. The functional connectivity view 1001 is targeted to the operational personnel 1016 to enable the user to manage industrial functions. The traffic based connectivity view 1003 is targeted to both the security personnel 1018 and engineering personnel 1022 to enable the users to manage communication policies, monitor usage, communication health, and the like. The logical connectivity view 1009 is also targeted to the security personnel 1018 and engineering personnel 1022 to enable the users to manage logical network segmentation connectivity and policies, for example. Finally, the physical connectivity view 1007 is targeted to the security personnel 1018, engineering personnel 1022 and maintenance personnel 1024 to enable the users to manage the physical network connectivity and policies.

9. Monitoring and Maintenance of an Operational Industrial SDN

Once provisioning and commissioning have been performed, the operational industrial network can be monitored, and various actions may be taken in response to the monitoring data. In some embodiments, monitoring may be performed in a distributed manner by various components of the operational industrial SDN. For example, referring to FIG. 11A, an SDN controller 1155 in the control plane 1115 can include a data collection module 1155e as an application 1155b. The data collection module 1155e, programmed via the ISDNA 1140, can set up paths through the network to listen to what network devices in the infrastructure plane 1120 are forwarding. For example, if devices A and B are communicating via a network path that has 10 switches. The SDN controller 1155 (via the data collection module 1155e) can configure those switches (e.g., each switch or switches 3 and 10) to copy the packets they receive and forward to a collection agent 1127. The collection agent 1127, in some embodiments, can be a logically centralized data store (i.e., may be physically distributed in some cases) that is a repository for monitoring data collected from the devices in the infrastructure plane 1120. Ultimately, an analytics application 1129 can receive or retrieve monitoring data from the collection agent 1127 to perform various analyses including the analyses needed to generate network level specific information pertinent to users operating at each network level described in detail below. The analytics application is described in detail in reference to FIG. 13A.

In some embodiments, the SDN controller/ISDNA can monitor all levels of the network, from the physical level to the functional level. However, the sheer amount of information that is generated, and must be processed by the system can be overwhelming which can prevent a timely response. For example, the system may not be able to produce a timely diagnosis of a fault (e.g., what happened or where the fault occurred) if there is a massive volume of information to be processed. Moreover, the information from the monitoring and processing is not necessarily useful for all personnel groups. For example, consider a scenario where a driver hits a post where a cable was running through, resulting in the cable getting cut. In a redundant system, the production will not stop, i.e., the conveyor belt keeps operating. To an engineer, the information "connectivity loss at port 1" may be sufficient. However, this same information may have no meaning to an operational personnel or a management personnel who may not see any visible signs. In some embodiments, the ISDNA can solve this problem by providing adequate detail of information tailored to targeted personnel groups.

In some embodiments, industrial application developers can have a direct programmable access to various network events such as ART degradation, connectivity loss, security breach, etc., detected from the monitoring of all levels of the network. For example, consider the example of monitoring of ART which includes application processing time (APT) and network transition time (NTT). When the network is congested, the SDN controller can detect degradation of traffic throughput which results in degradation of ART. The ISDNA can monitor ART and detect its degradation. The industrial application developer can program the SDN controller via the ISDNA to respond to the ART degradation by redirecting traffic through less loaded paths, thus helping to recover the degraded ART. By way of another example, consider an intrusion on a network where a port is suddenly disconnected and another device appears on it and starts communicating using unknown protocols. The ISDNA which is monitoring all levels of the network can detect the disconnection of the port and messages of unknown protocols. An industrial application developer can program the SDN controller via the ISDNA to implement a prepared security plan. Such a plan may entail for example routing the traffic from the suspect device to a fake network (a security trap or honey pot) and thus isolating the intrusion from the actual network.

Figure 11B:
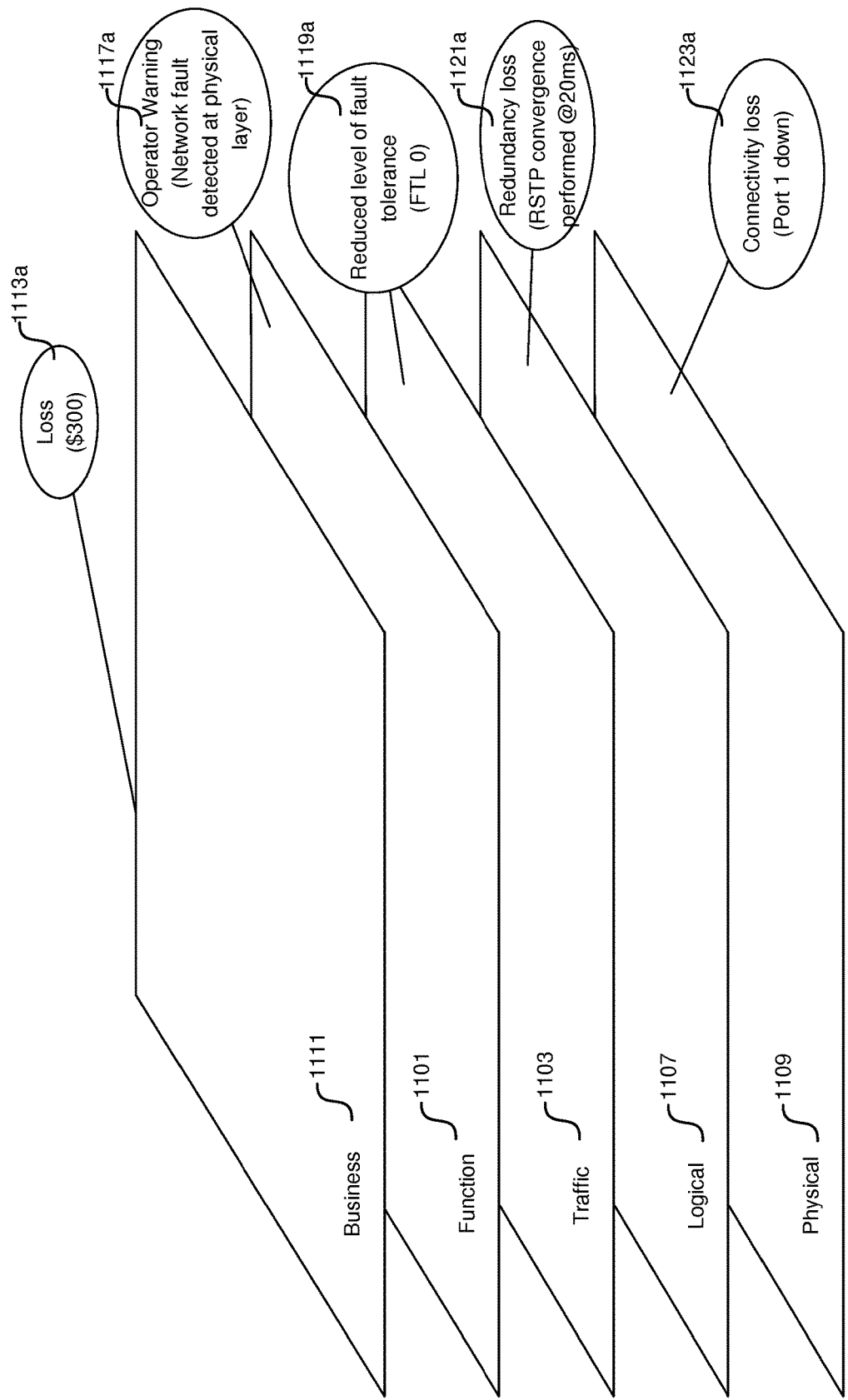
FIG. 11B is a block diagram illustrating a first example of a network fault propagation through the various network levels of an operational industrial SDN in accordance with some embodiments.
Figure 11C:
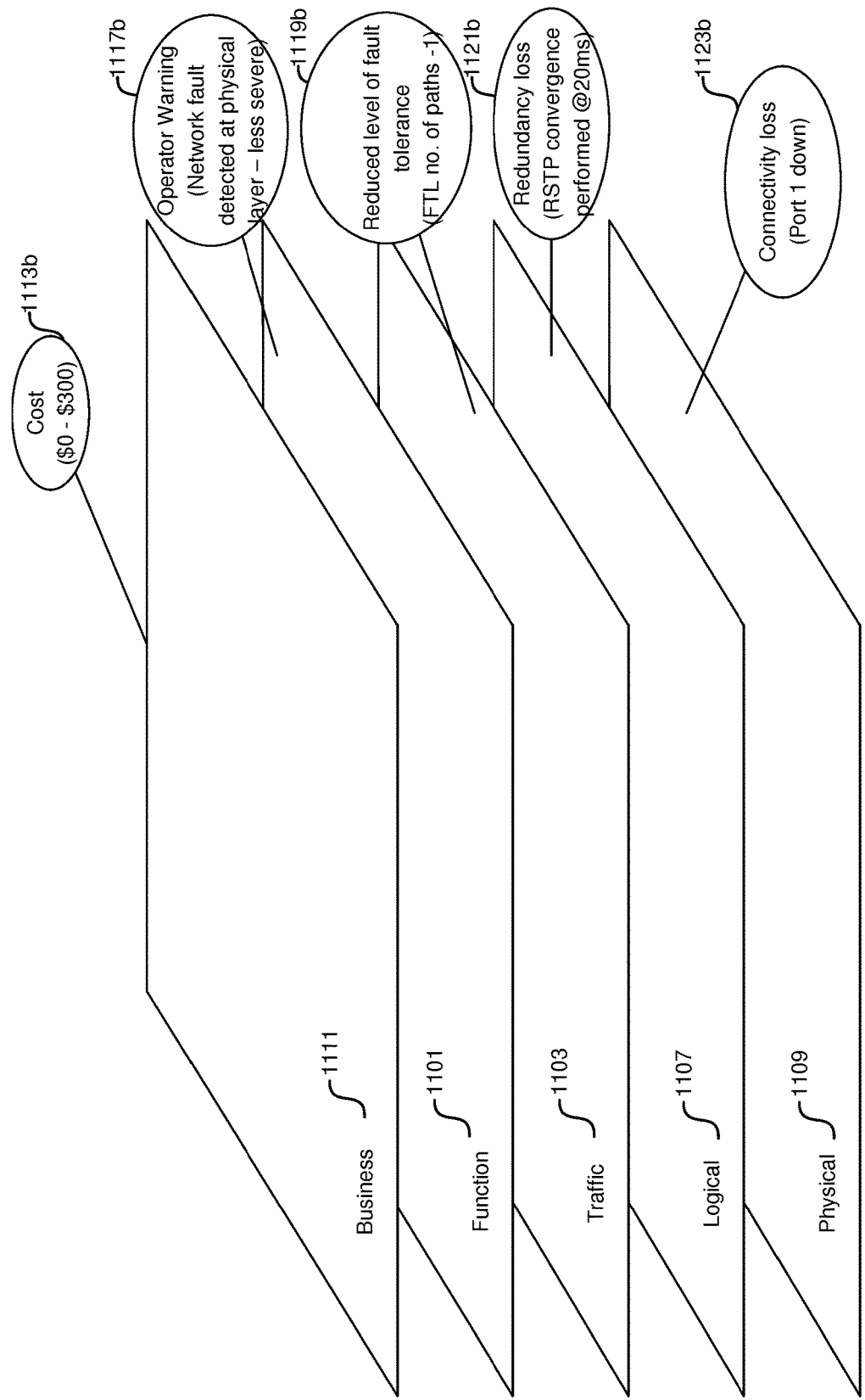
FIG. 11C is a block diagram illustrating a second example of a network fault propagation through the various network levels of an operational industrial SDN in accordance with some embodiments.
Figure 11D:
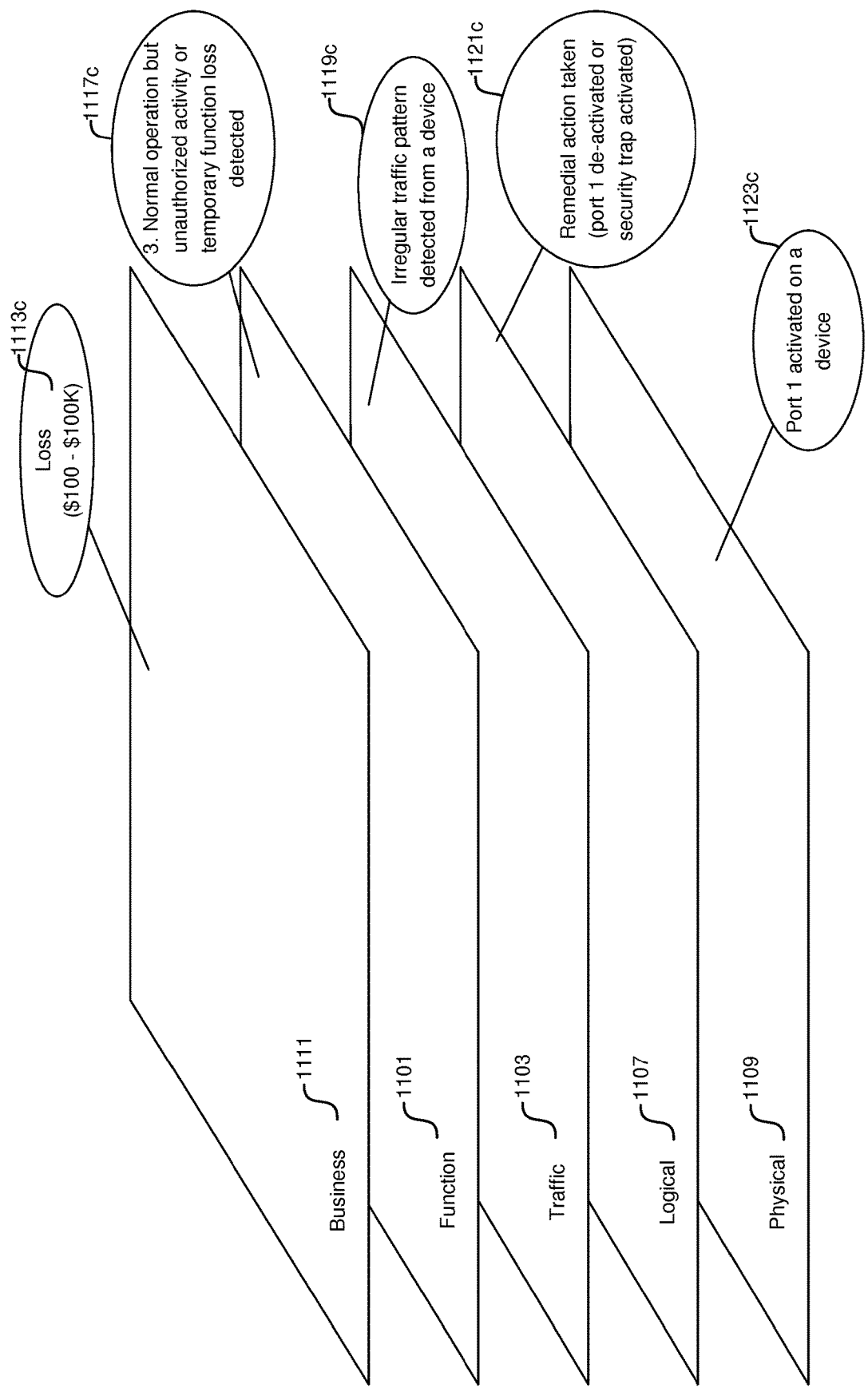
FIG. 11D is a block diagram illustrating a third example of a network fault propagation through the various network levels of an operational industrial SDN in accordance with some embodiments.

The ISDNA has a central view of the network and is aware of network events occurring in the network. Referring to FIGS. 11B, 11C and 11D, this means that the ISDNA is monitoring the physical, logical, traffic and function levels of the network and can correlate network events occurring at one level with changes in other levels.

In some embodiments, at the physical level 1109, the ISDNA can:
monitor network statistics such as per port bandwidth utilization, network bandwidth utilization, throughput, and the like,
acquire device specific information like physical location, power usage, and the like,
determine physical distance between devices (e.g., used in visualization and material estimation equations),
discover network connectivity and device capabilities,
monitor network connectivity,
monitor physical connectivity such as port link states, connection speed, and the like,
monitor logical connectivity,
create and enforce connectivity policies,
correlate and propagate network events to users in view appropriate detail.

For example, when a single physical link fails resulting in connectivity loss at port 1 as depicted in FIG. 11B, the ISDNA can correlate the connectivity loss network event 1123 to other network level information available (e.g., from the above listing) to determine physical connectivity view information such as the type of network event, the equipment affected and location of the affected equipment that are relevant to users operating at this level (e.g., the engineering, maintenance and/or security personnel). Using the physical connectivity view information associated with the network event, a maintenance personnel, for example, can take a remedial action (e.g., plug the cable in port 1) to mitigate or resolve the problem.

As the information from this level is propagated to the logical level 1107 above, network protocol information detail is available. In some embodiments, at the logical level 1107, the ISDNA can:
monitor network statistics such as bandwidth utilization, network response time, discover logical network connectivity and device capabilities,
monitor network logical connectivity,
create and monitor connection parameters (e.g., LAG, connecting speed and direction, redundancy)
create and describe network behavior such as quality of service level network access level control
create and enforce logical network segmentation
create and enforce network access policies
monitor configuration and operation of networking technologies
correlate and propagate network events to users in view appropriate detail.

The ISDNA can correlate the information available at the logical level 1107 with information propagated from the physical level 1109 to determine or generate logical connectivity view information 1121a relevant to users operating at this level. For example, assuming that the network of FIG. 11B is based on a ring topology, the ISDNA can inform engineering and/or security personnel that it took the system toms to detect the connectivity loss network event 1123a at the physical level 1109 and switch to an alternate path that avoids the impacted network device.

As the information reaches the traffic level 1103, it starts to take a more general shape in conveying meaning of fault rather than protocol details. The ISDNA at this level can:
monitor per connection health and status
monitor protocol statistics such as PPS, network response time.
monitor amount and type of traffic generated by devices.

discover traffic and device capabilities (see application of analytics)

create and enforce communication policies.

distributed transmission (each communication channel takes arbitrary path through network)

aggregated transmission (all communication channel between two devices takes specific path)

correlate and propagate network events to users at view appropriate detail.

In the example of FIG. 11B, the ISDNA can provide users (e.g., engineering and/or security personnel) information 1119a that the system is running on a reduced level of fault tolerance (i.e., Fault tolerance level or FTL has gone down from 1 of 0).

As the information reaches the function level 1101, the interpretation of fault can be a simple warning and status of the underlying network. From a networking perspective of industrial function, the ISDNA can:

discover industrial functions manage industrial functions—grouping, isolation, function access control management profile, create, delete, and modify, industrial functions. (Creation and deletion modification is not intended as main programming interface it is rather integration with global SDA application)

monitor connectivity monitor communication health monitor application response time create and enforce communication policies ART based connection management using TSN propagate network events to users at view appropriate detail.

In the example of FIG. 11B, the ISDNA can provide users operating at this level (e.g., operations personnel) an operating warning 1117a that the network fault was detected at the physical layer 1109, but the conveyor belt application is still running.

Finally, the information is propagated to the business level 1111 which presents a coalesced view of all underlying issues to form a business perspective (e.g., financial loss or gain) where business attributes are assigned to the fault completes the entire view. In other words, at this top level view, all available information from all four ISDNA planes is coalesced to form a financial or business image of an industrial process in pseudo real time. Non-limiting examples of business attributes include: estimated down time, cost of repair, and the like.

From a networking perspective of business application, the ISDNA can enable a user operating at this level to:

assign financial profile to functions, traffic or connectivity monitor resources operating and maintenance cost from financial perspective assign cost value to production impediment In the example of FIG. 11B, the ISDNA can provide users operating at this level (e.g., management personnel) the cost 1113a associated with the connectivity loss event 1123a at the physical level 1109. For example, in this example, the estimated cost of repair is determined to be $300 and may be based on: maintenance personnel cost/hour*hours worked (e.g., $ too/hour*0.5 hour)+material cost (e.g., $250). If for example the network event was serious enough to cause production downtime, then the cost or loss may be determined as follows: number of units produced per hour*average profit per unit*number of hours of downtime. It should be noted that these cost calculations are examples. Cost or loss associated with a network event may be calculated in any number of ways based on business attributes such as but not limited to: estimated down time, cost of repair, and the like.

FIG. 11C is a block diagram illustrating a second example of a network fault propagation through the various network levels of an operational industrial SDN configured in a mesh topology in accordance with some embodiments. When a cable is pulled from a device, a connectivity loss network event 1123b occurs at the physical level 1109. Information about this network event may be correlated with other information available at this level to inform a user operating at this level that port 1 is down because of a connectivity loss event (1123b). The information from this level may be propagated to next logical level 1107 where the information from the physical level 1109 may be correlated with information available at this level to inform a user operating at this level that redundancy loss occurred and the system was able to recover within toms (1121b). Information available at the logical level may then be propagated to the traffic level 1103 where the received information is correlated with available information to inform a user operating at the level that the system has a reduced level of fault tolerance with the fault tolerance level down from 10 paths to 1 (1119b). At the function level 1101, information propagated from the traffic level 1103 is correlated with available information to generate an operator warning that a network fault with a low severity was detected at the physical level (1117b). At the business level 1111 where information from all levels is coalesced, a user may be provided with a financial cost (1113b) of the network fault at the physical level. For example, the cost may be $0 if the system was planned to operate with the reduced level of fault tolerance (e.g., designed to take no action until FTL is down to 5). Alternatively, if the system was specifically designed to operate with FTL of 10 (i.e., FTL less than 10 may cause congestion to increase and impact the production), then there is a financial cost associated with the network event to have a maintenance person locate the impacted device and plug in the cable (e.g., $300).

FIG. 11D is a block diagram illustrating a third example of a network fault propagation through the various network levels of an operational industrial SDN in accordance with some embodiments. As in the case of FIGS. 11B and 11C, a network event detected at one level is propagated through the other levels all the way to the business level 1117, and correlated with information available at each level to generate at each level, level-specific network event information pertinent to users operating at that level. In this example, a network event related to activation of a port (1123c) may be detected at the physical level 1109. Alternatively, a network event related to an irregular traffic pattern (1119c) from a device may be detected at the traffic level 1103. Both network events are indicative of an unauthorized intrusion or a cyberattack. In some embodiments, the SDN controller may be configured via the ISDNA to implement a prepared security plan in the event of an unauthorized intrusion. Such a plan may entail, for example, routing the traffic from the suspect device to a fake network (a security trap or honey pot) and thus isolating the intrusion from the actual network. If the security plan was successfully activated, the ISDNA can translate this network event (1119c or 1123c) into logical level specific network information that informs a user operating at the logical level 1107 that network event was handled by activating the security plan (1121c). In some cases, the cyberattack may be handled by de-activating the port associated with the network event, in which case the logical level specific network information would inform the user of the same. Similarly, the ISDNA can translate the same network event into function level specific network information to inform a user operating at the function level 1101 that the system is operating normally but there was an unauthorized activity (1117*c*). Alternatively, it may be possible that the unauthorized intrusion caused some temporary function loss before the remedial measures took effect. In such an instance, the user may be informed that the system is operating normally after a temporary function loss (1117*c*). Finally, at the business level 1111, the ISDNA may determine the cost (1113*c*) of the unauthorized activity. In this example, the cost may be anywhere between $100 to $100,000 (i.e., minimal to significant loss). For example, if the unauthorized activity was due to a user accessing an authorized site from a PC, the cost of informing the user about policies will be minimal. However, if the unauthorized activity was due to a PC infected with malware, the whole network may be brought done or need to be made offline to deal with the problem.

In this manner, ISDNA can propagate a network event through the network levels, correlating at each level the information from that level with that from the preceding level to generate and/or select information relevant to users operating at that level. Thus, each level provides a distinct level of information based on the skill set of the users who operate at that level. Adequate level of information flow and dissipation at appropriate perspective, means users can get information that is relevant to their roles which can help with prompt decision making, and potentially prevent bigger problems or financial losses. Moreover, the combination of all network views and its functionality levels provides users with a complete sense of network control and security.

It should be noted that a network event can be any event occurring in a network that causes or is capable of causing a change to the network. The change may be adverse or unintended, or positive or intended. Connectivity loss and cyberattack are only examples of a network event. Other events such as but not limited to: network device failure, detection of unknown/unnecessary traffic, and the like are also network events. These network events can contribute to generic system degradation, and will have an associated cost at the business level. Network device failure can itself be due to various reasons. For example, one type of network device failure may not manifest in connectivity loss at physical level but it fails at forwarding level and may be a reactionary event in response to communication loss on other affected devices. Another type of network device failure may be related to uncontrollable retransmission of frames by a network device. Yet another type of network failure may be related to detection of unnecessary traffic in specific areas of a network (e.g., due to faulty network/SDN policy interpretation). A network device failure may also be related to a network device that fails to apply a requested SDN policy, or a network device which is partially operational and forwards traffic at previously configured policy, but it is no longer accessible to the SDN controller. An example of a network event that causes a positive or intended change in the network is when a device is successfully authorized to participate in the network.

It should be noted that the term view is not limited to visual representation of information. It can include information in a form that is readily consumable by a software application or interfaces (e.g., visual or programing interfaces, APIs, etc.). In some embodiments, the views corresponding to these ISDNA planes can be integrated in augmented or mediated reality format. Based on user of view and level of interest, information gathered in a centralized SDA application can be interlaced with real factory view which can improve troubleshooting, provide instant production feedback, and the like.

10. Factory as a Service

A typical factory building process is an effort that is not only expensive but also time consuming. When a factory is built, it is typically run for many years until it runs into some issues. For example, another production line needs to be added, factory space is too small, factory needs to be moved somewhere else, etc. Whatever the reason, building the same/similar factory elsewhere is not easy, and usually requires bringing in outside help to start from scratch. Moreover, various information such as equipment lists, specifications, applications, protocols, etc., must be gathered to aid in the new factory building effort. The industrial SDN architecture described herein utilizes factory as a service model to enable a simple copy-paste-chain operation that would result in a plant design based on industrial function chaining. Intelligent chaining or stacking may occur on all layers of the industrial application with proposition for reduction of OPEX and CAPEX by reuse of infrastructure and logical isolation of communication.

Figure 12:
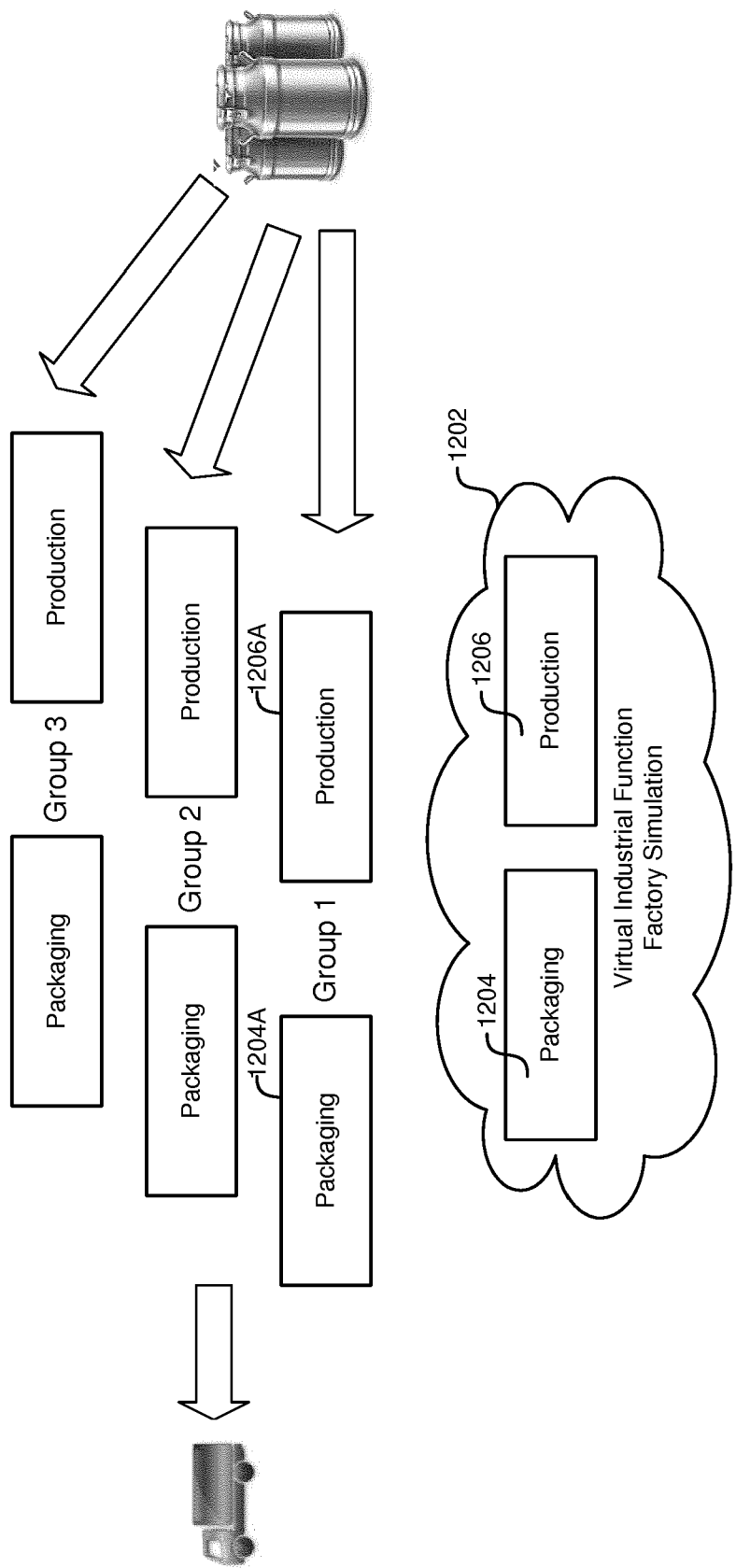
FIG. 12 is a block diagram illustrating an example implementation of a factory as a service in accordance with some embodiments.

Consider an example of the conveyor belt application creation process described in reference to FIGS. 9A-9F. This process produces an SDA function which can be intelligently chained to another to form a production group. The creation of a production facility out of abstracted industrial functions is referred to as "Factory as a Service." FIG. 12 depicts an SDA factory as a service where milk gets processed into ice cream and packaged and on to a truck for delivery. Suppose the first factory (group 1) includes a packaging function 1204A (e.g., conveyor belt application) that is chained to another to form a production group 1206A. The SDA system has all the information about the function, traffic, logical and physical layers of the first factory application stored in one or more data stores. In some embodiments, for example, each of the SDA functions can be stored in the form of a template. In other embodiments, the entire factory comprising SDA functions chained together can be stored in the form of a template. When a second factory is to be created (group 2), a user may simply drag and drop a factory icon or function icons and chain them together in the design application. If for example newer/improved controllers are available, a replace operation can be performed to update or modify the templates. The SDA system may then automatically generate the underlying traffic, physical and logical connectivity views, provision the necessary network paths, commission the infrastructure and industrial devices, and so on to create a fully operational factory. In some embodiments, the SDA system may offer a simulation mode in addition to the real mode. In the simulation mode, the SDA function is a virtual SDA function (e.g., 1204, 1206) where all the industrial and network devices are virtualized devices hosted in the fog server or a distributed computing environment 1202. The SDA system can then use the virtual SDA functions to simulate the entire industrial process. Data from the simulation can then be used for simulation can be used for design, sequential provisioning and commissioning, live expansion, maintenance testing, optimization of production facilities, etc. In some embodiments, simulation data may be utilized to estimate CAPEX (capital expenditure) and OPEX (operating expenditure) of SDA deployment.

11. Analytics Application in an Industrial SDN

Figure 13A:
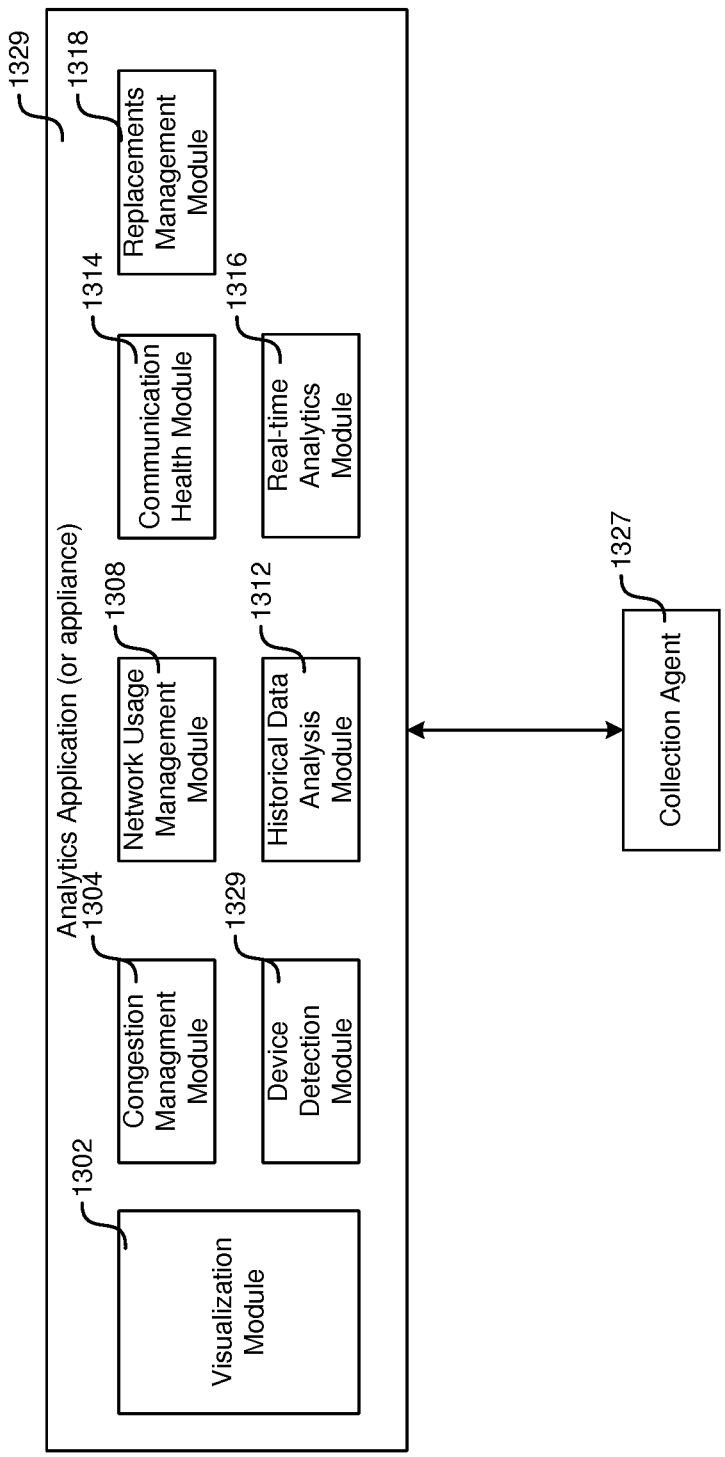
FIG. 13A is a block diagram illustrating example components of an analytics application in an operation industrial SDN in accordance with some embodiments.

FIG. 13A is a block diagram illustrating example components of an analytics application 1329 in an industrial SDN. The analytics application 1329 can be virtualized (e.g., in the fog server or in an external cloud), or may be a physical hardware appliance (e.g., with powerful processing capabilities). The analytics application 1329 can access monitoring data from a logically centralized collection agent 1327 and perform various analyses in real time or pseudo real time. By way of example only, and not by limitation, analytics can be used to:

- detect and manage congestion problems (holistic real time network balancer combining real and virtual networks)
- detect presence of devices (device profiling based on communication patterns)
- confirm effectiveness of rules and policies (detection and management of unwanted and allowed traffic)
- historical data to predict potentially troublesome communication patterns (reacting to application created network harmonics, elevated management packet presence, lack of predicted communication as fault detection)
- monitor health of communications (jitter detection/measurement)
- provide industrial function statistics and network profiling (real time analytics as ART measurement, fault recovery time detection)

I. Example Case: Congestion

Users can detect and manage congestion problems. Congestion detection can achieve holistic real time network balance combining real and virtual networks.

Figure 13B:
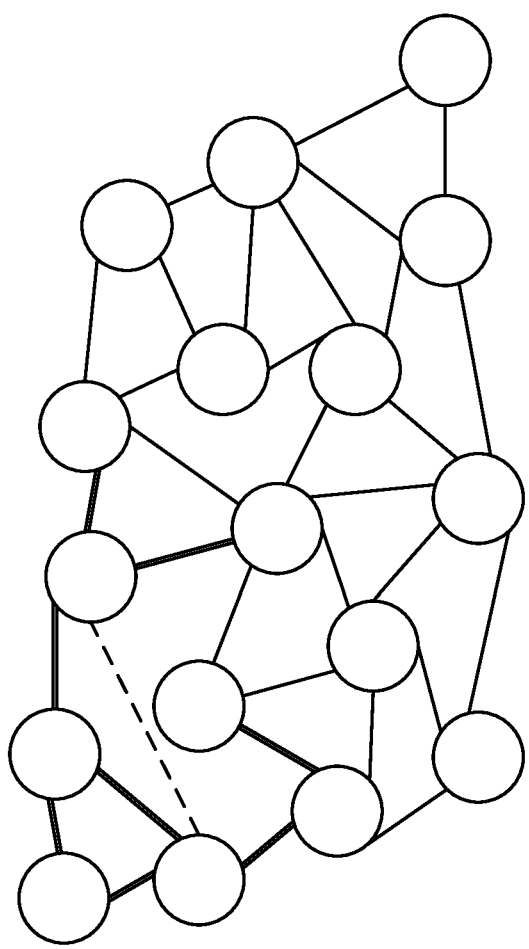
FIG. 13B is a block diagram illustrating a map of objects depicting real time representation of connectivity between the objects. to monitor and analyze congestion problems in the industrial SDN in accordance with some embodiments.

A congestion management module 1304 of the analytics application 1329 can implement an example congestion management solution that includes building an accurate map of all of the objects (e.g., sensors, machines, and computers) in an interactive site, with lines showing how each object connects to another. The example map illustrated in FIG. 13B depicts a real-time representation of what is going on exactly at that moment. In the example map, the solid single lines depict positive communication between the objects, solid double lines depict working connections that are not being used at the moment and the dotted lines depict communications that are not functioning correctly.

If, for some reason, manufacturing has halted, building management can examine this map and point exactly to the faulty piece of equipment, instead of playing a guessing game. In this manner, problems can be solved more efficiently and quickly. Furthermore, each object's (e.g., product or device) efficiency does not apply to all other objects, but rather only certain other objects in some embodiments. Thus, when an object is not working properly, the object can alert only those who need to be informed. Some examples of notifications can include: a light turning on/off, an automatic phone, or an automatic email could be sent out. This is the most efficient way of monitoring an industrial network.

By implementing the user map, organizations can monitor the networks and analyze congestion problems. Congestion problems can resolve themselves because once the system realizes that there is an issue, it can choose the best option and either cut it off from the network or redirect the activity to relieve the crowding. A visualization module 1302 can render the user map and/or other graphics.

II. Example Case: Device Detection

In some embodiments, a technique of device profiling based on communication patterns can be used to detect presence of devices via a device detection module 1306.

A user map such as the one described above can be implemented to enable organizations to analyze exactly what is happening at any time. The map could depict different representations of what each device is. For example, a computer can have a different appearance than a cell phone. Depending on the device profile (i.e., a computer, a cell phone, am HMI device), the protocol can automatically reconfigure the network if necessary, while still maintaining productivity. For example, it is better to disconnect a guest's device, like their cell phone, than it is to interrupt an industrial process and lose products or profits.

In another implementation, the cell phone's traffic can be redirected to alleviate the traffic near the industrial process. This is an implementation of descriptive analytics because it is showing real-time data.

III. Example Use Case: Network Usage

In some embodiments, real time data and analytics can be used to analyze network usage, detect and manage unwanted and allowed traffic and monitor organization's rules and policies among others via a network usage management module 1308.

Organizations typically have sites that are blocked because of content. However, users still may try and access these sites or other sites that have not been put on the restricted list. When these sites are attempted to be accessed, an alert can be sent to a network admin or other personnel to keep an eye on the network. This enables an organization to maintain a safe network.

In some embodiments, technology that enables the use of fingerprints for sites can be implemented. There can be different fingerprints for sites and even multiple fingerprints for sites within sites. For example, Gmail and Google Drive can have different fingerprints. Analytics can be collected on these fingerprints and analyzed to see what people are doing and when people are accessing these sites. For example, an analysis on social media usage can be used to generate an image that represents the applications being accessed on the network. The bigger the bubbles, the more they are being accessed. This is an implementation of prescriptive, predictive, diagnostic and descriptive analytics because it is combining historical data with real-time data to analyze what went wrong (or right) and decide what to do in the future to have a better outcome.

IV. Example Use Case: Historical Data

In some embodiments, historical data can be analyzed via a historical data analysis module 1312 to predict potentially troublesome communication patterns. The analysis can be based on reaction to application created network harmonics, elevated management packet presence, lack of predicted communication as fault detection, and the like.

Figure 13C:
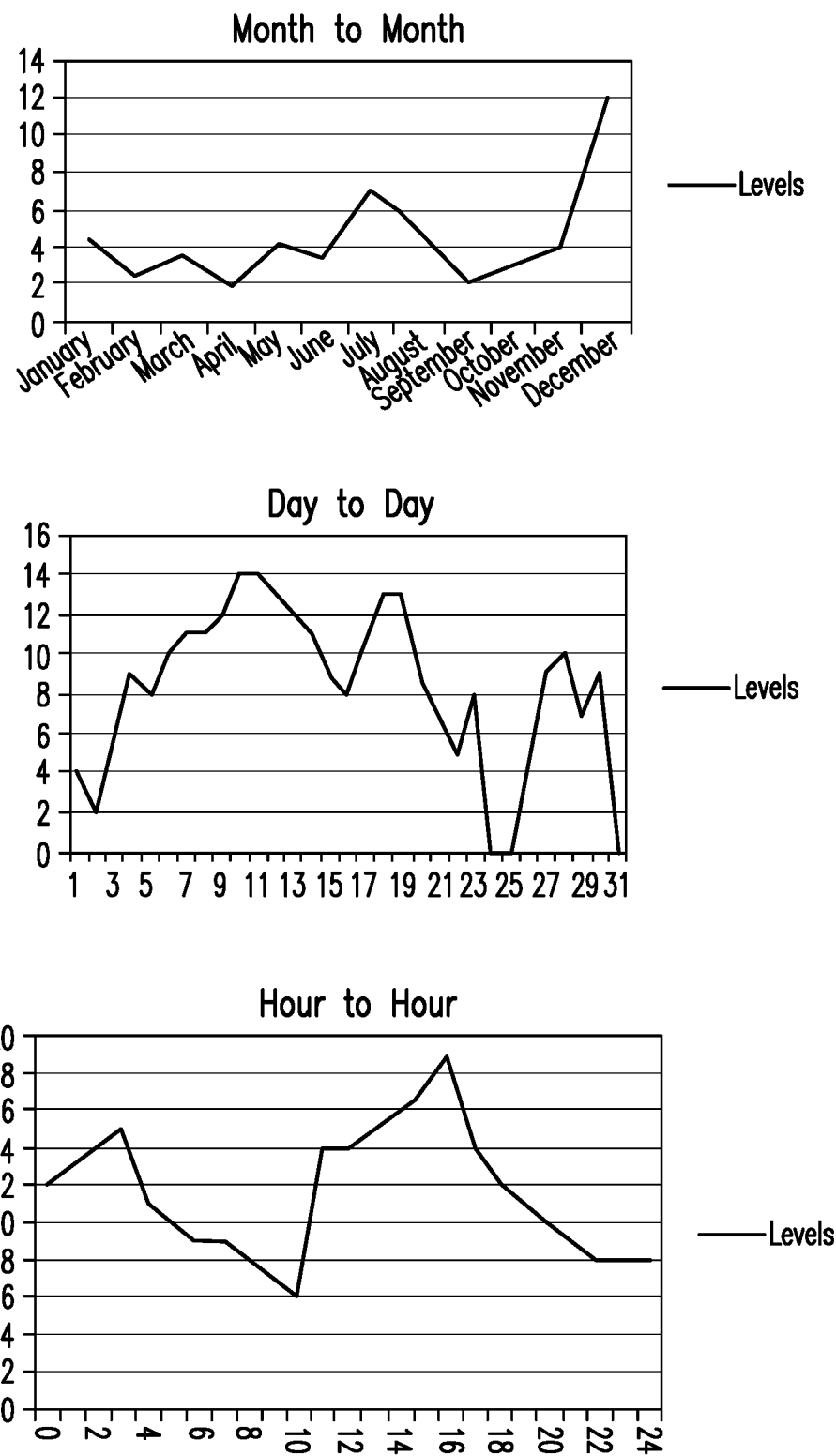
FIG. 13C is a block diagram activity trends on a month to month basis, day by day and hour by hour.

For example, a site can generate data trends and predictions, and graphs can be produced showing activity on a very high level. Some example graphs can include: month to month basis, day by day, hour by hour as depicted in FIG. 13C. These graphs can depict which machines are communicating on certain days, and to detect if something seems to be going wrong during a cycle. These graphs can be useful for not only understanding the process but also deciding when to schedule replacements or other time sensitive repairs that could interrupt the process. This is an implementation of predictive analytics because it uses historical data to better predict the future.

There are many applications of interactive real-time graphs such as the ones described above. Apart from managing communication between machines, the graphs can be used to predict replacements as well as staffing trends. Customers can examine the graphs and see when there is a lull in communication, or certain days of the month that are extremely busy. Using this information, the users would know to staff fewer or extra employees based on the predicted amount of traffic on that specific day.

If it becomes evident that a certain sensor or machine seems to die during the same part in the cycle, industries could begin to preemptively switch the sensor or machine out with one during a quiet time in the cycle before it dies. This will be more efficient because the process need not be interrupted or stopped due to a faulty piece of equipment.

V. Example Use Case: Communications

In some embodiments, health of communications can be monitored. For example, jitter can be detected and measured to assess the health of communications via a communication health module 1314. This is an implementation of prescriptive, predictive, diagnostic and descriptive analytics because it is combining historical data with real-time data to analyze what went wrong and decide what to do in the future to have a better outcome VI. Example Use Case: Real-Time Data In some embodiments, a real-time analytics module 1316 can make available industrial function statistics and network profiling information for review by users. Real time analytics can include, for example: ART measurement, fault recovery time detection, and the like. This is an implementation of descriptive analytics because it is based on real-time data.

VII. Example Use Case: Replacements

In some embodiments, a replacements management module 1318 can use analytics to determine which products/devices can be preemptively replaced in order to avoid interrupting processes.

Figures 13D, 13E:
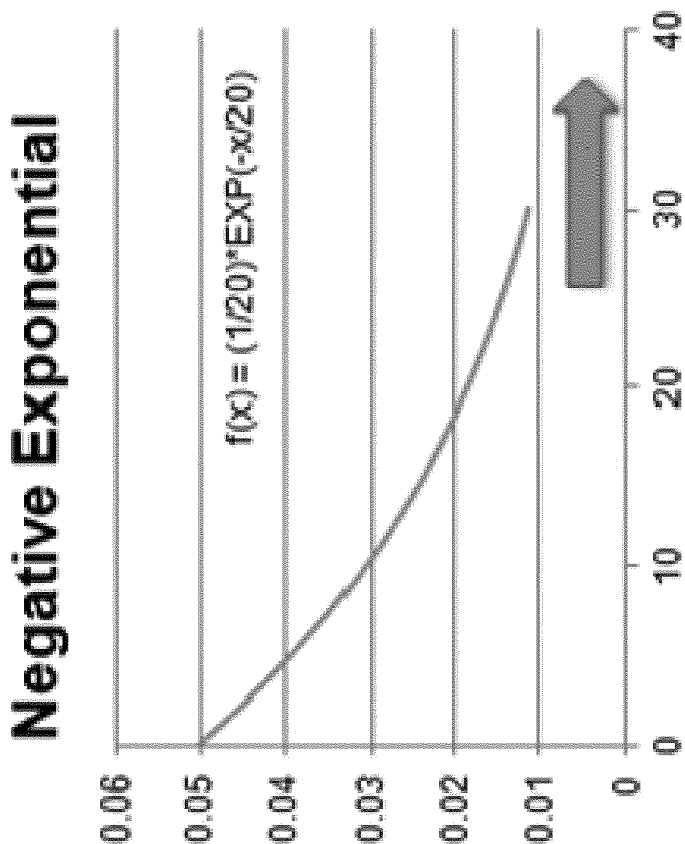
FIG. 13D is a diagram illustrating decline of productivity of a product as a function of time using an exponential density function.
FIG. 13E is a table showing the probability of a failure of product as a function of years.

In some embodiments, the replacements management module 1318 can implement an exponentially decreasing probability density function (PDF). Exponential functions can provide models for describing random variables (e.g., lifetimes of light bulbs and many kinds of electronic components). Exponential functions can also be used to model the amount of time until some specific event occurs. Most products have a warranty of a specific amount of years, for example a warranty of twenty years as depicted in FIG. 13D. Around twenty years, the productivity will begin to decline, and by using the exponential density function, an organization can determine when the product is most likely going to fail, and they can preemptively replace it. Using the twenty-year example, there is a plethora of available calculations. The table depicted in FIG. 13E shows some of the calculations. The probability that the product will die before year 20 is 36%, while the probability it will live between the years 20 and 30 is 14%, and so on. This data can be used to assess the gains and losses by preemptively replacing the product at a certain year, or just let the product run its course, possibly interrupting the entire process and resulting in an overall loss. By looking at the historical timeline graphs, organizations can decide when the best time to replace the product would be that would disrupt the entire process the least.

12. Example Methods

Various example methods implemented in an industrial SDN having the architecture described in FIGS. 5A-C will now be described.

Figure 14:
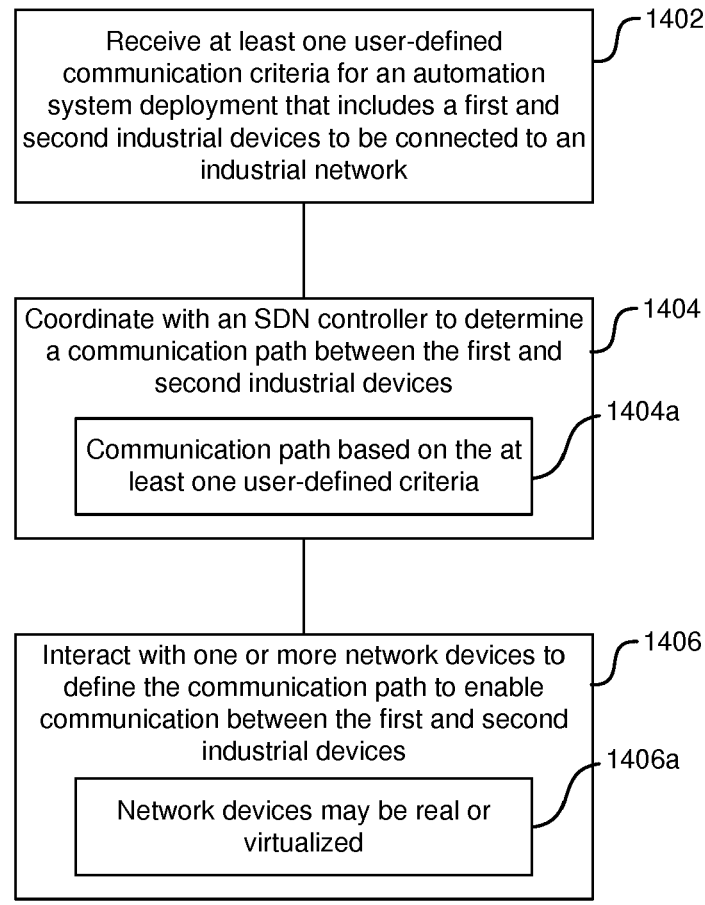
FIG. 14 is a logic flow diagram illustrating an example method for simplifying network infrastructure deployment and maintenance in an industrial domain in accordance with some embodiments.

FIG. 14 is a logic flow diagram illustrating an example method for simplifying network infrastructure deployment and maintenance in an industrial domain in accordance with some embodiments. In this example method, ISDNA can receive at least one user-defined communication criteria for an automation system deployment at block 1402. The automation system deployment can include at least a first industrial device and a second industrial device connected to an industrial SDN. In some embodiments, the automation system deployment can define network level services (e.g., firewalls) that need to be instantiated in the industrial SDN network. In some embodiments, the user-defined communication criteria may be received from an industrial application (e.g., executing on an application plane of the industrial SDN architecture). Non-limiting examples of the user-defined communication criteria include load, quality of service, network device capabilities, time-sensitivity, and/or the like.

At block 1404, the ISDNA can coordinate with an SDN controller with which it interfaces via an SDN controller agent to determine a communication path between the first and second industrial devices. The communication path may be determined based on the at least one user-defined communication criteria at block 1404a. For example, if the industrial SDN network comprises network devices A, B, C, D, E and F, the communication path may avoid network device C and D because of they are already handling heavy traffic and instead choose a network path through devices A, B, E and F.

At block 1406, the SDN controller interacts with one or more network devices to define the communication path to enable communication between the first industrial device and the second industrial device. Interacting with the network devices can include programming the network devices, for example, to install or update the packet handling rules (or flow table). This enables each network device in the communication path to match packets to the packet handling rules and perform certain specified actions. In some embodiments, the communication path (or network path) may go through a virtualized network device. Thus, the communication path may comprise of real or virtualized network devices at block 1406a. For example, out of the network devices A, B, E and F from the above example, network device B may be a virtualized network device.

Figure 15:
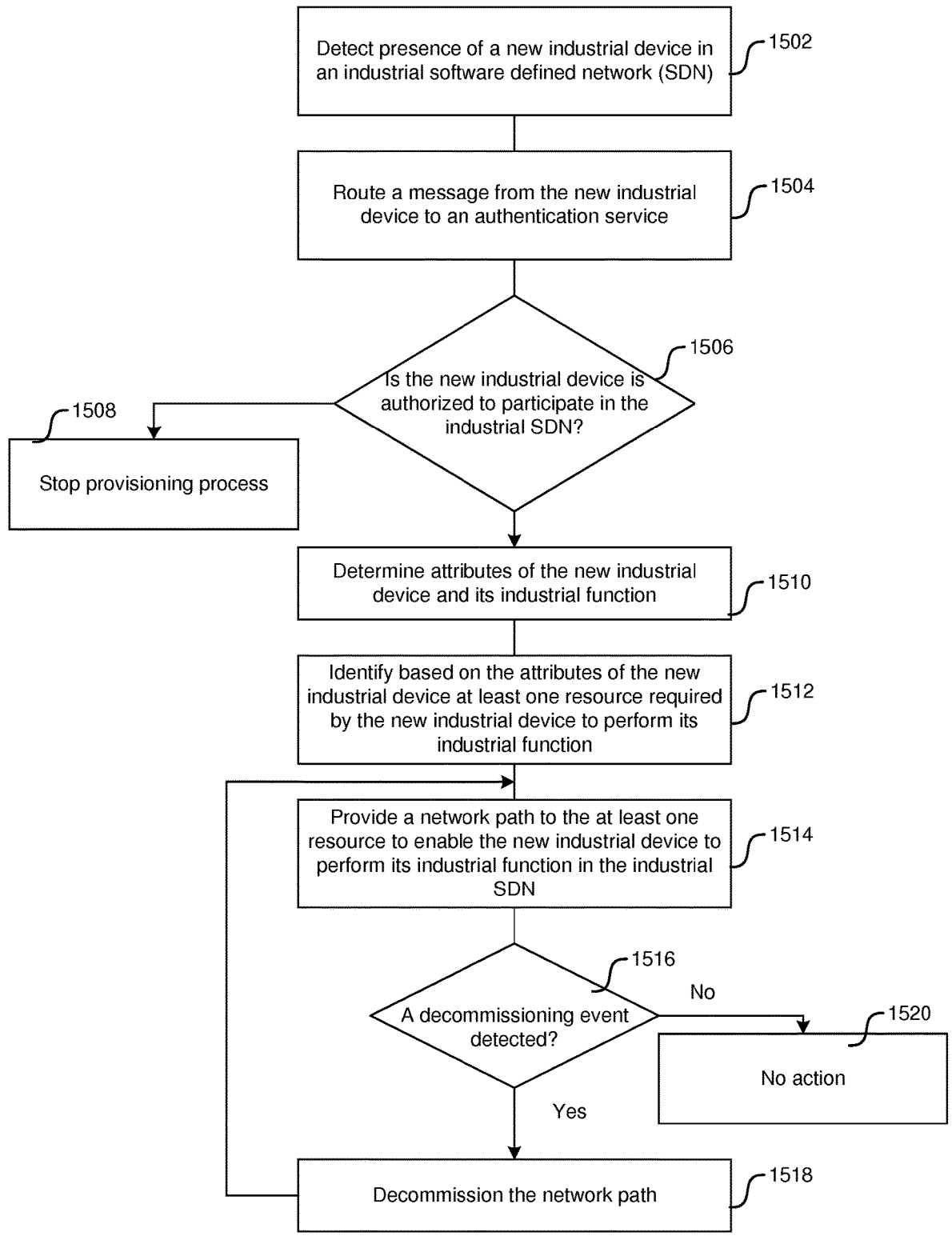
FIG. 15 is a logic flow diagram illustrating an example method for simplifying management of an industrial network in accordance with some embodiments.

FIG. 15 is a logic flow diagram illustrating an example method for simplifying management of an industrial network in accordance with some embodiments.

In the example method, an SDN controller can detect presence of a new industrial device in an industrial SDN at block 1502. The presence of the new industrial device in the industrial network can be detected by a software defined network (SDN) controller when a network device in the industrial network has no rules for handling a message from the new industrial device. In such a case, the message is forwarded to the SDN controller. At block 1504, a message from the new industrial device can be routed to an authentication service which can determine whether the new industrial device is authorized to participate in the industrial network. In some embodiments, the routing of the message to the authentication service can be in response to a cybersecurity controller determining that at least one cybersecurity policy is applicable to the new industrial device, and such a cybersecurity policy may require that the new industrial device be authenticated by the authentication service. The SDN controller can then provision a network path from the new industrial device to the authentication service. to enable the next message from the new industrial device to be routed to the authentication service. If the new industrial device is determined as not being authorized to participate in the industrial SDN at decision block 1506, the provisioning process is stopped at block 1508. The new industrial device would then not be able to communicate with other industrial devices in the network. However, if the new industrial device is successfully authenticated, the method proceeds to both 1510 where attributes of the new industrial device and its industrial function can be determined.

At block 1512, the SDN controller can identify based on the attributes of the new industrial device at least one resource required by the new industrial device to perform its industrial function. At block 1514, the SDN controller can provision a network path to the at least one resource to enable the new industrial device to perform its industrial function in the industrial network. In some embodiments, the resource required by the new industrial device may include one or more of other industrial devices connected to the industrial network, or an external storage. If for example, the resource is an external storage, an ISDNA can coordinate with a virtualization management controller to instantiate a storage node in a virtualization management platform and provide the SDN controller the location of the storage node to enable the SDN controller to provision the new path from the new industrial device to the storage node providing the external storage.

In some embodiments, the network path may be provisioned based on at least one user-defined criteria. The user-defined criteria may include, but are not limited to: a quality of service requirement, load, network device capabilities and time-sensitivity requirement.

In some embodiments, a decommissioning event may be detected. If such an event is detected at decision block 1516, the SDN controller can decommission the network path at block 1518 and then provide a new network path from the new industrial device to the resource at block 1514. Non-limiting examples of the decommissioning event may include: a user instruction, a cybersecurity policy update, an autodetection of a fault along the network path, a detection of an opportunity to re-optimize the network path, a change in load conditions, a change in quality of service, a network event, and the like. If no decommissioning event is detected at 1516, no action may be taken at block 1520.

Figure 16:
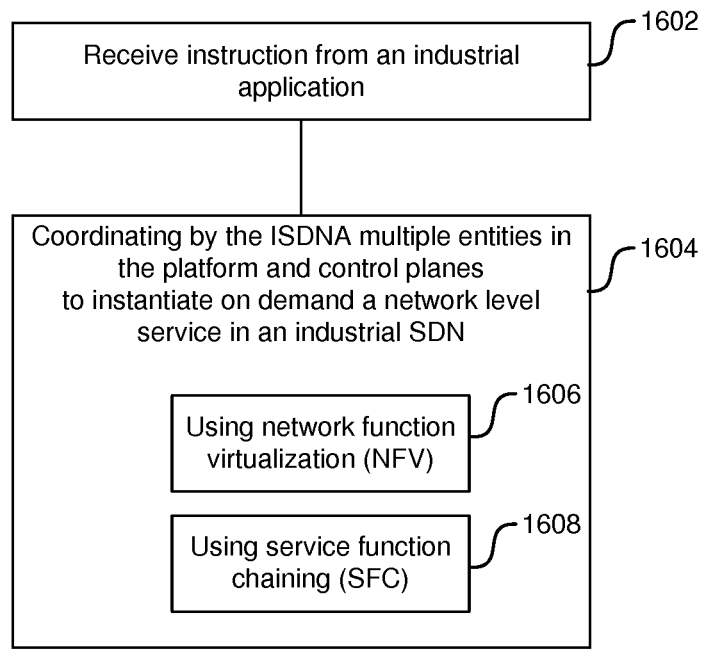
FIG. 16 is a logic flow diagram illustrating an example method for centralized management of an industrial network in accordance with some embodiments.

FIG. 16 is a logic flow diagram illustrating an example method for centralized management of an industrial network in accordance with some embodiments.

At block 1602, an instruction from an industrial application in an application plane is received by an ISDNA in the platform plane. The industrial application interfaces with the ISDNA via an application programming interface exposed by the ISDNA. Responsive to the instruction from the industrial application, the ISDNA coordinates with multiple entities in the platform plane and the control plane to instantiate on demand a network level service in the industrial network at block 1604. In some embodiments, the instantiating can be performed by the ISDNA in coordination with at least a software defined network (SDN) controller in the control plane. The platform plane is communicatively coupled to the control plane via an application programming interface.

In various embodiments, a network level service can include is but is not limited to providing connectivity between at least some of the plurality of data plane components, a cybersecurity service, a load balancer, and a traffic analyzer. The network level service may be instantiated on demand using network function virtualization at block 1606 in some embodiments. The ISDNA can coordinate with the SDN controller and the virtualization management controller to instantiate the network level service on demand using network function virtualization. In other embodiments, the network level service may be instantiated on demand using service function chaining at block 1608 which connects at least two network level services to implement one or more cybersecurity policies governed by the cybersecurity controller. The ISDNA can coordinate with at least the SDN controller and the cybersecurity controller to instantiate the network level service using service function chaining. Some non-limiting examples of the network level service may include a virtual firewall, deep packet inspection (DPI), load balancers, traffic analyzers, NAT, proxy services, routing, and the like.

Figure 17:
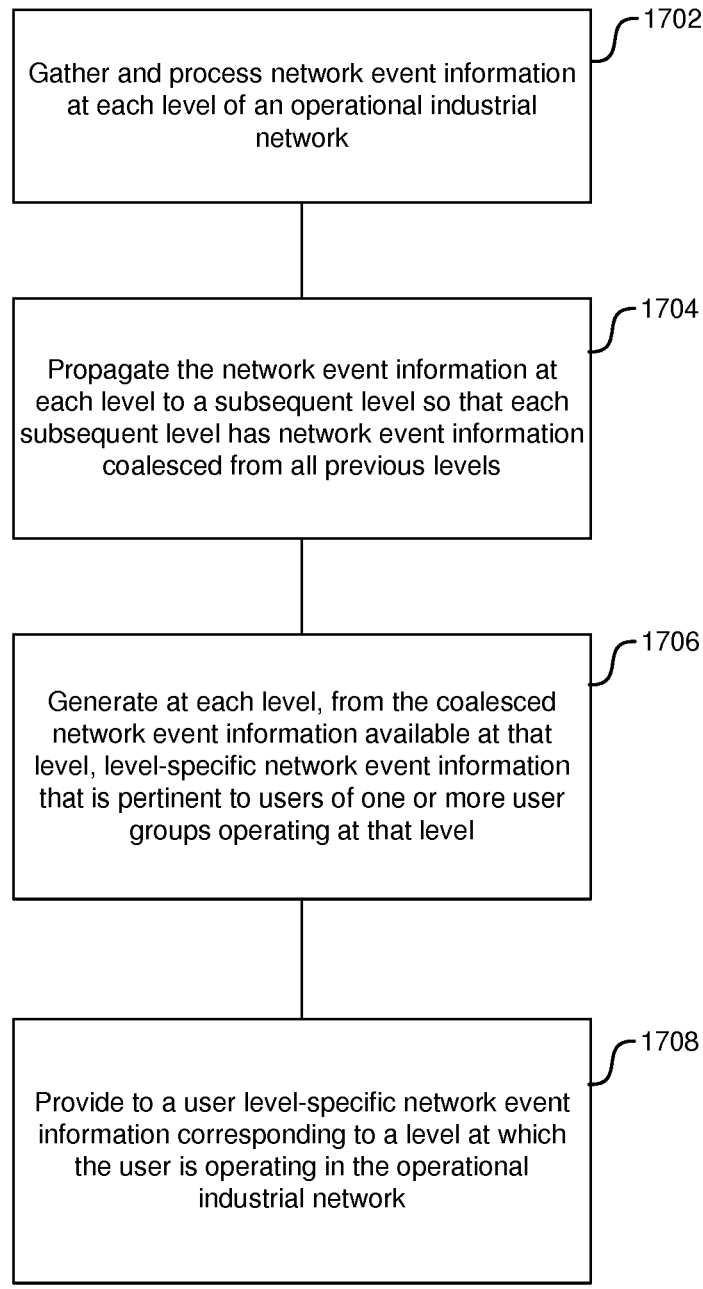
FIG. 17 is a logic flow diagram illustrating an example method for centralized monitoring and reporting of an operational industrial network.

FIG. 17 is a logic flow diagram illustrating an example method for centralized monitoring and reporting of an operational industrial network. The operation industrial network is an SDN deployed in an industrial domain and comprises a physical level, a logical level, a traffic level, a function level and a business level. In some embodiments, the ISDNA which has a centralized view of the operational industrial network can gather and process network event information at each level of the operational industrial network at block 1702. For example, the ISDNA monitors the current state of the operational industrial network and performs the gathering and processing, propagating, generating and providing steps. In some embodiments, the network event information is associated with a network event detected at a level by the ISDNA. Examples include, but are not limited to: a connectivity loss at a physical level of the operational industrial network or an unauthorized access to the operational industrial network.

At block 1704, the ISDNA can propagate at least some of the network event information at each level to a subsequent level so that each subsequent level has network event information coalesced from all previous levels. At block 1706, the ISDNA can generate at each level, from the coalesced network event information available at that level, level specific network event information that is pertinent to users of one or more user groups operating at that level.

For example, the network event information at the physical level includes or is derived from at least one of: network statistics, device specific information, location information, network connectivity, physical connectivity, or connectivity policies. The network event information at the logical level includes or is derived from at least one of: network statistics, device specific information, logical connectivity, connection parameters, network behavior, logical network segments, network access policies, or configuration. Similarly, the network event information at the traffic level includes or is derived from at least one of: connection health, connection status, protocol statistics, traffic amount and type generated by devices, traffic and device capabilities, communication policies, or transmission type. The network event information at the function level includes or is derived from at least one of: industrial function, connectivity, communication health, application response time (ART), or communication policies. Finally, the network event information at the business level includes or is derived from at least one of: operating cost, maintenance cost, cost associated with a production impediment, or cost associated with a network event.

At block 1708, the ISDNA can provide to a user level-specific network event information corresponding to a level at which the user is operating in the operational industrial network. In some embodiments, the physical level is associated with users of engineering, maintenance and security user groups, the logical level and the traffic level is each associated with users of the engineering and security user groups, the function level is associated with users of an operational user group, and the business level is associated with users of a management user group.

13. Further Embodiments

The following is a list of further embodiments based on the industrial SDN architecture and/or SDA system deployed with the industrial SDN architecture in accordance with the present disclosure.

Embodiment 1: An industrial network architecture for centralized and simplified management of an industrial network comprising:
- an infrastructure plane including physical and virtual devices connected to an industrial network;
- a control plane comprising a plurality of controllers to control and manage the physical and virtual devices in the infrastructure plane, the plurality of logically centralized controllers including a network controller, a virtualization management controller and a cybersecurity controller;
- an application plane comprising one or more end user industrial applications; and
- a platform plane comprising a set of software services and application programming interfaces (APIs) to define a communication interface to the application plane to the north and the control plane to the south to provide an industrial application in the application plane programmatic access to one or more of the plurality of the controllers in the control plane for simplified and centralized management of the industrial network.

Embodiment 2: The industrial network architecture of embodiment 1, wherein the cybersecurity controller is communicatively coupled to the network controller and the virtualization management controller, wherein the cybersecurity controller through the network controller controls accessibility, usage and content of communication handled by the physical and virtual devices in the infrastructure plane.

Embodiment 3: The industrial network architecture of embodiment 1, wherein the set of services in the platform plane includes an industrial software defined networking application (ISDNA), a virtualization management service and a cybersecurity service, wherein the ISDNA is communicatively coupled to both the virtualization management service and the cybersecurity service.

Embodiment 4: The industrial network architecture of embodiment 3, wherein the ISDNA, the virtualization management service and the cybersecurity service of the platform plane are coupled to the network controller, virtualization management controller and the cybersecurity controller of the control plane respectively.

Embodiment 5: The industrial network architecture of embodiment 1, wherein the industrial network includes real and virtual networks, and wherein the real network is under the control of the network controller while the virtual network is under the control of the virtualization management controller, the network controller being communicatively coupled to the virtualization management controller.

Embodiment 6: The industrial network architecture of embodiment 3, wherein the ISDNA is capable of interfacing with any network controller via a network controller agent for the network controller.

Embodiment 7: The industrial network architecture of embodiment 6, wherein the ISDNA includes a device agent to interface with legacy network devices in the infrastructure plane.

Embodiment 8: The industrial network architecture of embodiment 1, wherein the simplified and centralized management of the industrial network includes a secure and express provisioning of a device connected to the industrial network.

Embodiment 9: The industrial network architecture of embodiment 8, wherein the secure and express provisioning includes:
- determining by an authentication service that the device connected to the industrial network is authorized to participate in the industrial network;
- determining attributes of the device;
- identifying based on the attributes of the device resources required by the device to perform its industrial function; and
- provisioning a network path to the resources that are identified to enable the device to access the resources.

Embodiment 10: The industrial network architecture of embodiment 9, wherein the attributes of the device includes a device type, device capabilities and industrial function of the device.

Embodiment 11: A system for centralized management of an industrial network comprising:
- a platform plane component providing an interface to an industrial application, the platform plane component including an industrial software defined networking application (ISDNA);
- a control plane component coupled to the platform plane component via an application programming interface, the control plane component being coupled to other control plane components, wherein the control plane component includes a software defined network (SDN) controller and the other control plane components include a virtualization management controller and a cybersecurity controller; and
- wherein responsive to input from the industrial application, the ISDNA in coordination with at least the SDN controller instantiates on demand one or more network level services in the industrial network.

Embodiment 12: The system of embodiment 11, further comprising
- a plurality of data plane components including real or virtualized network devices and industrial devices, wherein the virtualized network devices and industrial devices are executing on a distributed computing environment, wherein the plurality of data plane components interface with the SDN controller via an application programming interface.

Embodiment 13: The system of embodiment 12, wherein the one or more network level services includes providing connectivity between at least some of the plurality of data plane components.

Embodiment 14: The system of embodiment 12, wherein each of the control plane components is a logically centralized entity executing on a distributed computing environment.

Embodiment 15: The system of embodiment 11, wherein the one or more network level services includes a cybersecurity service, a load balancer, or a traffic analyzer.

Embodiment 16: The system of embodiment 11, wherein the one or more network level services is instantiated on demand using network function virtualization.

Embodiment 17: The system of embodiment 16, wherein the one or more network level services is instantiated by the ISDNA in coordination with the SDN controller and the virtualization management controller.

Embodiment 18: The system of embodiment 11, wherein the one or more network level services is instantiated by the ISDNA in coordination with at least the SDN controller and the cybersecurity controller.

Embodiment 19: The system of embodiment 18, wherein instantiating on demand the one or more network level services includes using service function chaining to connect at least two network level services to implement one or more cybersecurity policies governed by the cybersecurity controller.

Embodiment 20: The system of embodiment 11, wherein the one or more network level services includes a virtual firewall deployed in the industrial network, and wherein the SDN controller, based on one or more cybersecurity policies defined by the cybersecurity controller directs traffic matching one or more criteria through the virtual firewall for processing.

Embodiment 21: The system of embodiment 11, wherein instantiating on demand the one or more network level services in the industrial network includes coordination among the ISDNP, the SDN controller, the virtualization management controller and the cybersecurity controller.

Embodiment 22: A method for simplifying network infrastructure deployment and maintenance in an industrial domain comprising:
  receiving by an industrial software defined networking application (ISDNA) at least one user-defined communication criteria for an automation system deployment, the user-defined communication criteria being received from an industrial application, wherein the automation system deployment includes at least a first industrial device and a second industrial device connected to an industrial software defined network (SDN);
  coordinating with an SDN controller to determine a communication path between the first industrial device and the second industrial device of the automation system deployment, the communication path being determined based on the at least one user-defined communication criteria; and
  interacting with one or more network devices to define the communication path to enable communication between the first industrial device and the second industrial device.

Embodiment 23: The method of embodiment 22, wherein the at least one user-defined communication criteria includes load, quality of service, network device capabilities or time-sensitivity.

Embodiment 24: The method of embodiment 22, wherein the communication path is through at least one virtualized network device executing in one or more compute nodes in a virtualization platform.

Embodiment 25: The method of embodiment 22, wherein the ISDNA interfaces with the SDN controller via an SDN controller agent.

Embodiment 26: A method for simplifying management of an industrial network comprising:
  detecting presence of a new industrial device in an industrial network;
  determining by an authentication service that the new industrial device is authorized to participate in the industrial network;
  determining attributes of the new industrial device and its industrial function;
  identifying based on the attributes of the new industrial device at least one resource required by the new industrial device to perform its industrial function; and
  provisioning a network path to the at least one resource to enable the new industrial device to perform its industrial function in the industrial network.

Embodiment 27: The method of embodiment 26, wherein the presence of the new industrial device in the industrial network is detected by a software defined network (SDN) controller when a network device in the industrial network has no rules for handling a message from the new industrial device.

Embodiment 28: The method of embodiment 26, further comprising determining by a cybersecurity controller at least one cybersecurity policy applicable to the new industrial device, wherein the at least cybersecurity policy requires that the new industrial device be authenticated by the authentication service.

Embodiment 29: The method of embodiment 28, further comprising provisioning by a software defined network (SDN) controller a network path from the new industrial device to the authentication service.

Embodiment 30: The method of embodiment 26, wherein the at least one resource required by the new industrial device includes one or more of other industrial devices connected to the industrial network or an external storage.

Embodiment 31: The method of embodiment 30, further comprising instantiating by a virtualization management controller a storage node in a virtualization management platform and providing an software defined network (SDN) controller location of the storage node to enable the SDN controller to provision the new path from the new industrial device to the storage node providing the external storage.

Embodiment 32: The method of embodiment 26, wherein the network path is provisioned based on at least one user-defined criteria.

Embodiment 33: The method of embodiment 32, wherein the user-defined criteria includes a quality of service requirement, load, network device capabilities or time-sensitivity requirement.

Embodiment 34: The method of embodiment 26, further comprising responsive to a decommissioning event, decommissioning the network path from the new industrial device to the at least one resource.

Embodiment 35: The method of embodiment 34, wherein the decommissioning event includes a user instruction, a cybersecurity policy update, an autodetection of a fault along the network path, a detection of an opportunity to re-optimize the network path, a change in load conditions, or a change in quality of service.

Embodiment 36: A method for centralized management of an industrial network comprising:
  receiving an instruction from an industrial application in an application plane, the industrial application interfacing with an industrial software defined networking application (ISDNA) in a platform plane via an application programming interface exposed by the ISDNA;
  responsive to the input from the industrial application, instantiating on demand one or more network level services in the industrial network, wherein the instantiating is performed by the ISDNA in coordination with at least a software defined network (SDN) controller in a control plane, wherein the platform plane is communicatively coupled to the control plane via an application programming interface, and wherein the control plane further comprises a virtualization management controller and a cybersecurity controller.

Embodiment 37: The method of embodiment 36, wherein the SDN controller interfaces with a plurality of data plane components via an application programming interface, and wherein the plurality of data plane components includes real or virtualized network devices and industrial devices, wherein the virtualized network devices and industrial devices are executing on a virtualization management platform managed by the virtualization management controller.

Embodiment 38: The method of embodiment 36, wherein the one or more network level services includes providing connectivity between at least some of the plurality of data plane components.

Embodiment 39: The method of embodiment 36, wherein the one or more network level services includes a cybersecurity service, a load balancer, or a traffic analyzer.

Embodiment 40: The method of embodiment 36, wherein the one or more network level services is instantiated on demand using network function virtualization.

Embodiment 41: The method of embodiment 36, wherein the one or more network level services is instantiated by the ISDNA in coordination with the SDN controller and the virtualization management controller.

Embodiment 42: The method of embodiment 36, wherein the one or more network level services is instantiated by the ISDNA in coordination with at least the SDN controller and the cybersecurity controller.

Embodiment 43: The method of embodiment 36, wherein instantiating on demand the one or more network level services includes using service function chaining to connect at least two network level services to implement one or more cybersecurity policies governed by the cybersecurity controller.

Embodiment 44: The method of embodiment 36, wherein the one or more network level services includes a virtual firewall deployed in the industrial network, and wherein the SDN controller, based on one or more cybersecurity policies defined by the cybersecurity controller directs traffic matching one or more criteria through the virtual firewall for processing.

Embodiment 45: The method of embodiment 36, wherein instantiating on demand the one or more network level services in the industrial network includes coordination among the ISDNP, the SDN controller, the virtualization management controller and the cybersecurity controller.

Embodiment 46: The method of embodiment 36, wherein each of the controllers in the control plane is a logically centralized entity executing on a distributed computing environment.

Embodiment 47: A method for centralized monitoring and reporting of an operational industrial network comprising:
gathering and processing network event information at each level of an operational industrial network;
propagating at least some of the network event information at each level to a subsequent level so that each subsequent level has network event information coalesced from all previous levels;
generating at each level, from the coalesced network event information available at that level, level specific network event information that is pertinent to users of one or more user groups operating at that level; and
providing to a user level-specific network event information corresponding to a level at which the user is operating in the operational industrial network.

Embodiment 48: The method of embodiment 47, wherein the operation industrial network comprises a physical level, a logical level, a traffic level, a function level and a business level.

Embodiment 49: The method of embodiment 48, wherein:
the physical level is associated with users of engineering, maintenance and security user groups,
the logical level and the traffic level is each associated with users of the engineering and security user groups,
the function level is associated with users of an operational user group,
the business level is associated with users of a management user group.

Embodiment 50: The method of embodiment 47, wherein the operational industrial network is a software defined industrial network (SDN) deployed in an industrial domain.

Embodiment 51: The method of embodiment 50, wherein the operational industrial network comprises an industrial software defined network application (ISDNA) interfacing with an SDN controller, wherein the ISDNA monitors the current state of the operational industrial network and performs the gathering and processing, propagating, generating and providing steps.

Embodiment 52: The method of embodiment 48, wherein the network event information at the physical level includes or is derived from at least one of: network statistics, device specific information, location information, network connectivity, physical connectivity, or connectivity policies.

Embodiment 53: The method of embodiment 48, wherein the network event information at the logical level includes or is derived from at least one of: network statistics, device specific information, logical connectivity, connection parameters, network behavior, logical network segments, network access policies, or configuration.

Embodiment 54: The method of embodiment 48, wherein the network event information at the traffic level includes or is derived from at least one of: connection health, connection status, protocol statistics, traffic amount and type generated by devices, traffic and device capabilities, communication policies, or transmission type.

Embodiment 55: The method of embodiment 48, wherein the network event information at the function level includes or is derived from at least one of: industrial function, connectivity, communication health, application response time (ART), or communication policies.

Embodiment 56: The method of embodiment 48, wherein the network event information at the business level includes or is derived from at least one of: operating cost, maintenance cost, cost associated with a production impediment, or cost associated with a network event.

Embodiment 57: The method of embodiment 51, wherein the network event information is associated with a network event detected at a level by the ISDNA.

Embodiment 58: The method of embodiment 57, wherein the network event is at least one of: connectivity loss, an unauthorized activity, or a network device failure.

Embodiment 59: A non-transitory computer readable medium having stored thereon instructions which when executed by one or more machines causes the machines to
receive by an industrial software defined networking application (ISDNA) at least one user-defined communication criteria for an automation system deployment, the user-defined communication criteria being received from an industrial application, wherein the automation system deployment includes at least a first industrial device and a second industrial device connected to an industrial software defined network (SDN);
coordinate with an SDN controller to determine a communication path between the first industrial device and the second industrial device of the automation system deployment, the communication path being determined based on the at least one user-defined communication criteria; and
interact with one or more network devices to define the communication path to enable communication between the first industrial device and the second industrial device.

Embodiment 60: A non-transitory computer readable medium having stored thereon instructions which when executed by one or more machines causes the machines to simplify management of an industrial network by:
- detecting presence of a new industrial device in an industrial network;
- determining by an authentication service that the new industrial device is authorized to participate in the industrial network;
- determining attributes of the new industrial device and its industrial function;
- identifying based on the attributes of the new industrial device at least one resource required by the new industrial device to perform its industrial function; and
- provisioning a network path to the at least one resource to enable the new industrial device to perform its industrial function in the industrial network.

Embodiment 61: A non-transitory computer readable medium having stored thereon instructions which when executed by one or more machines causes the machines to perform centralized management of an industrial network by:
- receiving an instruction from an industrial application in an application plane, the industrial application interfacing with an industrial software defined networking application (ISDNA) in a platform plane via an application programming interface exposed by the ISDNA;
- responsive to the input from the industrial application, instantiating on demand one or more network level services in the industrial network, wherein the instantiating is performed by the ISDNA in coordination with at least a software defined network (SDN) controller in a control plane, wherein the platform plane is communicatively coupled to the control plane via an application programming interface, and wherein the control plane further comprises a virtualization management controller and a cybersecurity controller.

Embodiment 62: A non-transitory computer readable medium having stored thereon instructions which when executed by one or more machines causes the machines to perform centralized monitoring and reporting of an operational industrial network by:
- gathering and processing network event information at each level of an operational industrial network;
- propagating at least some of the network event information at each level to a subsequent level so that each subsequent level has network event information coalesced from all previous levels;
- generating at each level, from the coalesced network event information available at that level, level specific network event information that is pertinent to users of one or more user groups operating at that level; and
- providing to a user level-specific network event information corresponding to a level at which the user is operating in the operational industrial network.

14. Computer Systemization

Figure 18:
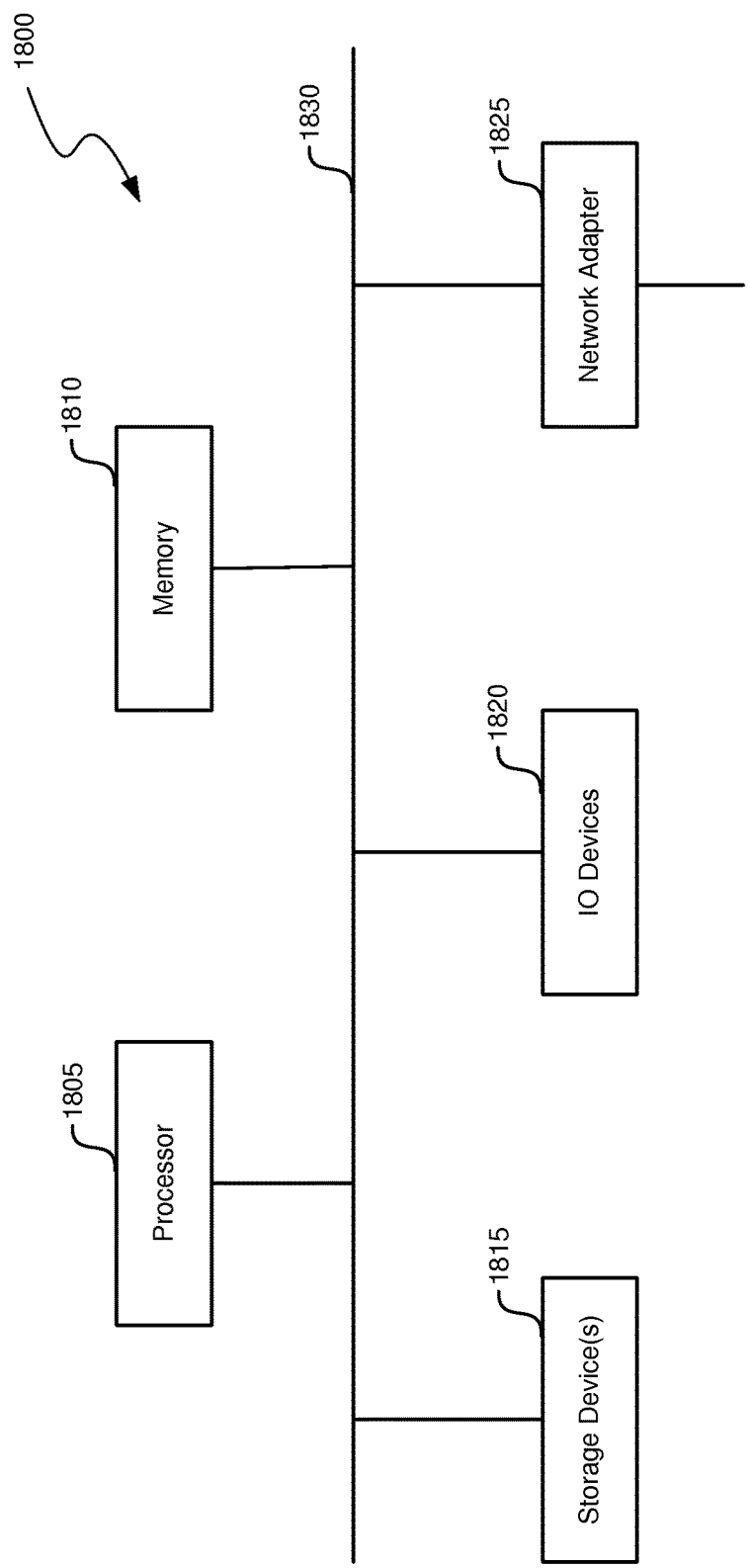
FIG. 18 shows a diagrammatic representation of a machine in the example form of a computer system within which a set of instructions, for causing the machine to perform any one or more of the methodologies discussed herein, may be executed.

FIG. 18 is a block diagram of an exemplary machine/computer/apparatus that may perform various operations, and store various information generated and/or used by such operations in accordance with some embodiments. The computer 1800 is intended to illustrate a hardware device on which any of the entities, components or services depicted in the examples of FIGS. 1A-13A, (and any other components described in this specification) and methodologies described in the examples of FIGS. 14-17 can be implemented, such as a server, client devices, compute nodes, controller nodes such as the fog controller (335, 435, 550, 750, 850), network controller (e.g., 456), SDN controller (e.g., 555, 755a, 755, 855, 1155), CS controller (e.g., 445, 560, 860), storage devices/nodes, databases, industrial devices (e.g., PLCs, PACs), network devices, and the like. The computer 1800 includes one or more processors 1805 and memory 1810 coupled to an interconnect. The interconnect can represent any one or more separate physical buses, point to point connections, or both connected by appropriate bridges, adapters, or controllers.

The processor(s) 1805 is/are the central processing unit(s) (CPU(s)) of the computer and, thus, control the overall operation of the computer. In certain embodiments, the processor(s) accomplish this by executing software or firmware stored in memory. The processor(s) may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1810 is or includes the main memory of the computer. The memory represents any form of random access memory (RAM), read-only memory (ROM), ternary content addressable memory (TCAM), flash memory, or the like, or a combination of such devices. In use, the memory may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) through the interconnect are a network adapter 1825, a storage device(s) 1815 and I/O device(s) 1820. The network adapter provides the computer with the ability to communicate with remote devices, over a network and may be, for example, an Ethernet adapter or Fibre Channel adapter or wireless radio. The network adapter may also provide the computer with the ability to communicate with other computers within the cluster. In some embodiments, the computer may use more than one network adapter to deal with the communications within and outside of the cluster separately.

The I/O device(s) can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory can be implemented as software and/or firmware to program the processor(s) to carry out actions described above. In certain embodiments, such software or firmware may be initially provided to the computer by downloading it from a remote system through the computer (e.g., via network adapter). In some embodiments, memory 1810 and the storage device(s) 1815 can be a single entity.

The components introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in the SDN/TsSDN system introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A computer can also be a server computer, a client computer, a personal computer (PC), a tablet PC, a laptop computer, a set-top box (STB), a personal digital assistant (PDA), a cellular telephone, a smart phone, a tablet, a phablet, a processor, a telephone, a web appliance, a network router, switch or bridge, a controller (e.g., PLC, PAC), or any machine capable of executing a set of instructions (sequential or otherwise) that specify actions to be taken by that machine.

A machine-accessible storage medium or a storage device (s) includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

15. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments of the disclosed system/technology have been described herein for purposes of illustration, but that various modifications may be made without deviating from the spirit and scope of the embodiments. Accordingly, the embodiments are not limited except as by the appended claims.

We claim:

1. An industrial software defined network having an architecture for centralized management of the industrial software defined network comprising:

an infrastructure plane including physical and virtual industrial and network devices connected to an industrial software defined network (ISDN);

a control plane comprising a plurality of controllers executing on a distributed computing environment to control and manage the physical and virtual industrial and network devices in the infrastructure plane, the plurality of controllers including a network controller, a virtualization management controller and a cybersecurity controller, wherein the cybersecurity controller is communicatively coupled to the network controller and the virtualization management controller, wherein the cybersecurity controller through the network controller controls accessibility, usage and content of communication handled by the physical and virtual industrial and network devices in the infrastructure plane;

an application plane comprising one or more industrial applications; and a platform plane comprising a set of software services and application programming interfaces (APIs) including an industrial software defined networking application (ISDNA) that define communication interfaces to the application plane and the control plane, the communication interfaces providing an industrial application in the application plane programmatic access to one or more of the plurality of the controllers in the control plane for centralized management of the ISDN.

2. The ISDN of claim 1, wherein the set of services in the platform plane further includes a virtualization management service and a cybersecurity service, wherein the ISDNA is communicatively coupled to both the virtualization management service and the cybersecurity service.

3. The ISDN of claim 2, wherein the ISDNA, the virtualization management service and the cybersecurity service of the platform plane are coupled to the network controller, virtualization management controller and the cybersecurity controller of the control plane respectively.

4. The ISDN of claim 2, wherein the ISDNA interfaces with a network controller via a network controller agent for the network controller.

5. The ISDN of claim 4, wherein the ISDNA includes a device agent to interface with legacy network devices in the infrastructure plane.

6. The ISDN of claim 1, wherein the ISDN includes real and virtual networks, and wherein the real network is controlled by the network controller while the virtual network controlled by the virtualization management controller, the network controller being communicatively coupled to the virtualization management controller.

7. The ISDN of claim 1, wherein the centralized management of ISDN includes on demand instantiation of one or more network level services in the ISDN.

8. The ISDN of claim 7, wherein the one or more network level services includes a virtual firewall.

9. The ISDN of claim 8, wherein the ISDNA instantiates the virtual firewall by coordinating with the virtualization management controller which instantiates the firewall in one or more servers in the distributed computing environment and further coordinating with the cybersecurity controller to obtain one or more cybersecurity policies, and wherein in operation the network controller, based on one or more cybersecurity policies, directs traffic matching one or more criteria through the virtual firewall.

10. A method for centralized management of an industrial software defined network comprising:

receiving an instruction from an industrial application in an application plane of an industrial software defined network (ISDN), the industrial application interfacing with an industrial software defined networking application (ISDNA) in a platform plane of the ISDN via an application programming interface exposed by the ISDNA;

responsive to the instruction from the industrial application, instantiating on demand one or more network level services in the ISDN by the ISDNA by coordinating with at least a software defined network (SDN) controller system in a control plane of the ISDN via an application programming interface between the platform plane and the control plane of the ISDN, wherein the one or more network level services is instantiated by the ISDNA in further coordination with a cybersecurity controller system in the control plane; and wherein the one or more network level services includes a virtual firewall deployed in the ISDN, and wherein the SDN controller system, based on one or more cybersecurity policies defined by the cybersecurity controller system directs traffic matching one or more criteria through the virtual firewall.

11. The method of claim 10, wherein the one or more network level services includes providing connectivity between at least some of a plurality of real or virtual network devices and industrial devices in an infrastructure plane of the ISDN, the infrastructure plane interfacing with the control plane via an application programming interface.

12. The method of claim 10, wherein the one or more network level services includes a cybersecurity service, a load balancer, or a traffic analyzer.

13. The method of claim 10, wherein the one or more network level services is instantiated on demand using network function virtualization.

14. The method of claim 10, wherein the one or more network level services is instantiated by the ISDNA in further coordination with a virtualization management controller system in the control plane.

15. The method of claim 10, wherein instantiating on demand the one or more network level services includes using service function chaining to connect at least two network level services to implement one or more cybersecurity policies from the cybersecurity controller system.

16. The method of claim 10, wherein instantiating on demand the one or more network level services in the ISDN includes coordination among the ISDNA, the SDN controller system, a virtualization management controller system and a cybersecurity controller system.

17. The method of claim 10, wherein each of the controller systems in the control plane is a logically centralized entity executing on a distributed computing environment.

18. A non-transitory computer readable medium having stored thereon instructions which when executed by one or more machines causes the machines to perform a method in an industrial software defined network comprising:

receiving an instruction from an industrial application in an application plane of an industrial software defined network (ISDN), the industrial application interfacing with an industrial software defined networking application (ISDNA) in a platform plane of the ISDN via an application programming interface exposed by the ISDNA;

responsive to the instruction from the industrial application, instantiating on demand one or more network level services in the ISDN by the ISDNA by coordinating with at least two controller systems in a control plane of the ISDN via an application programming interface between the platform plane and the control plane of the ISDN;

wherein the one or more network level services includes a virtual firewall, wherein the ISDNA instantiates the virtual firewall by coordinating with a virtualization management controller system which instantiates the firewall in one or more servers and further coordinating with a cybersecurity controller system to obtain one or more cybersecurity policies, and wherein in operation a SDN controller system, based on one or more cybersecurity policies, directs traffic matching one or more criteria through the virtual firewall.

19. The non-transitory computer readable medium of claim 18, wherein each of the controller systems in the control plane is a logically centralized entity executing on a distributed computing environment.

* * * * *